(12) United States Patent
Schlueter et al.

(10) Patent No.: US 8,239,070 B1
(45) Date of Patent: *Aug. 7, 2012

(54) ROOT CAUSE AND SYSTEM ENHANCEMENT ANALYSIS

(75) Inventors: Robert A. Schlueter, Holt, MI (US);
Benjamin A. Minshall, Mason, MI (US); Ryan J. Hunt, East Lansing, MI (US)

(73) Assignee: Intellicon, Inc., Holt, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,441

(22) Filed: Sep. 19, 2011

Related U.S. Application Data

(63) Continuation-in-part of application No. 11/247,388, filed on Oct. 11, 2005, now Pat. No. 8,024,076, which is a continuation-in-part of application No. 10/879,236, filed on Jun. 28, 2004, now Pat. No. 7,194,338.

(60) Provisional application No. 60/483,244, filed on Jun. 27, 2003.

(51) Int. Cl.
*G05D 5/00* (2006.01)

(52) U.S. Cl. ........ 700/286; 700/292; 700/295; 702/182; 703/18

(58) Field of Classification Search ................. 700/286, 700/292, 293, 295; 702/182; 703/18
See application file for complete search history.

(56) References Cited

U.S. PATENT DOCUMENTS

| | | | |
|---|---|---|---|
| 5,594,659 A * | 1/1997 | Schlueter | 700/286 |
| 5,610,834 A | 3/1997 | Schlueter | |
| 5,642,000 A * | 6/1997 | Jean-Jumeau et al. | 307/31 |
| 5,745,368 A | 4/1998 | Ejebe et al. | |
| 5,796,628 A | 8/1998 | Chiang et al. | |
| 6,249,719 B1 * | 6/2001 | Vu et al. | 700/292 |
| 6,496,757 B1 | 12/2002 | Flueck et al. | |
| 6,625,520 B1 | 9/2003 | Chen et al. | |
| 7,398,194 B2 * | 7/2008 | Evans et al. | 703/18 |
| 7,519,506 B2 * | 4/2009 | Trias | 702/182 |
| 7,603,203 B2 * | 10/2009 | Zhang et al. | 700/295 |
| 8,024,076 B2 * | 9/2011 | Schlueter et al. | 700/286 |
| 2004/0158417 A1 | 8/2004 | Bonet | |

(Continued)

OTHER PUBLICATIONS

A.S. Quintela and C.A. Castro, "Improved Branch-based Voltage Stability Proximity Indices Part II: Application in Security Analysis", Proceedings of the 2002 Large Engineering Systems Conference on Power Engineering, 2002, pp. 115-119 (IEEE).

(Continued)

*Primary Examiner* — John R. Cottingham
*Assistant Examiner* — Douglas Lee
(74) *Attorney, Agent, or Firm* — Young Basile Hanlon & MacFarlane, P.C.

(57) ABSTRACT

A method of assessing an electrical power system is provided that includes performing a plurality of contingencies using a mathematical model of the system and determining a representative solution for each contingency. For each bus and contingency, symptoms of system stress exhibited in the representative solution are tabulated. Each contingency is categorized into a contingency cluster based on its representative solution, and those buses having a highest number of the symptoms of system stress for each contingency categorized within a respective contingency cluster are sorted into a group associated therewith. The contingency clusters are arranged into a ranking based on its effect on the network, and a location for a network enhancement is selected from a group of buses associated with a contingency cluster of the ranking that has a largest effect on the network and also includes buses as a result of the sorting.

21 Claims, 26 Drawing Sheets

U.S. PATENT DOCUMENTS

2005/0033480 A1  2/2005  Schlueter et al.

OTHER PUBLICATIONS

S. Liu and R. A. Schlueter, "Structure of an Improved Intelligent Control for a Power System in a Deregulated Environment", Proceedings of the 1996 IEEE Int'l Conference on Control Applications, Dearborn, MI, Sep. 15-18, 1996, pp. 456-461 (IEEE).

I. Musirin and T.K.A. Rahman, "On-Line Voltage Stability Based Contingency Ranking Using Fast Voltage Stability Index (FVSI)", 2002, pp. 1118-1123 (IEEE).

H. Li and Y.H. Song, "Identification of Weak Busbars in Large Scale Power System", 2002, pp. 1700-1704 (IEEE).

X. Xu, et al., "Assessment of Voltage Stability and Real and Reactive Margins Using Advanced Analytical Tools," 2002, pp. 2047-2051 (IEEE).

M.M. Othman, et al., "Available Transfer Capability Assessment of the Malaysian Power System", 2002 Student Conference on Research and Development Proceedings, Shah Alam, Malaysia, 2002, pp. 184-187 (IEEE).

Y. Ou and C. Singh, "Calculation of risk and statistical indices associated with available transfer capability", IEE Proc.-Gener. Transm. Distrib., vol. 150, No. 2, Feb. 6, 2003, pp. 239-244 (IEE).

Y. Chan, et al., "Optimal Strategy to Split Firm and Recallable Available Transfer Capability in the Deregulated Environment", 2002, pp. 881-885 (IEEE).

R.A. Schlueter, "Summary of Work Performed on 'Investigation of Voltage Problems and their Solution on the Detroit Edison System", approx. 1987.

J. Dorsey and R.A. Schlueter, "Global and Local Dynamic Equivalents Based on Structural Archetypes for Coherency", IEEE Trans. on Power App. & Sys., vol. PAS-102, Jun. 1983, pp. 1793-1801 (IEEE).

T.T. Lie and R.A. Schlueter, "Strong Local Observability and Controllability of Power Systems", IEEE Trans. on Power Systems, 1992 (IEEE).

R.A. Schlueter, "Unification and Classification of Algebraic Tests for Loss of Voltage Stability", Elec. Mach. & Power Sys., Sep.-Oct. 1993, vol. 21, No. 5, pp. 557-590.

T. Lie, et al., "Method of Identifying Weak Transmission Network Stability Boundaries", IEEE Trans. of Power Systems, vol. 8, No. 1, 1992, pp. 293-301 (IEEE).

T. Guo and R.A. Schlueter, "Identification of Generic Bifurcation and Stability Problems in Power System Differential-Algebraic Model", 93 SM 513-2 PWRS, IEEE Trans. on Power Sys., vol. 9, No. 2, 1993, pp. 1032-1044 (IEEE).

M.G. Lauby, et al., "Contingency Selection of Branch Outages Causing Voltage Problems", 83 SM 340-7, 1983 (IEEE).

R.A. Schlueter, et al., "Preventive and corrective open access system dispatch based on the voltage stability security assessment and diagnosis", Electric Power Systems Research 60 (2001), pp. 17-28.

R.A. Schlueter, et al., "Reactive Supply Voltage Stability on EHV Transmission Networks", Proc. of WVU/EPRI Work. on High Volt. Tra. in the Mid-Atl. Reg., EPRI Rep., Aug. 1990, pp. 1990-2010.

R.A. Schlueter and I. Hu, "Types of voltage instability and the associated modeling for transient/mid-term stability simulation", Electric Power Systems Research 29 (1994), pp. 131-145.

R.A. Schlueter, et al., "Contingency Selection", Feb. 1991.

D.E. Bradley, "VAR Reserves and Requirements", 1987 (IEEE).

J.F. Christensen, et al., "Planning against voltage collapse", Electra No. 111, 1987, pp. 55-75.

R.A. Schlueter, et al., Voltage Stability and Security Assessment, EPRI Report, EL-5967, RP-1999-8, Aug. 1988 (attached in three parts).

C. Aumiller and T.K. Saha, "Analysis and Assessment of Large Scale Power System Voltage Stability by a Novel Sensitivity Based Method", 2002, pp. 1621-1626 (IEEE).

Schlueter, "Intelligent Design & Optimization," Presentation, Jan. 22, 2010, pp. 1-59, 64 and 65.

* cited by examiner

ROOT CAUSE AND SYSTEM ENHANCEMENT ANALYSIS

CROSS-REFERENCE TO RELATED APPLICATIONS

This application is a continuation-in-part of U.S. application Ser. No. 11/247,388, filed Oct. 11, 2005, now U.S. Pat. No. 8,024,076, which is a continuation-in-part of U.S. application Ser. No. 10/879,236, filed Jun. 28, 2004, now U.S. Pat. No. 7,194,338, which claims the benefit of U.S. provisional application Ser. No. 60/483,244, filed Jun. 27, 2003 and is incorporated herein in its entirety by reference.

TECHNICAL FIELD

This invention relates generally to the analysis of an electrical power system or network for root causes of potential failures and to system enhancements to address those root causes.

BACKGROUND

A number of problems can arise when outages occur within an electrical power system. One kind of problem, called voltage collapse, is a cascading loss of stability. The loss of stability typically originates in one or more subsystems of the electrical power system (caused by an equipment outage or increased load), which in turn overloads additional power system components. Voltage collapse can also be caused by an equipment outage due to relaying actions, failure of equipment or failure of control. Typically, voltage collapse leads to a blackout or brownout where customers are no longer provided with the power they desire. Another type of voltage problem, called loss of voltage stability, is the inability of the generation, transmission, and distribution system to supply enough power to satisfy customer demand after a disturbance, increased load or a change in operating conditions without an uncontrollable and progressive decrease in voltage. The source of these instability problems is within and between components in the electrical power system that deliver electrical power to customers. A third problem, called local blackout, occurs when the power network is pushed to its physical limits. This phenomenon can be caused by numerous factors, some of which are 1) exhaustion or depletion of reactive supply in the voltage control or reactive supply devices serving the local region or 2) outages of equipment or 3) increased power flow into or within a local region.

BRIEF SUMMARY

Methods have been developed that are directed toward identifying and rectifying weaknesses in the electrical power system before those weaknesses result in voltage instability. Such methods have many deficiencies. For example, they do not provide any way of identifying the root cause of the weakness. Nor do the methods describe system enhancements addressing the root cause.

In contrast, the present invention provides a systematic way to identify the root cause of such a weakness and to propose network or system enhancements to minimize or eliminate the weakness by addressing the root cause. Such enhancements can be implemented in transmission operations, transmission planning and/or transmission planning.

One exemplary method of assessing a condition of an electrical power system including a network of buses taught herein comprises, where at least certain of the buses include a respective reactive source, performing a plurality of contingencies using a mathematical model of the network; determining a representative solution for each contingency of a plurality of contingencies; for each bus in the network, tabulating symptoms of system stress exhibited by the bus in the representative solution for each contingency; categorizing each contingency into one of at least two contingency clusters based on its representative solution; sorting those of the buses having a highest number of the symptoms of system stress for each contingency categorized within a respective contingency cluster into a respective group associated with the respective contingency cluster; arranging each of the at least two contingency clusters into a ranking based on its effect on the network; and selecting a location for a network enhancement from a group of buses associated with a contingency cluster of the ranking that has a largest effect on the network and also includes buses as a result of the sorting.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
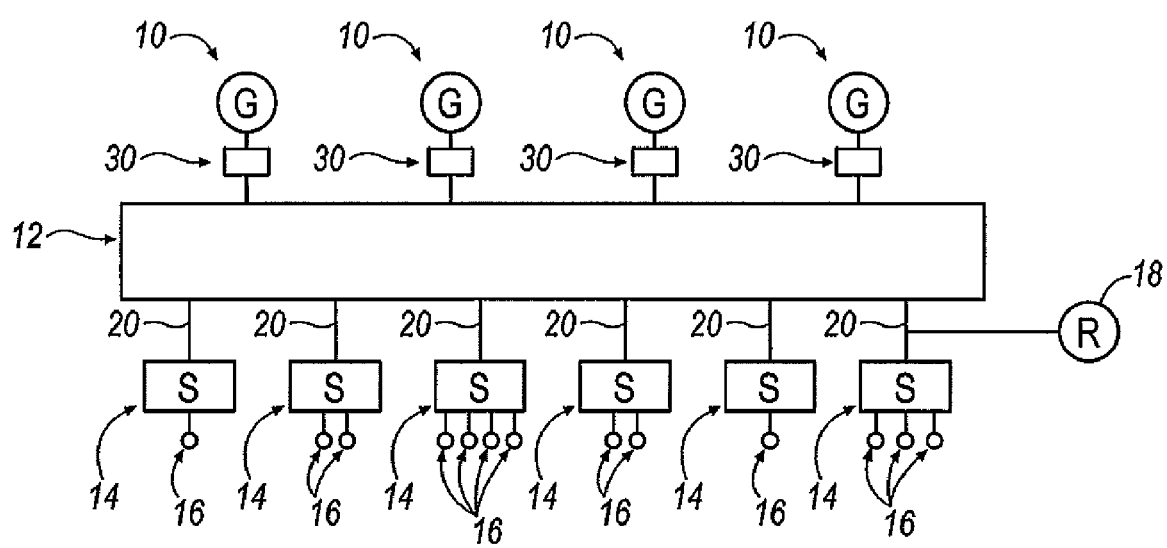
FIG. 1 is a schematic view of electrical power system to which embodiments of the present invention can be applied.

Referring now to FIG. 1, a schematic view of a conventional electrical power system is shown and described. The electrical power system shown in FIG. 1 generally includes generators 10, transmission system 12, substations 14 and 30, and load centers 16. It should be understood that the electrical power system shown in FIG. 1 is a non-limiting example, and that the present invention may be applied to numerous different configurations from that shown in FIG. 1.

The generators 10 can be any known electrical generation source such as coal, nuclear, gas or other types of generators. The generators 10 transmit generated electrical power to substations 30, which in turn step up the voltage of the transmitted electrical power to a voltage sufficient for transporting power across the transmission system 12.

The transmission system 12 is a network of high voltage electrical wires designed to transmit the electrical power from generators 10 across great distances to substations 14. The substations 14 represent connections to the sub-transmission or distribution network, the sub-transmission network, and the distribution network. The sub-transmission and distribution network include substations for connecting buses at different voltage levels and provide paths for power to flow to customers in the load centers 16 of the distribution and sub-transmission networks. The load centers 16 represent end users of electrical power, such as homes, factories, businesses or the like. It should be noted that many different configurations may be used to step electrical power up or down, such as multiple substations, or to transport electrical power across the transmission system 12. Additionally, as mentioned above, many different configurations of the electrical power system from that described herein may be employed in conjunction with the present invention, and the example shown in FIG. 1 is provided merely for purposes of clarity and illustration.

Figure 2:
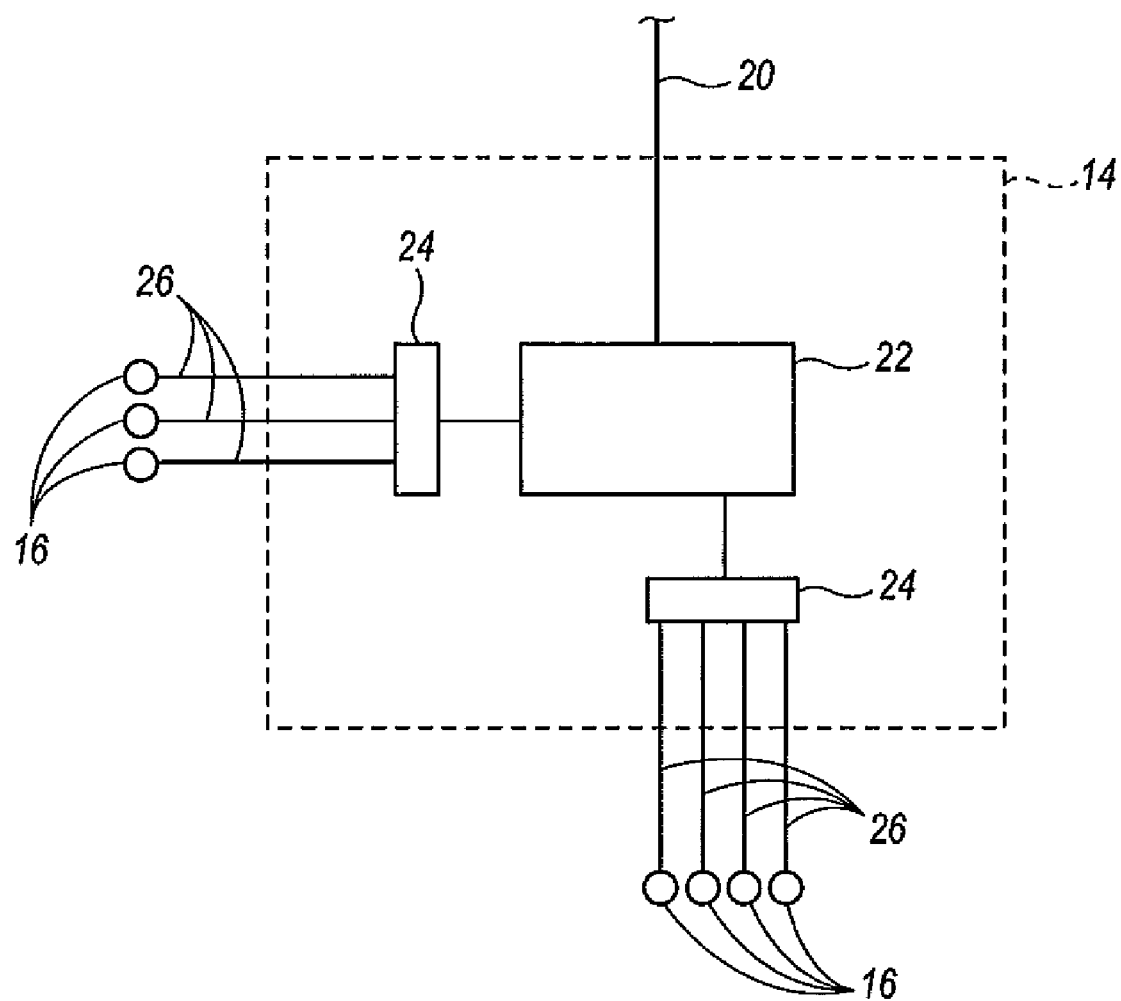
FIG. 2 is a schematic view of a portion of the electrical power system according to FIG. 1.

The transmission system 12, substations 14 and every other component between the load centers 16 and the generators 10 include a plurality of buses that provide electrical connection between various components of the electrical power system. By way of a non-limiting example, as shown in FIG. 2, buses 24 are shown as providing an electrical connection between power lines 20 coming from the transmission system 12, sub-transmission system, and/or distribution system to power lines 26 that distribute power through transmission, sub-transmission, and local distribution networks at the same or lower voltage. Specifically, power lines 20 supply higher voltage electricity into substation 14 that is stepped down to a lower voltage by transformer 22. Buses 24 provide a connection for the electrical power to be distributed on a distribution network represented by power lines 26. It should be understood that FIG. 2 is one non-limiting example of the usage of buses in the electrical power system, and that buses are used at numerous locations throughout an electrical power system for distribution of electrical power. For example, buses may be located at the generators 10 themselves, at different points along the transmission system 12, at the substations 14 and 16 and at every other part of the electrical power system. Accordingly, for purposes of this application, the term buses are used in conjunction with a connector that connects one electrical component with another for the purpose of transporting electrical power.

Reactive reserves are positioned at different points along the electrical power system. By way of a non-limiting example, reserves 18 are shown in FIG. 1 as being connected between substation 14 and transmission system 12. The reserves 18 may be a bank of capacitors, generator or other known power source or voltage control/reactive supply device. The reserves 18 provide an additional power source to assist the electric power system during times of unusually high or low power usage. In addition to the reserves 18, it should be understood that any one of or a combination of generators 10 may serve as a reactive supply device. Specifically, scheduling of increased output of any of the generators 10 may be used to provide additional active and reactive power into electrical power system in particularly stressed parts of the system.

The present invention is based, in part, on the idea that voltage collapse, local blackout or instability is a function of the impact of contingencies on lower voltage levels, such as within the sub-transmission system, distribution network, or near load centers. The present invention also recognizes that voltage collapse, local blackout or instability is caused not only by catastrophic outages but is often the result of combined minor fluctuations of geographically widespread reactive reserves and generators that combine to cause cascading exhaustion of reactive supply and possible voltage instability of agents (will be discussed in more detail) due to outages. Often, generators are scheduled to be connected and to produce reactive power via voltage schedules and active power at certain levels over a set of agents in one or more family lines that either have very little or no reactive supply capability or are inadvertently scheduled (voltage, reactive and active power schedules) to have very little or no reactive reserves. This can make the system vulnerable to cascading instability that can be catastrophic.

Most outages that have no loadflow solution and cause voltage instability, voltage collapse or local blackout can cause exhaustion of reactive reserves in agents, causing instability of the agents. Or, outages that interrupt flow of reactive power to, within, or between agents in family lines cause voltage instability, voltage collapse or local blackout by limiting access to generators or voltage control reactive supply devices or causing reactive losses that consume the reactive supply from these voltage control/reactive supply devices. In combination with these above-described factors, the scheduling of units that are in service, voltage set-point schedules on voltage control/reactive supply devices, active power schedules on generators, load patterns and flows of active and reactive power can result in voltage instability, voltage collapse or local blackout.

This voltage instability, voltage collapse or local blackout is addressed by a divide and conquer method as set forth by example herein. Multiple (e.g., double) contingencies are selected that affect one or several different family lines of agents in one or more families. This is accomplished by initiating a sequential or cascading exhaustion of reactive supply in agents of these specific family lines in one or more families that synergistically cause voltage collapse or local blackout that is far worse than the sum of the effects of either outage of the double outage. In one aspect, each of the outages individually often do not significantly reduce the reactive reserves of the same agents, agents in the same family line, or even agents and family lines in the same families. Thus, the resulting combination may cause unanticipated and extremely significant exhaustion of reactive reserves in more than one family line of agents in more than one family. The vulnerability of the system to a particular double outage is a combination of the selection of single outages that produce large reactive losses in agents compared to the reactive reserves available in those agents by design or by scheduling of units, voltage and reactive power, active power, etc.

Accordingly, the present invention provides a method of identifying specific regions within the electrical power system that are particularly vulnerable to electrical outages and that may cause cascading exhaustion of reactive supply outages. More specifically, one or more root causes within such regions are found and addressed. In one embodiment, this method applies specific simulations of electrical outages to a model of an electrical power system under examination. Buses and generators within the model can be grouped into specific groupings called "agents." The effect of simulated outages (called contingencies) on these agents can be performed. The contingencies are grouped according to their severity, and buses affected by the contingencies are grouped. From these groupings, system weaknesses can be determined and proposals as to load shedding, active power rescheduling, voltage rescheduling, new power lines, new generators, etc. can be made to operators/planners of the electrical power system to minimize the chance of electrical outages, local blackout or voltage instability.

Figure 3:
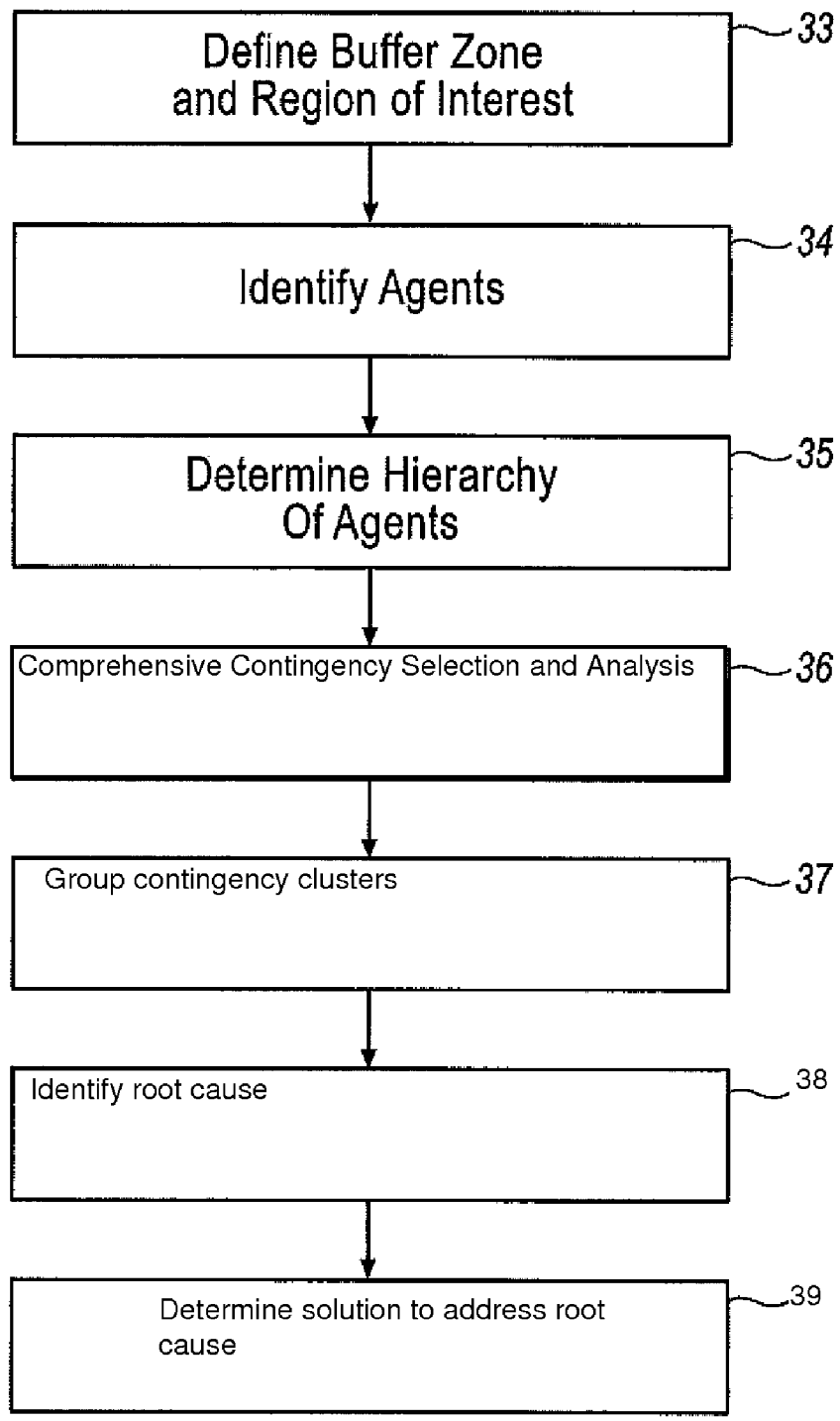
FIG. 3 is a flow chart depicting one method of determining a root cause and providing a system enhancement according to an aspect of the present invention.

One embodiment of the process according to the present invention is shown in FIG. 3. It should be understood, however, that the specific order of steps outlined herein does not necessarily need to be followed. For example, the step of determining the hierarchy and organizational scheme may be performed after the contingency selection/analysis.

As shown, the process begins at step 33, where a region of interest is specified and a buffer zone surrounding the region of interest is identified. The region and its buffer zone should include buses such that each is sufficiently deep to include lower voltage level buses such as those at or below 34 KV. One skilled in the art will readily recognize other lower voltage level buses that may be encompassed by the region and buffer zone. The lower voltage level buses preferably include load bearing buses as well as non-load bearing buses. Load bearing buses are buses that directly connect portions of the electrical power system to real loads such as industrial plants, homes or other power consuming entities or that carry load in the loadflow model of the actual system. Non-load bearing buses are buses that simply act as a transfer point for electrical power within the electrical power system.

The region of interest selection should preferably but not necessarily include independent power producers (IPP), wind arrays, solar arrays and other non-utility or non-Independent System Operator (ISO) entities. These entities are often omitted from a study region because conventional wisdom considers the boundaries between these entities and the utility or ISO to be weak such that problems arising in the entity stay in the entity and problems arising in the utility/ISO similarly do not propagate externally. Thus, separate studies are generally performed of each with merely rudimentary models of the other. The inventors have shown, however, that the root cause of problems in a utility/ISO can reside in these non-utility and non-ISO entities such that control or enhancement should be added in the entity to mitigate significant consequences to both an entity and the utility/ISO of contingencies in either. This implies that the region of interest include the utility/ISO and all entities that lie within it.

Additionally, the buffer zone is preferably selected to be sufficiently large to account for cascading exhaustion of reactive reserves that extend across many directions in the electrical power system. More specifically, the inventors have determined that two or more components dispersed within an electrical power system may interact with one another even if they are distally located from one another. Therefore, the buffer zone is preferably selected such that it does not preclude components in the electrical power system simply because they are geographically dispersed. Accordingly, the buffer zone is selected such that it encompasses as many of these interrelated components as possible. The buffer zone encircling the region of interest is chosen sufficiently large to be able to capture the entire region experiencing voltage instability or voltage collapse for any contingency in the region of interest. Since this voltage instability region is unknown but to be determined (via methods to be described hereinafter), a region that is larger than has ever experienced voltage instability or voltage collapse for contingencies in the region of interest is desirably selected.

Next, in step 34, groups of buses and reactive reserves within the selected region of interest and buffer zone are grouped into "agents." Each agent represents a selected grouping of buses that are supported by a specific set of reactive reserves. The term reactive reserves is any power source or voltage control/reactive supply device in the electrical power system, such as generators 10 or reserves 18, capable of providing reactive power. Then, the agents determined in step 34 are organized in a hierarchy based on the specific generators that support the specific buses in each agent in step 35. The group of buses in an agent defines the agents' voltage instability region.

Figure 4:
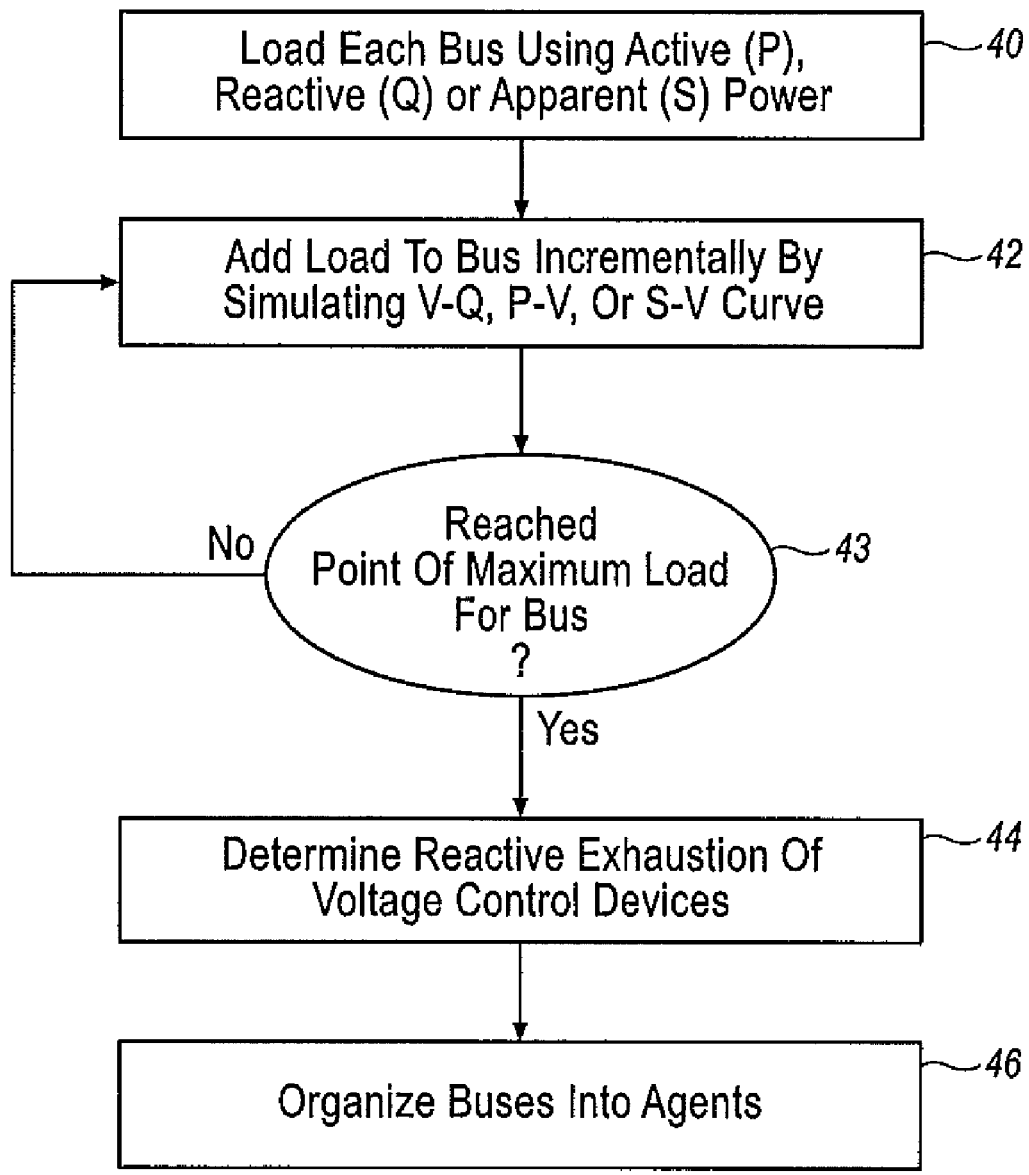
FIG. 4 is a flow chart depicting the identification of agents in FIG. 3.
Figure 5:
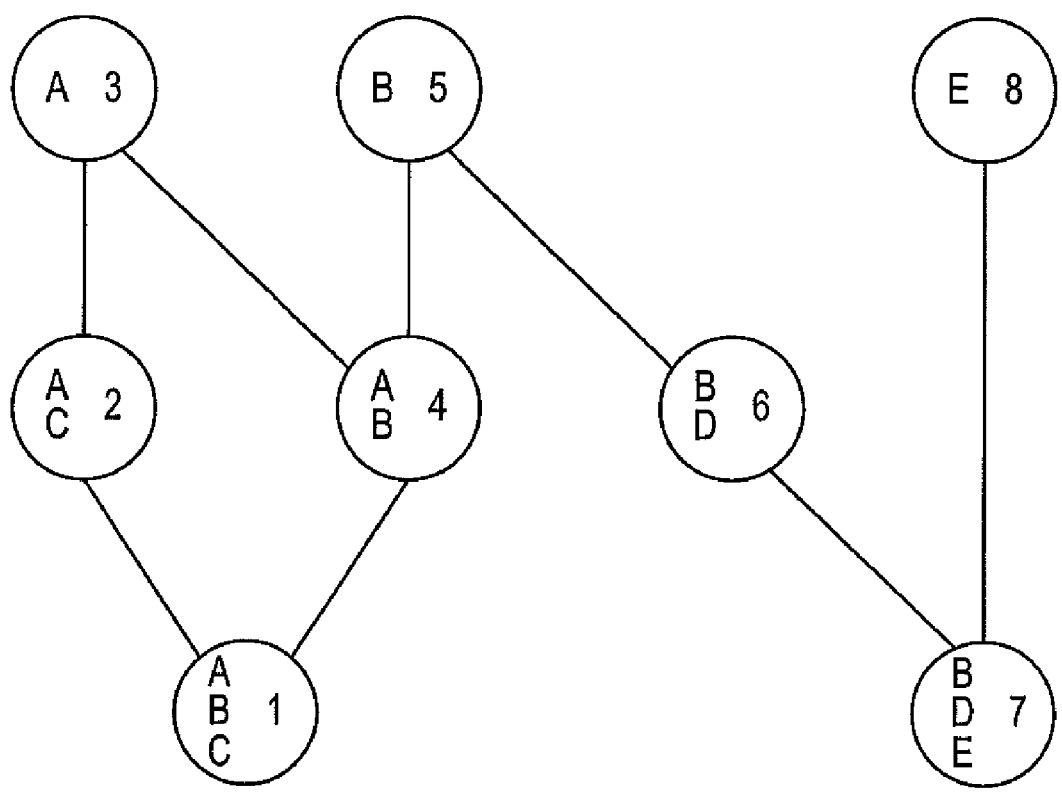
FIG. 5 is a schematic view of an agent and/or subarea hierarchy diagrammed according to an aspect of the present invention.

Steps 34 and 35 are explained in greater detail in FIGS. 4 and 5. Referring first to FIG. 4, the agent selection process of step 34 begins with step 40, where simulated electrical loads are applied to each of the buses in the model of the electrical power system. The buses include not only loading-bearing buses 24 (see FIG. 2), but any other bus within the selected region of interest and buffer zone that provides electrical connection between different components in the electrical power system for purposes of transporting electrical power. As shown in step 42, the simulated loads are preferably applied in an incremental manner to allow for the mathematical computation of artificial loading curves for each incremental load setting. Such loading curves can be a V-Q (reactive power loading) curve, an S-V (apparent power loading) curve and/or a P-V (active power loading) curve. A preferred (but not necessary) implementation is to compute a V-Q curve at every bus in the region of interest that is to be subject to the contingency analysis.

The usually extensive set of curves so generated can be used to identify the weakness of the structure of the system that initiates, causes and experiences voltage instability or voltage collapse for operating stress and contingencies. By example, this description uses V-Q curves. Each V-Q curve is computed by changing the bus model to a generator model, expanding the reactive supply and absorption reactive limits, and incrementally reducing voltage until the first reactive power absorption minimum is found or until the load flow has no solution. The buses where the maximum load terminal point is due to lack of a loadflow solution are often in load bearing agents and often in load bearing agents where load shedding is effective in obtaining solutions after equipment outage impact the reactive reserves in these load bearing agents. This terminal point of the artificial loading curve is defined as the point of maximum load for a specific bus in step 43 and represents a point on the boundary of the operating region where voltage collapse, voltage instability or local blackout would occur.

Alternative means known to those skilled in the art may also be used to find a point of maximum load for each bus and the generators in the region of interest and buffer zone that exhaust the reactive reserves at the point of non solution point or point of maximum load.

Based on these results, the specific reactive reserves such as generators 10 or reserves 18 that are completely depleted at the point of maximum load are identified for each bus in step 44. The reactive reserves identified in this step represent the specific power sources that expend all of their resources to meet the increasing load on each artificially loaded bus. The reactive reserves identified in this step may also be referred to as the reactive reserves for the specific loaded bus.

In step 46, the buses having the same reactive reserves are grouped together into specific agents. An agent is the set of all buses in the region of interest and buffer zone that exhaust the reactive reserves of the exact same set of generators at the non solution point or maximum loading point when a curve, here a V-Q curve, is computed at all buses in the region of interest and buffer zone. This set of buses is called the voltage instability region of the agent. By this way, each agent represents a specific set of buses, or voltage instability region, where stressing each bus of the agent completely depletes the identical generator(s) 10 or reserves 18 when artificially loaded to the point of maximum load. In conjunction with the discussion above, each bus in the agent's voltage instability region has identical reactive reserves and thus the reactive reserves for the agent are defined as this same set. The reactive reserves represent the generators 10 or other voltage control/reactive supply devices that deplete their resources to meet an increasing load on the group of buses of the voltage instability region of the agent. The exhaustion of the reactive reserves (or reactive zone) of the agent can cause voltage instability of that agent.

Referring next to FIG. 5, the hierarchy analysis in step 35 of FIG. 3 is described in greater detail. FIG. 5 shows all of the identified agents as being organized into a hierarchy according to the specific generators 10 or other power sources that act as the reactive reserves for each particular agent. The lower level agents on the hierarchy chain, proximate the load bearing centers, are agents having generators 10 that are subsets of their parent agents (agents closer to the transmission level). The agents typically fall into an organization that begins at a lower voltage level, proximate the load bearing centers, and extends to a higher voltage level at the transmission level. This organization results from the fact that higher voltage level agents (i.e., those that are closer to the transmission level) are supported by more generators 10 and reserves 18. Agents may also fall into an organization that represents the electrical remoteness from the generators 10 relative to their reactive supply.

The organization of agents into a hierarchy provides the ability to identify family lines of agents or buses that are supported by the same reactive reserves. A family line is a child, parent, grandparent, etc., set of agents. A family is composed of several family lines of agents with the same patriarchal parent. The vulnerability region of a family of agents or of a specific patriarchal agent associated with this family is the collection of the voltage instability regions of all agents in all family lines including the patriarchal agent or highest agent in the hierarchy. A P-V curve can be computed by scaling active load at every bus in every agent in every family line of the vulnerability region of a patriarchal agent, which generally exhausts the reactive supply of the patriarchal agent of the family and every agent of the family. A V-Q curve can be computed at a bus in the voltage instability region of each patriarchal agent by adding reactive power load in the voltage instability region of a patriarchal agent to determine the exhausting of the reactive reserve in sequence of agents in all family lines of the family associated with the patriarchal agent and possible sequential instability in each agent in each family line in the family from the child to the parent to the grandparent agents. This is true because the generators protecting a smaller agent to produce a voltage instability must exhaust before the parent agent can exhaust its reactive reserves (since the generators of the smaller agent are a subset of those of the larger agent) to produce voltage instability.

Exhausting the reactive supply of a child will always exhaust the reactive reserves of those same generators in the parent, grandparent, etc., and reactive load added to the child beyond its maximum load point will generally cause the reactive supply of the additional generators belonging to the parent to exhaust their reactive supply. If reactive load continues to be added to any one bus in the patriarch agent of a family of agents, it exhausts the reactive reserves of all of its generators and all of the generators protecting every agent in every family line of the family of agents that emanate from the patriarch agent because the generators protecting agents in a family line emanating from any child are nested and are subsets of the generators protecting the patriarch agent. Contingencies that cause voltage instability occur in the patriarch agents that belong to a subarea and the stress of that contingency is applied from the patriarch down to the child agents.

Voltage instability is initiated from the child agents to the parents, grandparents, etc., because the agents that have the smaller set of generators must exhaust reactive reserves to produce voltage instability before the next larger agent in a family line can exhaust its reactive reserves. This voltage instability propagation is started from child agents simultaneously if there are no mergers of family lines. A merger agent for two family lines is protected by the generator reserves of the next smaller agent in both family lines. If voltage instability is produced in a patriarch agent and is initiated in one of the two family lines of agents, the merged agent's reactive reserves for one family line will have exhausted. Further, if the propagation of voltage instability is to occur beyond the merged agent, voltage instability must start occurring by pulling reactive power out of the agents in the second family line so that voltage instability propagates from its child agent. Reactive power stress is normally added in the patriarchal agents due to the impact of contingencies that lie within the patriarch agents as next discussed.

The scaling of active power load at all buses in the vulnerability region of a patriarchal agent may cause the exhaustion of reactive reserve in each family line of the family associated with the patriarchal agent in the same manner as just described. Possibly, this exhaustion may occur in a different sequence and for the same reasons of accessibility of reactive supply of parents with respect to their children and vice versa. Simulating equipment outages by removing equipment in small steps (similar to a dimmer switch) will exhaust the reactive reserves and presumably cause voltage instability in one or more family lines in one or more families, but with the exception that the reserves in all family lines in any particular family will not necessarily exhaust unless the outage is severe enough. If the outage is severe enough to exhaust the reactive reserves of the patriarchal agent and thus all family lines of the family, this exhaustion (which may be referred to as a sequential exhaustion) may affect ancestral agents and affect a region larger than the vulnerability region of the patriarchal agent. An outage can affect more than one family in this way.

To scale active power, a branch that resides in an agent can be replaced by a source and sink of power flowing on the branch (line or transformer). The source is sited at the bus where the active power is flowing into the branch, and the sink is sited at the bus where active power is flowing out of the branch. The source and sink replace the complex power flows going into and out of the branch. The net sum of the active power source and sink is the active losses on the line, which are generally quite small. The net sum of the reactive power source and sink is the reactive losses on the line. The reactive losses can be huge if surge impedance loading (SIL) occurs. More specifically, these reactive losses cause reactive power to be sucked in from both terminals of a branch experiencing SIL, which occurs due to increased active and reactive power flow on the line. The outage of the branch is equivalent to eliminating the source and sink that represent it. Removing the source at the source bus removes a source of reactive power, which is equivalent to adding reactive load. Removing the sink at the sink bus is like adding a source of reactive power. For a branch with SIL that has reactive flowing into both terminals, the removal of the branch is like adding a reactive load sink at the terminal buses of the branch. The net affect of the active supply at the source bus and the active load at the sink bus is the affect of the active losses, which is negligible within an agent or coherent bus group. This explains how an equivalent reactive loading of the patriarch agents occurs as the network experiences heavy flows due to loading or due to outages of branches with SIL, which produces voltage instability.

In the illustration of FIG. 5, agents 1-8 are shown having generators 10 as their reactive reserves. By example, there are five generators are labeled A-E. Agent 1 (proximate the transmission level) has generators A-C in its reactive reserve zone. Agents 2 and 4 subsets of generators A-C of agent 1 in their reactive reserve zones. Namely, agent 2 has generators A and C in its reactive reserve zone, and agent 4 has generators A and B in its reactive reserve zone. As the reactive reserve zones for agents 2 and 4 are subsets of the reactive reserve zone for agent 1, agents 2 and 4 are children of the parent agent 1. Accordingly, agents 2 and 4 are positioned as children of their parent agent 1. Similarly, agent 3 is a child of agents 2 and 4 as agent 3 has generator A as reactive reserves and generator A is a subset of the reactive reserves of agents 2 and 4. Agent 5 is a child of agent 4 and has generator B in its reactive reserve zone, which generator is a subset of the reactive reserves of agent 4. Note a family line is the set of agents 1, 2 and 3; 1, 4 and 5; 1, 4 and 3; 7, 6 and 5; and 7 and 8, as well as portions of these family lines. Families of agents are composed of all family lines of agents connected to the agent. A family for agent 1 includes agents 1, 2, 3, 4 and 5. A family for agent 4 includes agents 4, 3 and 5. The exhaustion of reactive reserves for an agent implies exhaustion of reactive reserves for its family of agents and possible voltage instability for every agent in the family. It should be noted that any parent may have generators in its reserves that are not in any of its children but this is not shown in the example. The remaining agents 6-8 are organized in a similar fashion to agents 1-5 as will be readily recognized by the skilled artisan.

The hierarchical organizational scheme as described above allows one to determine the specific impact that a particular generator has on a group of buses. For example, as can be seen in FIG. 5, generator A is part of the reactive reserve zone for agents 1-4. Generator B is part of the reactive reserve zone for agents 1 and 4-7. Therefore, one will readily understand that because generators A and B appear in the reactive reserves of many agents, they have a significant impact on the electrical power system as defined in FIG. 5.

Returning now to FIG. 3, the next step in the process is the performance of a comprehensive contingency selection process. The comprehensive contingency selection process in step 36 includes simulating outages on the electrical power system and monitoring the reactions of the generators 10 at each agent or in groups of one or more of the agents. The term contingency or outage is used to indicate taking an electrical component, such as a generator or power line or other component, off-line. The process is a simulation using a computer model of the selected region of interest and buffer zone that represents the electrical characteristics of specific components in the electrical power system and is designed to identify the most critical contingencies that affect the region of interest.

The comprehensive contingency selection process described herein simulates combinations of single contingencies that have the largest percentage of the reactive reserves in N agents exhausted such that a fixed number of double contingencies need to be evaluated by a representative solution process to determine groups of contingencies based on severity that can be used to analyze system performance.

The comprehensive contingency selection process in step 36 of FIG. 3 is further described with reference to FIG. 6. In step 130, a single contingency analysis is first performed. Specifically, single contingencies within the region of interest are identified. Single contingencies include the outage of single generators, single transformers and single power lines. Generally, a list of such contingencies is known and provided beforehand in a file for access by a computer program to apply to the model, but the model can alternatively be analyzed by the computer program to generate a list of such single contingencies. For example, the list of N−1 (single contingencies) could include all so-called "B" contingencies supplied by a utility or ISO in the region of interest and contingencies found in IPP, wind arrays and/or solar arrays in the utility or ISO not supplied by the utility or ISO.

In step 132, the contingencies are simulated as taken offline in the model of the electrical power system. The outage can be simulated to replicate the governor or AGC response for loss of generation contingencies and can have any of the controls enabled. These simulations can involve a series of snapshots that reflect the governor response with no capacitor or underload tap changer control, governor response with tap changer controls enabled, and a governor response with both tap changer and switchable shunt capacitor controls that approximates a dynamic simulation of the contingency. Herein, the contingencies that are solved by these simulations are called solved voltage stability insecure contingencies if they exhaust generators and/or other reactive reserves of a subarea and are otherwise called voltage stability secure contingencies. If these simulations do not obtain a solution, one or more additional processes as discussed in detail hereinafter are used in an attempt to obtain a solution to classify the contingency as unsolved or unstable.

In one embodiment, the first simulation process of performing a governor loadflow, an AGC loadflow and finally the three snapshots associated with a dynamic simulation approximation, which is referred to as a series of snapshots simulation process, is the first of three simulation processes undertaken with the hope of obtaining a loadflow solution. The three simulation processes (series of snapshots, increasing percentage outage and one step boundary case simulation), which encompass a representative solution process, are applied in step 132 to find unsolved and unstable single contingencies as well as solved voltage stability insecure contingencies that exhaust the largest percentage of the reactive reserves of each set of N agents.

Figure 7:
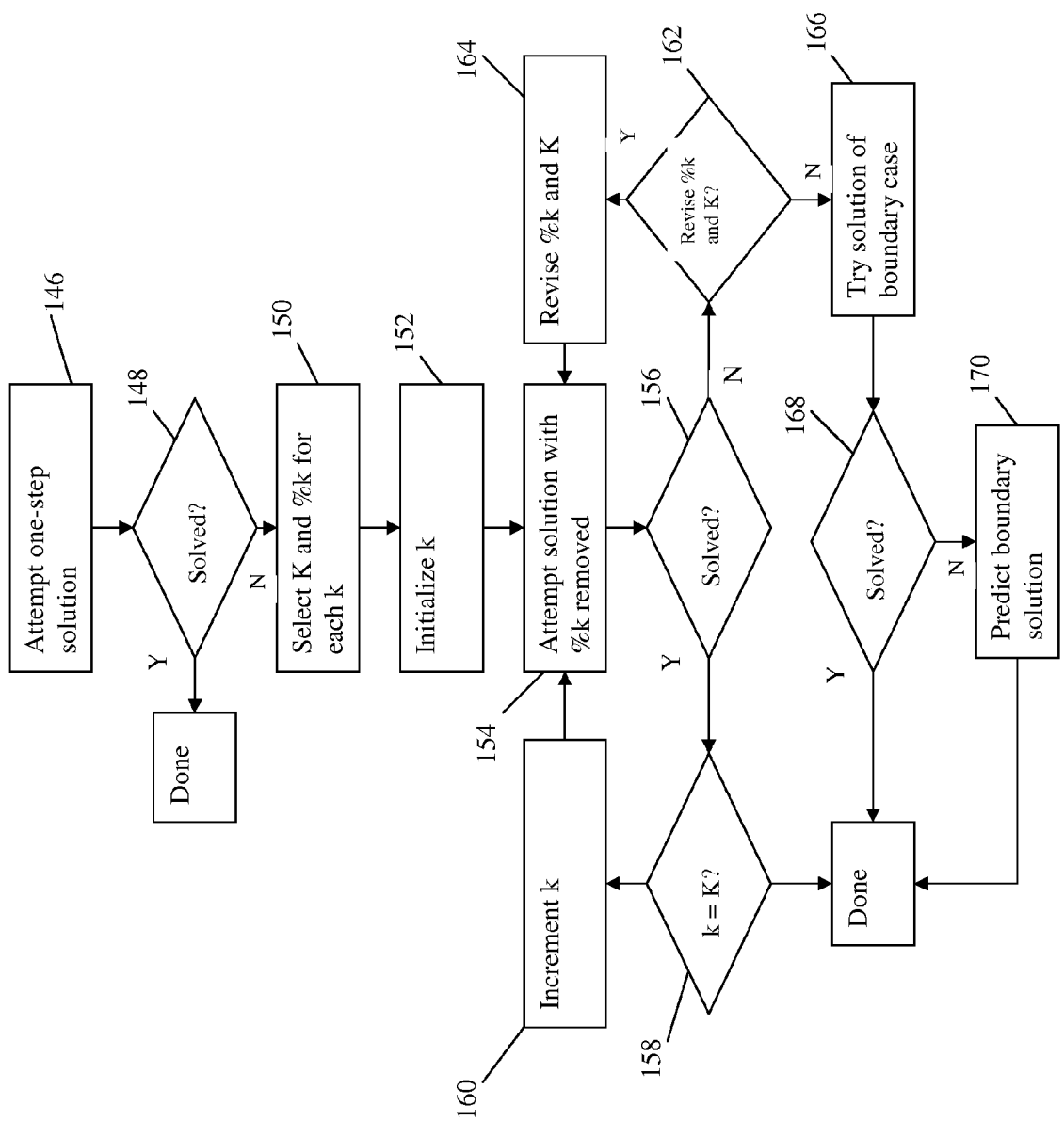
FIG. 7 is a flow chart depicting an representative solution process of FIG. 6.

The representative solution process that encompasses the series of snapshots simulation process and optionally the increasing percentage outage simulation process and the one step boundary case simulation for contingencies unsolved by the series of snapshots simulation process is shown in FIG. 7.

The representative solution process first attempts to remove equipment associated with a contingency by removing all of the equipment associated with the contingency in one step using the series of snapshots simulation in step 146. As mentioned above, if the contingency solves in one-step as indicated by a positive response to the query in step 148, it is called voltage stability insecure if it exhausts the reactive reserves of a set of generators. It is called a voltage stability secure contingency if the contingency does not exhaust the reactive reserves of generators. Collectively, these are called "solved contingencies," and the representative solution obtained is called a "one-step solution." If the contingency is solved, the representative solution process ends for that contingency.

If the contingency does not have a one-step solution, it proceeds through an increasing percentage outage simulation process of removing percentage of the equipment of the outage in a series of steps. As shown in step 150, the process for attempting a solution for a contingency without a one-step solution starts with the selection of a total number K of steps k and a percentage of removal of the contingency in each step $\%_k$ such that $$\sum_{k=1}^{K} \%_k = 100\,\%.$$

Preferably the removal of equipment is done in an adaptively and optimally chosen manner as described herein. That is, in a manner such that the series of snapshots simulation process is embedded in the increasing percentage outage portion of the representative solution process so that one takes out the contingency in one step before adaptively and optimally adjusting the percentage of the contingency removed at each step in the increasing percentage outage simulation with the objective of obtaining a solution at each step and thus obtaining a solution for the contingency. An optional secondary objective is to reduce computation and can be achieved by increasing the percentage of the contingency removed at any step that obtains a solution for the contingency. This is not necessary, however. One may instead perform each simulation sequentially with the incremental percentage of the contingency removed at each step hopefully chosen to obtain solution and thus solution for the contingency.

More specifically with reference to FIG. 7, after the selection of step 150, a series of steps are performed for the first step where k=1 as shown in step 152. Then, as shown in step 154, a one step series of snapshots simulation is attempted to start the increasing percentage outage simulation. If the contingency does not have a solution for the series of snapshots simulation in step 156, the percentage of the equipment removed is optimally and adaptively reduced in a series of choices as represented by steps 162 and 164 until one can remove a percentage of the contingency in this first step that obtains a solution in response to the query of step 156.

There are a number of methods for removing equipment by a percentage outage. The progressive removal of a line or transformer can be approximated by replacing it by a positive and negative injection at the buses it is connected to that correspond to the complex power flow on the line that is progressively reduced to zero. Another method is to replace the branch by one where the series resistance and reactance are multiplied by a factor and the shunt susceptance and conductance are divided by a factor that approaches infinity. Loss of a generator can be simulated by progressively decreasing the active and reactive load and active generation as well as reducing the reactive capability limits on the generator until the generator is replaced by a load bus.

When the contingency solves as indicated by the query of step 156, as long as k is not equal to K in step 158, k is incremented in step 160 such that $\%_k$ moves to a new value. As a result, a solution for a percentage of the equipment removed is then followed by additional steps of removing more and more of the contingency equipment in increasing percentage steps until a step is reached in response to the query of step 156 where a solution is reached with 100% of the contingency removed or where there is no solution. Increasing the percentage of the outage removed at the initial steps 154, 156, 158, 160, 162 and 164 is an attempt to reduce the number of steps needed to remove all of the equipment and obtain a solution. Thereby, reducing the computation required to obtain a solution for any contingency may be tried if one has evidence a solution can be found at a step with a larger percentage removal. That is, if increasing values of $\%_k$ (thus reducing K) can result in the contingency solving, more computationally intensive steps can be avoided.

Note that increasing the percentage removed at successive steps can be ultimately or alternatively be reversed to decrease the percentage of the contingency equipment removed if the representative solution process is to find a solution where all equipment is removed. If there is no solution at some step for the series of snapshots simulation in the removal of the contingency equipment as indicated by the response to the query of step 156, the percentage of the equipment removed can be decreased through steps 162 and 164 and simulated by the series of snapshots simulation in step 154 in an iterative process in hopes of finding a percentage removal at that step where the contingency removal is sufficiently small so as to allow a solution at the previous unsuccessful choices of percentage removal at that step. The decrease in the percentage of the contingency removed is decreased until the series of solutions simulation finds a solution in response to the query of step 156. Once a solution is found for a particular percentage removal step, the algorithm would again start the above adaptive search for the percentage of the equipment that can be removed to obtain a solution at the next step by incrementing k in step 160 unless k=K (that is, the equipment associated with the contingency is entirely removed). A contingency that solves from these steps where k=K in step 158 is called an "unstable" contingency, and its representative solution is called an unstable solution. Such contingencies, like those that have a one-step solution, are also considered to be solved contingencies, but they could be grouped with unsolved contingencies in the groupings discussed later.

As one proceeds to find solutions at successive steps that remove additional contingency equipment, one finds that the percentage of the equipment removed to obtain a solution at the latter steps of the representative solution process decreases. Accordingly, at some point, the response to the query of step 162 is no. This could occur because when the equipment remaining in the network falls below a small threshold, removal of the remainder of the equipment should be triggered. Or, it could occur because changing the value of k does not result in a solution.

This process is preferably continued until a solution is obtained where all of the equipment associated with the contingency is removed, and this solution is called unstable as described above. The solution is called unstable because it required not only a series of snapshots simulation for removal of all of the equipment in one step but also an increasing percentage outage simulation that adaptively and optimally selected percentage removals at each step to allow solution at that step and all steps until a solution for the contingency is found where all equipment is removed. If this optimal and adaptive process of selecting step sizes does not obtain a solution at a step no matter how small the percentage of the equipment removed at that step becomes, the solution at the previous step (i.e., the step before so solution is obtained where a maximum percentage of the load is removed) is called a boundary case solution, and the contingency is called unsolved. A one step series of snapshots can be tried at the boundary case solution as an option and is sometime successful in obtaining a solution.

When the response to the query in step 160 is no, the process reverts back to the iteration of the contingency that solved with the highest percentage of the outage taken in step 166. This case is called a boundary case, and its solution is called the boundary case solution. In step 166, a one-step series of snapshots simulation is optionally tried at the boundary case solution. Essentially, the remaining percentage of the outage is removed in one step. If there is a solution as indicated by the query of step 168, the representative solution so obtained is called an unstable solution of an unstable contingency. If the contingency remains unsolved, however, processing advances from step 168 to step 170 to determine the representative solution for the contingency, which is called an unsolved contingency. Contingencies that are unstable are grouped with unsolved contingencies in the discussion below of system enhancements. However, contingencies with unstable solutions could be grouped with the solved contingencies or could be separately considered when addressing system enhancements. When there is no need to distinguish between the unstable and unsolved contingencies, they are collectively called unsolved contingencies hereinafter.

At step 170, the representative solution for an unsolved contingency is also called a boundary solution, which is a predicted solution based on the boundary case solution. A boundary solution predicts the loadflow conditions that might exist if all of the equipment that remains in the network at the boundary case solution could be removed so as to obtain an actual loadflow solution. This solution can be predicted by finding the multiplicative factor ratio for each loadflow variable that is to be predicted. Specifically, the ratio is:

(change in the variable from the base case to boundary case solution in per unit)/(1−percentage of outage remaining at the boundary case solution as a fraction)

This ratio is then multiplied by the variable to obtain a predicted change in the variable, and the predicted change is added to the variable in the boundary case solution expressed in per unit (pu) to obtain the predicted boundary solution value for the variable. The variable of interest could be voltage, current, active power flow on a branch, reactive power flow on a branch, reactive power out of a generator, etc., as needed for an analysis.

Without being limited by theory, it is desirable to discuss the theoretical underpinnings behind the representative solution process of FIG. 7 before proceeding further. In loadflow analysis, if the loadflow jacobian has zero eigenvalues at a point, no solutions exist or the solutions that exist are not unique from the well-known Implicit Value Theorem. Contingencies that are theoretically unsolvable (have no unique solution or for which no solution exists) produce jacobian eigenvalues that are zero. The conventional Newton-Raphson algorithm will diverge for contingencies that produce eigenvalues below a positive threshold and thus never can determine whether a contingency is unsolvable but only that the small eigenvalues are causing the Newton-Raphson algorithm to diverge. The fact that so many double contingencies (also called N−2 contingencies herein) determined by the comprehensive contingency selection process as discussed in additional detail hereinafter have no solution or cannot be solved by the Newton-Raphson algorithm or a series of snapshots simulation process that uses a Newton-Raphson algorithm is not surprising because the comprehensive contingency selection process described herein uses the solved single contingencies (also called N−1 contingencies) that experience voltage instability in the largest subareas to simulate the combinations of contingencies. The fact that one cannot find a solution by a series of snapshots simulation suggests that a contingency is closer to being unsolvable than contingencies that solve because one knows that (a) an unsolvable contingency produces zero eigenvalues, (b) the Newton-Raphson algorithm does not solve a contingency when the Newton-Raphson jacobian has eigenvalues below a threshold, and (c) the Newton-Raphson algorithm does solve if all of the Newton-Raphson jacobian eigenvalues are above the threshold. The representative solution process is a vastly improved simulation process that obtains solutions for the vast majority of the contingencies that are unsolved by the series of snapshots simulation alone. The increasing percentage outage simulation process of the representative solution process is designed to overcome divergence in the Newton-Raphson algorithm that occurs as the Newton-Raphson jacobian eigenvalues approach zero, which makes the Newton-Raphson algorithm diverge.

As mentioned above, if the series of snapshots simulation, which is a possible first simulation tool of the representative solution process, obtains a solution by removing all of the equipment associated with the contingency in one step, the contingency solution is called voltage stability insecure if it exhausts the reactive reserves of the set of generators that protect a subarea from voltage instability. If the solved contingency does not exhaust the reactive reserves of any potential subarea, then it is called a voltage stability secure contingency. For those contingencies that do not solve in one step, the remainder of the representative solution process is performed.

Specifically, the process attempts to obtain a solution for a contingency that is unsolved by the series of snapshots simulation so as to overcome the divergence of the Newton-Raphson algorithm that is used in each of the series of snapshots simulations. If one finds a solution for a contingency that remains unsolved after the series of snapshots simulation using an increasing percentage outage simulation, one calls the contingency solution unstable because (a) the representative solution process is designed to overcome the divergence of the Newton-Raphson algorithm that occurs when there are Newton-Raphson jacobian eigenvalues for that contingency that are below the threshold that causes divergence of the Newton-Raphson algorithm; and (b) the contingency is closer to being unsolvable with zero eigenvalues than a contingency that solves and produces near zero eigenvalues using the series of snapshots simulation, which itself is called voltage stability insecure as described above. If one cannot obtain a solution for the contingency using the series of snapshots process, the contingency is unsolved for this process as an indication that the jacobian eigenvalues became too small and the norm of the jacobian becomes too large as the solution to the contingency was approached such that the representative solution process could not solve. The contingency being unsolved after this process does not imply that it is unsolvable, but merely acknowledges that all of the efforts to solve it apparently failed because the eigenvalues of the jacobian were too close to zero. For example, and as discussed above, the later simulation processes of the representative process could obtain an unstable solution, and the contingency with an unstable solution is called an unstable contingency.

The representative solutions for the single contingencies are used to determine which multiple contingencies are performed. Specifically, and returning now to FIG. 6, the next step in the comprehensive contingency selection process is selecting those single contingencies that will be used to form multiple contingencies in step 138. Herein, the multiple contingencies are limited to double contingencies, but multiple contingencies involving more than two equipment outages could be incorporated herein.

There are a number of ways of selecting the single contingencies to include in combinations. One method of doing so is to rank the contingencies based on some metric measuring their severity and select only certain contingencies. This could be done using all single contingencies or using only those single contingencies falling into certain categories. Alternatively, all single contingencies or all those falling within a certain category could be used for the combinations without ranking their severity.

A more targeted selection process is described with reference to FIGS. 8 and 9, where the impact or exhaustive factor on the reactive reserves of each agent or each set of N agents is determined for each voltage stability insecure contingency and each unstable contingency. The exhaustion factor can be computed agent by agent and can be used to determine if their exhaustion percentage is small enough on all members of a set of N agents. This check can be carried out for all sets of N agents for each N. This calculation is easier than evaluating the reactive reserves on all sets of N agents for all N. Specifically, the amount of power output from each generator 10 or other reactive reserve 18 caused by the contingency is calculated from the representative solutions. Note that this exemplary process limits the pool of single contingencies to these more severe single contingencies (i.e., it excludes the voltage stability secure contingencies). This is because the more severe unstable and voltage stability insecure single contingencies are likely to result in a large number of computationally-intensive unstable and unsolved double contingencies that provide impact very multi state regions that are initiated in the smallest agents in the family lines of agents that have their reactive reserves fully exhausted by the contingency.

Finding these more severe double contingencies via enumerative evaluation of all double contingencies with 15000 branches and generators would require greater than 110 million contingency evaluations but can be accomplished with relatively few combinations of the more severe single voltage instability insecure and unstable contingencies. Finding all of the more severe single contingencies enables one to find single solved high count contingencies (SSHCC), which are discussed in additional detail hereinafter and can be used to simulate combinations of double contingencies to produce unstable and unsolved double contingencies for a reasonable number of the double contingencies for which it is a component. These SSHCC contingencies are very severe single contingencies that approximate unsolved single contingencies and become unsolved single contingencies if reactive stress is added to the small agents in the family lines of agents whose reactive reserves are exhausted or nearly exhausted by the SSHCC contingency. Finding these contingencies is, in certain implementations, as important to transmission reliability and security as finding unsolved single contingencies. System enhancements to address any of these most severe single contingencies are likely to reduce the severity of double contingencies involving them without the need for analyzing such double contingencies The process depicted in FIG. 8 begins with step 50, where Qgenbase, Qgenoutage, and Qmax are determined. Qgenbase is the base reactive power output of a particular generator 10 or reactive reserve 18. This base reactive power output represents the amount of reactive power that a generator 10 or reactive reserve 18 outputs when no contingency or outage is simulated (i.e., the reactive power output in a conventional base case solution). Qgenoutage is the reactive power output from a generator 10 or reactive reserve 18 in response to a contingency as described above. More specifically, Qgenoutage represents the amount of reactive power output of the generator 10 or reactive reserve 18 in response to a specific contingency. This reactive power output would be obtained from the representative solution for each single contingency described above. Qmax is the maximum reactive power output that a generator 10 or reactive reserve 18 is capable of producing.

In step 52, Qgenbase and Qmax are summed for all generators 10 and reserves 18 for each agent, and Qgenoutage is summed for all generators 10 of each agent for each specific contingency. Using the illustration of FIG. 5 as an example, Qgenbase, Qgenoutage and Qmax are summed for each of the agents 1-8. Agent 1 includes generators A-C. Therefore, Qgenbase, Qgenoutage and Qmax of each of these specific generators are summed to result in one value for each of Qgenbase and Qmax for that agent as well as one value of Qgenoutage for each agent for each specific contingency.

In step 54, reactive remaining exhaustion factors are calculated for each of the agents for a specific contingency. The reactive remaining exhaustion factor is determined according to equation 1 or equation 2 below.

$$\left(\frac{Q\max - QgenOutage}{Q\max - QgenBase}\right) \cdot 100; \text{ or} \qquad (1)$$

$$\left(\frac{Q\max - QgenOutage}{Q\max - QgenBase}\right) \cdot 100 \cdot (QgenOutage - QgenBase); \qquad (2)$$

wherein:
Qmax is a maximum power that can be generated in the reactive reserve zone for each agent;
QgenOutage is power generated by the reactive reserve zone for each agent in response to the single contingency; and QgenBase is a base power output generated by the reactive reserve zone for each agent.

The exhaustion factor for an agent represents the percentage of its base case reactive reserves the particular agent has remaining after being required to provide reactive power in response to the contingency. For example, an exhaustion factor of 0% indicates that the set of voltage control/reactive supply devices for a particular agent were required to expend all of their reactive power resources in response to the contingency and are unable to provide any further reactive power output. Likewise, a reactive remaining exhaustion factor of 100% represents that the voltage control/reactive supply devices for the agent were not required to expend any additional reactive power in response to the contingency. An alternative exhaustion factor for each agent is that computed in equation 1 times the contingency induced reactive power change in MVARS at the generators 10 and reserves 18 for each agent. Other exhaustion factors could be used as will be recognized by the skilled artisan. The exhaustion factors are computed on an agent basis and not on all sets of N agents for all N due to the difficulty in computation.

Once the exhaustion factors are determined in step 54, those single contingencies that may pose a risk when combined with other single contingencies are identified in step 56. Here, a maximum reactive remaining exhaustion factor percentage (X %) of its base case reactive reserves remaining after the contingency and a specific number N of agents are specified. For example, 35% of the reactive reserves may be remaining across a number of three agents. If this reactive remaining exhaustion is less than a predetermined number, X %, then the single contingency is held in a pool for double contingency analysis. A matrix is produced with cells that indicate the number of single contingencies M(Y,N) for each value of N and for different equally spaced discrete values of Y=(100-X) %, the percentage of the reactive reserves of an agent exhausted by the contingency. The cells also indicate the number of double outages that need to be simulated M(M-1)/2 given M=M(Y, N) for a given value of N and a specific discrete value of Y. The cells also indicate the increase in M, denoted $\Delta M(Y,N)$, as the value of Y decreases for any fixed values of N. Another property of the matrix is that for a fixed value of Y, all of the single and double outages for a larger value of N belong to all cells to the left of it in the same row of the matrix. This is obvious by the fact that if three agents will have greater than Y % of their reserves exhausted, there will be two agent sets and single agents with greater than Y % of their reactive reserves exhausted. From these two properties all of the contingencies simulated for a cell are simulated in any cell in the upper right submatrix of that cell.

Figure 9:
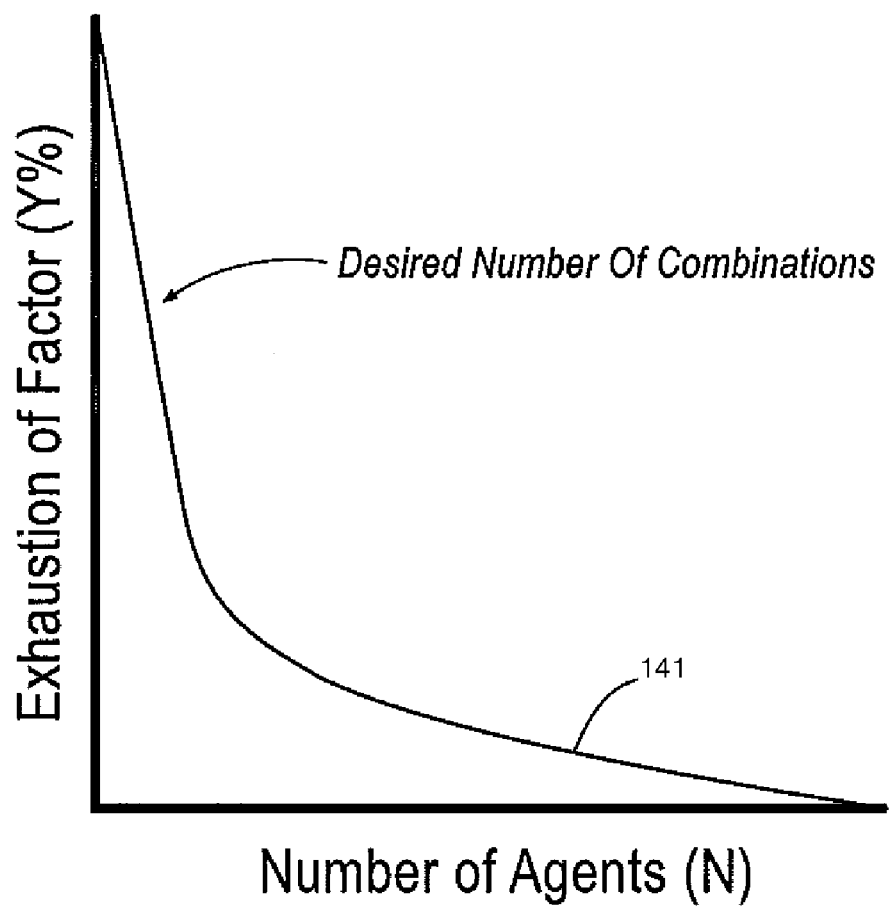
FIG. 9 is a graphical view of a selection algorithm for single contingencies to combine into multiple contingencies based on a number of agents and an exhaustion percentage.

The results of this matrix are illustrated in FIG. 9, where the exponentially decreasing line indicates an approximation to all cells with approximates the same number of double outages to be simulated. As exponentially decreasing lines similar to the ones shown in FIG. 9 approach the origin, the number of outages increases to all of the possible double outages for a region of interest. One decides how many outages one is willing to simulate and then one selects a value of Y and N that specifies a cell on this line. Another feature of this matrix aid in selecting Y and N is that if one selects a value of Y and N on some exponentially decreasing line, simulates all those outages, and finds all of the outages with no solution, one will find in each cell the number of those outages that would be contingencies simulated if that value of Y and N were chosen. As one selects Y and N on different exponentially decreasing lines approaching the origin, in some cases the percentages of the outages that do not solve increase but the percentages of outages that do not solve as one moves along one particular exponentially decreasing line for the same number of outages simulated remain at very similar values. Since Y % represents the severity of an effect and N represents the magnitude of geographic impact, a skilled artisan can adjust the number of agents and percent of reactive reserves remaining to highlight the region of interest.

In FIG. 9, line 141 can be defined as a breaking point as to when a particular subset of single contingencies will be included in double contingency analysis for each value of Y and N along the exponentially decreasing line. In this example, single contingencies falling to the lower left of line 141 would not be considered while contingencies falling to the upper right of line 140 would be considered for double contingency analysis. This procedure uses selected outages that affect one or more than one agents (N>1) in a family line and possibly more than one family. This procedure captures the divide and conquer aspects of how outages cause local blackout, voltage collapse or voltage instability by impacting one or more family lines in one or more families and that one needs only to impact an agent or agents in a family line with small reactive reserves by a very small amount to produce double contingencies that do not solve and can have a large impact on the system.

Figure 6:
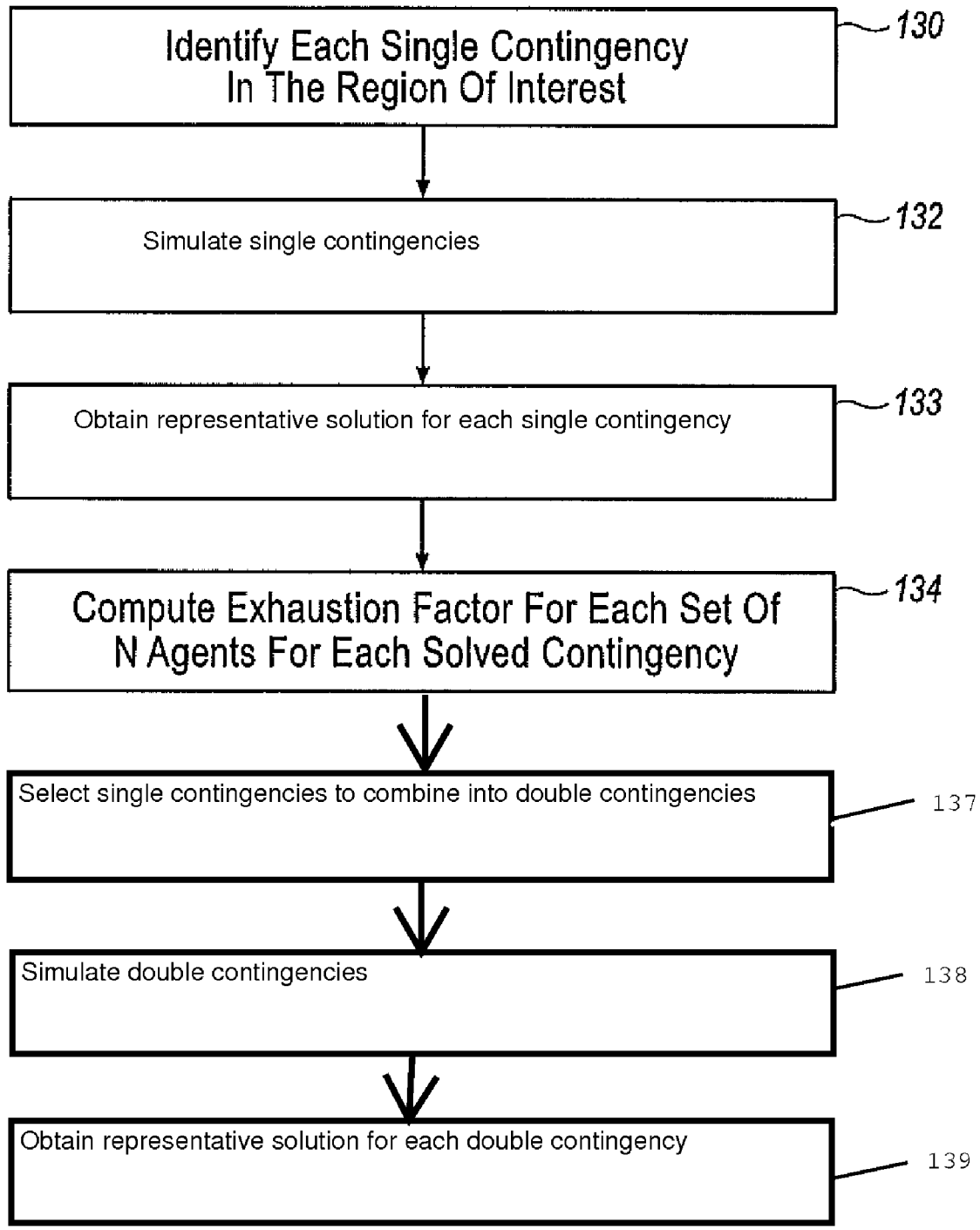
FIG. 6 is a flow chart depicting a contingency selection process of FIG. 3
Figure 8:
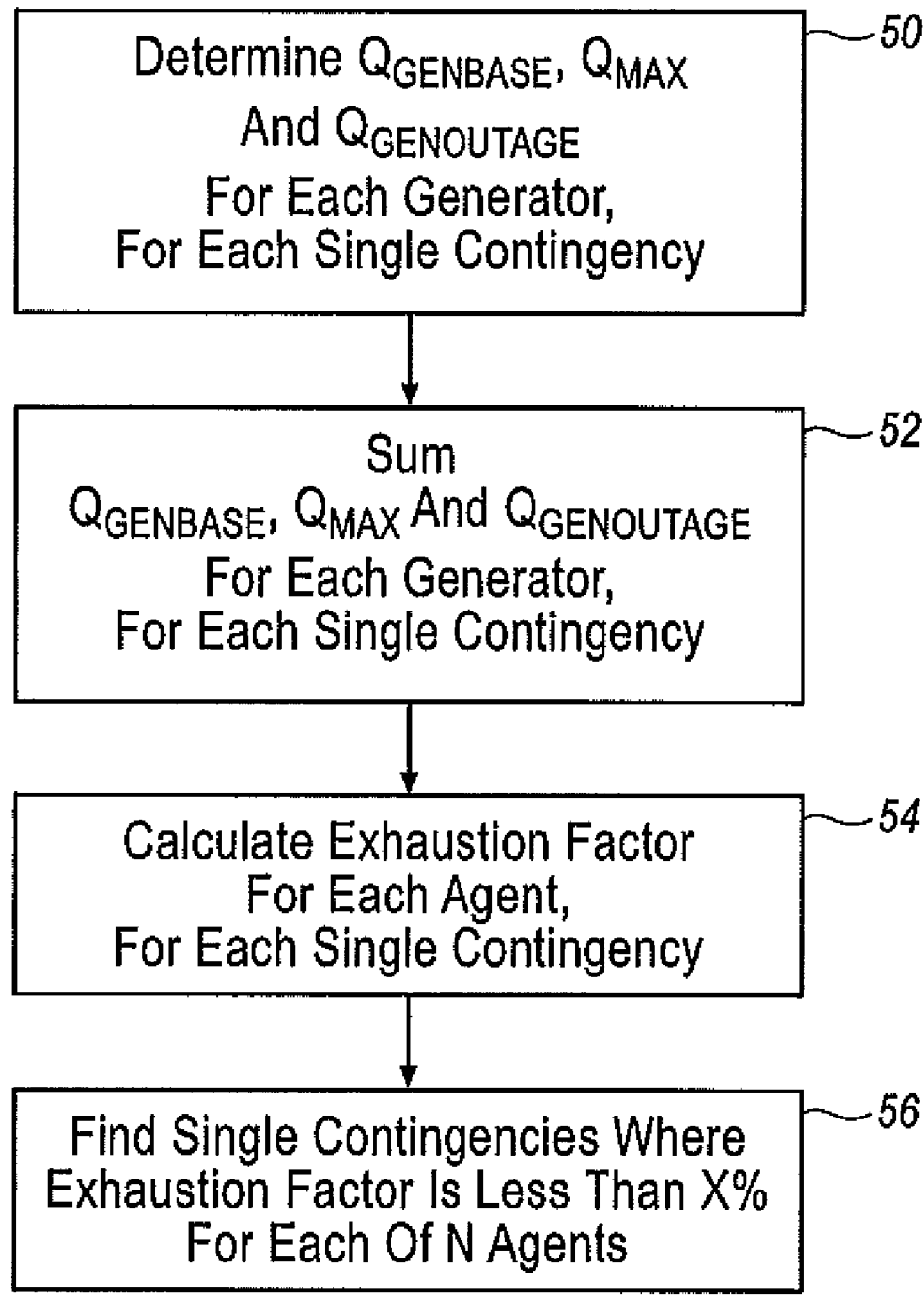
FIG. 8 is a flow chart depicting an exhaustion calculation for agents according to the comprehensive contingency selection and analysis of FIG. 3.

Once the single contingencies satisfying the criteria is set forth above are selected in step 56 of FIG. 8, each is simulated in combination with every other single contingency so selected in step 139 of FIG. 6. This process of double contingency analysis results in M*(M-1)/2 combinations of single contingencies where M is the number of single contingencies that satisfy the criteria and have load flow solutions via the series of snapshots process and yet are voltage stability insecure or via the increasing percentage process such that they are unstable. Note that it is not required that all such combinations be simulated, but it is preferred so as not to miss a potentially critical double contingency. Representative solutions are obtained for the double contingencies in step 140 as described previously with respect to step 134 and FIG. 7. This ends the comprehensive contingency selection and analysis of FIG. 6.

As can be inferred from the foregoing description, the number of unsolved and unstable double contingencies (i.e., those contingencies that are unsolved by the Newton Raphson series of snapshots process) is huge compared to any known alternative contingency selection process. This comprehensive contingency selection uses a representative solution process that obtains a solution for unstable contingencies (i.e., those that have no solution in the series of snapshots process but have a solution in the increasing percentage process) and for unsolved double contingencies (i.e., those that have no solution in the series of snapshots process or in the increasing percentage process but have a predicted solution). The solutions are needed to identify the structure and symptoms that identify the root cause for each unstable and unsolved contingency that would otherwise go undiagnosed. The comprehensive contingency selection is also used to identify SSHCC contingencies discussed in more detail below that give rise to many unsolved and unstable double contingencies. Unsolved and unstable double contingencies that do not involve a SSHCC contingency component can be called individualistic unstable or individualistic unsolved contingencies. SSHCC contingencies and other unsolved and unstable N-1 and N-2 contingencies would remain undetected and unsolved in the absence of the comprehensive contingency selection process and the representative solution process because they do not have a solution using a Newton Raphson algorithm or a series of snapshots solution process.

As described, the selection of N−2 contingencies is generated from a set of N−1 contingencies that can exceed the number of B contingencies provided by a utility. This results in a relatively large number of N−2 contingencies that are the most severe for the system. Accordingly, conventional so-called "C" contingencies provided by a utility or ISO are most likely identified in this process. If they are not identified, such "C" contingencies can be added to the double contingencies analyzed. Alternatively but less desirably, the selection process could be skipped in its entirety for a selected set of N−2 contingencies. The described process, however, is more comprehensive and identifies a proportionally large number of unsolved contingencies, which is explained by the fact that every (solved) voltage stability insecure N−1 contingency that exhausts (all or Y %) of the reactive reserves of at least N agents is simulated in combinations to produce contingencies that are unsolved double contingencies comprised of a common single contingency with possibly ten or greater partner contingencies. Due to the large number of possible contingencies in any system, such a comprehensive strategy is desirable. Without some prediction of the worst double contingencies or the N−1 contingencies that comprise them, one would have a low probability of finding even one of the worst contingencies in a random selection of one double contingency from 112 million (for a 10,000 bus, 15,000 branch study area) and a very low probability of finding all or most of the double contingencies that affect large parts of the system.

Returning again to FIG. 3, once the comprehensive contingency selection is completed, processing advances to step 37, where the contingencies are grouped according to their representative solutions into what is called herein contingency "clusters." This step can optionally include finding a subarea for a contingency either before or after forming the contingency clusters.

First discussed is the designation of a subarea for a contingency, also called the blackout region for the contingency. A breakdown of agents such as that shown in FIG. 5 defines possible subareas for a contingency. The blackout region or subarea for a contingency can easily be computed because all the agents, family lines of agents and families of agents are available at step 35 of FIG. 3. Thus, all potential subareas are pre-computed from knowing all agents, family lines of agents and families of agents that would be in any possible subarea if one specified that a particular set of generators had their reactive reserves exhausted. The subareas also have a child (called a root cause subarea), family lines of subareas that emanate from a root cause subarea and families of subareas comprised of one or more family lines of subareas. The subarea (within one or more families of subareas) for a single or double contingency having a voltage stability insecure solution or an unstable solution is found by determining the generators whose reactive reserves are exhausted using the representative solution for the contingency and then simply matching that generator set with one of the pre-computed subareas. Such subareas could involve agents in different family lines. For those contingencies that are unsolved, the values for generators whose reactive reserves are exhausted are obtained from the representative solution in the form of a boundary solution using the boundary case solution. Note that the subarea for a predicted boundary solution is generally much larger than that that would be determined from the boundary case solution for an unsolved contingency.

Solved voltage stability secure contingencies do not exhaust generators. Thus, these contingencies do not technically have a designated subarea.

The subareas, family line of subareas and families of subareas that complete the identification of the potential subareas are similar to agents, family line of agents and families of agents. The propagation of voltage stability from child agents to patriarch agents via family lines of agents in the root cause subareas and from some child subareas or root cause subareas to the actual subarea through family lines of subareas experiencing voltage instability or voltage collapse for a contingency can be tracked from the ball diagram for subareas similar to FIG. 5. This arrangement aids with diagnostics indicating why voltage instability occurs (loss of generator voltage control, network clogging, or both), where it is initiated (a root cause in a root cause subarea), how it propagated (e.g. loss of generator voltage control through family lines of agents in families of agents to subarea, to family lines of subareas, to possibly families of subareas), and finally where voltage instability or voltage collapse (the specific connected bus cluster for network clogging and the specific subarea for loss of generator voltage control) occurs. However, it is not necessary to specify subareas to perform the within analysis.

Whether or not subareas are designated in step 37 of FIG. 3, contingencies are separated into contingency clusters. The contingencies can be split into two or more contingency clusters. For example, the single contingencies could be grouped into one cluster, while the double contingencies could be grouped into another cluster. In generally, this is a desired grouping because North American Electric Reliability Corporation (NERC) criterion allows and encourages different enhancements and controls for N−1 contingencies than for N−2 contingencies. These clusters could then be further divided. This arrangement is not necessary. For example, contingencies could be grouped into solved or unsolved contingencies whether they are single or double contingencies.

Herein, four clusters of contingencies that may have distinct root causes are described. A first contingency cluster includes unsolved and unstable N−1 contingencies and any single solved high count contingencies (SSHCC). As explained above, a SSHCC contingency is a solved N−1 contingency that is a common component of multiple unsolved or unstable N−2 contingencies. Here, a contingency must belong to at least ten unstable/unsolved N−2 contingencies to be considered a SSHCC contingency, but this number can be changed based on user preference. Some SSHCC contingencies could be common to several hundred N−2 contingencies. Conceptually, by including a SSHCC contingency in this first contingency cluster, the N−2 contingencies that include a common component are grouped in the cluster. Collectively, contingencies belonging to this contingency cluster are considered kind 2 contingencies herein.

A second contingency cluster includes solved voltage stability insecure N−1 contingencies. The contingencies of this cluster are considered kind 3 contingencies.

Unsolved and unstable N−2 contingencies are grouped together to form a third contingency cluster. Preferably, these are N−2 contingencies that are found that do not have a SSHCC contingency. Such N−2 contingencies are called also individualistic N−2 contingencies herein. Alternatively, all unsolved/unstable N−2 contingencies are grouped in this third contingency cluster. The contingencies of this cluster are considered kind 4 contingencies.

Solved voltage stability insecure N−2 contingencies are grouped into a fourth contingency cluster and are considered kind 5 contingencies.

As mentioned above, NERC criterion treats N−1 and N−2 contingencies differently. This is one motivation for the split above. Another motivation is to apply a like analysis to contingencies that have a like level of severity for the system as measured by, for example, the size of the subarea impacted, low voltage violations, thermal limit violations and SIL problems with significant reactive losses and the probability of occurrence. With particular regard to SSHCC contingencies, the probability of occurrence of a SSHCC-induced set of N−2 contingencies can be close to the probability of occurrence of an N−1 contingency or its count times the probability of an N−2 contingency, which both depend on the count (i.e., number of N−2 contingencies associated with that SSHCC contingency) and the probability of the SSHCC contingency but have a risk (probability of occurrence times the load that experiences blackout) that is huge compared to the SSHCC contingency that may not even have a blackout region. The SSHCC-induced unsolved or unstable N−2 contingencies can account for the vast majority of unsolved and unstable N−2 contingencies. A particular N−2 contingency with a component of a SSHCC contingency has a probability of occurrence that may approximate that of an individualistic unsolved or unstable N−2 contingency and has a risk that generally approximates that of an unsolved N−1 contingency because the SSHCC contingency is so severe. Accordingly, a SSHCC contingency is treated as an equivalent unsolved or unstable N−1 contingency herein because it aggravates the same or a different root cause in the same manner as an unsolved or unstable N−1 contingency.

More specifically, the consideration of a SSHCC contingency with unsolved/unstable N−1 contingencies is confirmed by the fact that adding a little stress to a root cause for a SSHCC contingency causes it to become an unstable and then an unsolved contingency as the stress level increases. Furthermore, adding reactive supply to the root cause for all of the unsolved/unstable N−1 contingencies associated with a specific root cause causes most or all of them to become SSHCC contingencies and others to become unstable and then become SSHCC contingencies. A count, discussed hereinafter, for each of these SSHCC contingencies decreases from large numbers to zero, and all of the contingencies become voltage stability insecure contingencies upon further increase in reactive supply to the root cause. The subareas of all of the voltage stability insecure contingencies finally disappear upon even further increase in the reactive supply to the root cause. A SSHCC contingency lies in the root cause that is at the intersection of the smallest subarea and the region (i.e., a root cause bus cluster) that experiences the symptoms of voltage instability or voltage collapse described herein.

The reason that SSHCC contingencies are not grouped with other solved single contingencies (i.e., kind 3 contingencies) herein is that a SSHCC contingency has a different root cause structure than single voltage stability insecure contingencies that have a subarea. The location of the contingencies and the symptoms of voltage instability or voltage collapse are different as discussed in more detail hereinafter. The remedy for a SSHCC contingency as compared to a solved single contingency is different because one would desire to treat a SSHCC contingency as an N−1−1 contingency that requires preventive postured control in its root cause after the first (SSHCC) contingency occurs so that none of the second contingencies produce voltage collapse if one of the contingencies that combined with the first contingency result in an unsolved or unstable contingency (a so-called partner contingency). If one of the partner contingencies of a SSHCC contingency occurred, one would provide preventive control to the root cause for the SSHCC contingency such as preventive or corrective voltage rescheduling, generation dispatch or unit commitment in operations to provide sufficient security margin so that an unsolved or unstable N−2 contingency does not occur if the SSHCC contingency occurs.

Note that unsolved/unstable N−2 contingencies (i.e., kind 4) that have a SSHCC contingency as one of its involved contingencies are not grouped with other such contingencies in the kind 4 contingency cluster. This is because they can be addressed by an enhancement that addresses the shared common single contingency component. If considered kind 4 contingencies, they might need to be addressed individually for control, which would make the control complex and costly to implement. Although this is less desirable than the description herein, it is possible.

Once the grouping of contingencies in step 37 of FIG. 3 is done, all the tools for performing root cause design are available. The first step in performing the root cause design is to identify the root cause as shown in step 38. This is accomplished in part by tabulating diagnostics related to each contingency. In step 39, results from the contingency selection and analysis, contingency cluster grouping and determination of a root cause are used to identify specific remedial actions or modifications (i.e., system enhancements) that may be made to the electrical actual power system to prevent voltage collapse, local blackout or voltage instability in response to contingencies of a particular cluster.

Before discussing the diagnostics used in step 38 and the analysis in step 39, it is desirable to discuss the causes of voltage instability and collapse and the concept of root cause. Generally, an unsolved contingency involves loss of generator voltage control, network clogging or both. That is, one type of root cause is solely due to network clogging where no generator reactive reserve is exhausted in any of the potential subareas of the system and the other is where network clogging is accompanied by loss of generator voltage control that occurs when the reactive reserves of a set of generators protecting a subarea are exhausted and the boundary of one or more of the coherent and connected bus groups within that subarea experience clogging. Loss of generator voltage control alone and loss of generator voltage control combined with network clogging are collectively called loss of control herein.

Voltage instability occurs because numerous generators of the set of agents that protect a subarea are all fully exhausted and lose voltage control because the generator buses become load buses, and because small changes in reactive load or losses cause very significant voltage drops in the subarea. The subareas involved with this loss of generator voltage control are root cause subareas. These root cause subareas are the smallest subareas in a family line of subareas, in a family of subareas and in families of subareas that are contained within the subareas that experience loss of control for the different contingencies of a contingency cluster. Network clogging occurs due to surge impedance loading (SIL) that develops on boundary branches of a group of buses. A branch experiencing SIL (called a SIL branch herein) can suck huge amounts of reactive power from both its terminals to satisfy the reactive losses on the branch. Network clogging in a group of buses due to large active and reactive import into or export out of the group may help also exhaust the reactive reserves of the generators connected to that group. Thus, a root cause is generally surrounded by SIL branches in a boundary surrounding the root cause, consuming huge amounts of reactive power, sucking large reactive flows toward the root cause, and allowing very little or none of it to reach the root cause.

Using a root cause bus cluster diagnosis of a root cause, protective control and/or transmission enhancement is designed to eliminate the SIL on branches connected to or surrounding the root cause produced by the contingency cluster and aggravated by each of the contingencies of the contingency cluster, allow reactive power to flow into and out of the root cause that was prevented by the network clogging on its boundary, eliminate low voltage violations within the root cause, eliminate thermal limit violations on branches near the root cause, and eliminate the subarea that experiences voltage instability or voltage collapse due to exhaustion of reactive reserves on generators protecting one or more root cause subareas for all of the contingencies of a contingency cluster that produce voltage instability or voltage collapse.

An added protective control or transmission enhancement (generally, a system enhancement) prevents contingencies from exhausting the reactive reserves on the coherent bus groups in the agents, family line of agents, families of agents in a subarea, family lines of subareas, and families of subareas. Since the number of contingencies that can produce voltage instability in any of these subareas can be numerous, a system enhancement to address the root cause can cure numerous contingencies. The ability to cure a root cause thus has huge benefits to the system over a potentially very large region. It should be noted that there may be more than one root cause for different kinds or sub-kinds of contingencies and different contingencies within the contingency cluster for each kind. The process for finding every root cause is part of the design guidance. Root cause design is an attempt to provide a simple protective control or network enhancement structure for a number of different contingencies. Root cause design acknowledges that network enhancement can be justified for kind 2 (unsolved/unstable N−1 & SSHCC) contingencies but may not be justified for kind 3 (voltage stability insecure N−1) contingencies. However, the root cause for kind 3 contingencies may be the same as that for kind 2 contingencies. Root cause design addresses the most problematic kinds of contingencies by the most capital intensive and network structural modifying enhancements, observes the benefits of the design on less problematic kinds of contingencies with the same root cause, and designs the enhancement so that all of the benefits for all of the kinds of contingencies and their contingency clusters is obtained by selecting the type, location and size of the enhancement to eliminate the root cause for the most problematic kind of contingencies as well as for other contingency clusters for other kinds of contingencies that share that root cause. Root cause design also acknowledges that there can be more than one root cause for a contingency sub-cluster of contingencies that impact a different set of root cause subareas with a set of symptoms that reside within that root cause subarea. The enhancements for the higher ranked kinds of contingencies and their root causes are embedded in the model for the less highly ranked kinds of contingencies and may totally eliminate the subareas and the symptoms for these less highly ranked kinds of contingencies. In conventional processes, there can be competing and possibly somewhat incompatible control for each specific contingency or group of contingencies based on some "worst contingency." This described process performs design based on root causes for the most severe kinds of contingencies, their subareas, their contingency clusters and their root causes.

Returning again to the identification of a root cause in step 38 and the analysis of its solution in step 39, generally one root cause is found for all of the contingencies in a sub-cluster of contingencies of a particular kind. The order in which root cause design is addressed by preventive control or network enhancement for the different root causes associated with different sub-clusters of contingencies for a particular kind of contingency is based the most severe sub-kind to the least severe contingency sub-kind, where smaller groups of contingencies of a particular kind are said to belong to a particular sub-kind. Accordingly, for example, one would address the root cause for unsolved N−1, then unstable N−1, and finally SSHCC contingency sub-clusters in that order if they have different root causes but address them together if they share a root cause. If these contingency sub-clusters have the same root cause, then an enhancement should address and eliminate the subareas and symptoms for the most problematic sub-kind but assure that the enhancement eliminates subareas and symptoms for the less problematic sub-kinds that share the root cause. The order of analysis for finding root causes for different kinds of contingency clusters and sub-clusters (i.e. contingencies belong to sub-kinds) is described in the same order although in actuality the order of finding root causes is not critical as long as the different root causes are found for each kind and sub-kind of contingency. As described herein, one can detect whether there is a different root cause for different kinds and sub-kinds within a kind of contingency by finding the root causes for all sub-kinds in each kind of contingency and determine whether the root cause for each sub-kind of each kind is unique or whether sub-kinds of a kind share a root cause, or whether kinds and sub-kinds have a combination of the root causes of the sub-kinds of the different kinds of contingencies. This step is desirable as part of the design guidance after the contingency clusters for the different sub-kinds of different kinds of contingencies have been determined.

In the processing described herein, the transmission expansion enhancements or protective controls for root causes for unsolved and unstable N−1 contingencies and SSHCC contingencies are addressed first to assure that one has designed enhancements in each root cause (possibly more than one for these contingencies). One generally considers transmission enhancements such as additional lines, re-conductoring lines, raising voltage rating(s) of lines, series compensation of lines or static VAR compensation (SVC) to address root cause problems of such contingencies. All of these enhancements are capital intensive investments in the transmission grid. Enhancements of the root causes for these kind 2 contingencies often shrink and eliminate the subareas for solved voltage instability insecure contingencies and eliminate the contingency-induced SIL loading problems on the transmission corridors that connect a root cause to a load center. This allows reactive power to enter the root cause from the transmission corridor as well as allow reactive power to flow from the root cause to the load center (that is, it reduces clogging). There can be root causes and root cause subareas located within load centers depending on the system studied.

One may not need to find enhancements or postured controls for the voltage stability insecure N−1 (kind 3) and N−2 (kind 5) contingencies because the enhancements for the kind 2 contingencies or the combinations of enhancements for sub-kinds of kind 2 contingencies often cure the voltage stability problems for these solved N−1 and N−2 contingencies by shrinking and eliminating their subareas and eliminating their symptoms of voltage instability. That is, the design of the enhancement for unsolved/unstable N−1 and SSHCC contingencies involves selecting the type of enhancement, its location and size to provide a remedy for all unsolved/unstable N−1 and SSHCC contingencies that share or have their own root causes, all solved N−1 and N−2 contingencies that share that root cause, and all individualistic unsolved N−2 contingencies that share that root cause.

For this reason and because unsolved/unstable individualistic N−2 contingencies often have different (and unique) root causes than unsolved/unstable N−1 and SSHCC contingencies, unsolved/unstable individualistic N−2 (kind 4) contingencies are next addressed whether the solved contingencies of kind 3 and kind 5 are completely healed or not by the system enhancements for kind 2 contingencies. These unsolved individualistic N−2 contingencies can focus on particular transmission corridors and/or boundaries. It should be noted that these types of contingencies are often caused by clogging alone or by loss of generator voltage control and clogging. Clogging root cause problems can be addressed by SVC in the root cause, for example. To address other clogging problems, such as outages on the transmission paths to a small load center, a generator tripping special protection system (SPS), a SVC or switchable shunt capacitors may be added close to the generator serving the small or isolated portion of a load center. Unit commitment changes are also helpful for clogging problems resulting from kind 4 contingencies because they provide reactive supply to or within a coherent or connected bus cluster. Transmission and distribution upgrades on the boundary of the coherent or connected bus cluster are very common enhancements for clogging. However, because in general there is no restriction in the NERC Planning Criteria on preserving firm transfers or firm loads for unsolved individualistic N−2 contingencies like there are for enhancements to address unsolved N−1 contingencies, enhancements to address unsolved N−2 contingencies more commonly involve load shedding SPS, generator tripping SPS or SVC. The root cause for kind 4 contingencies could also occur in the load center of the study area or in the entities or utilities connected to the transmission corridors serving the study area.

Once the root cause problems associated with kind 2 and kind 4 contingencies are healed, voltage stability insecure N−1 contingencies (kind 3) that are not healed by the enhancements (including protective control) are addressed. Often these solved N−1 contingencies are healed by postured protective control such as voltage rescheduling including adding switchable shunt capacitors as expansion planning solutions. Remedies can also include preventative voltage rescheduling and possibly generation re-dispatch, unit commitment in operation planning or in operations and, if none of these provide a remedy, postured protective load shedding.

Voltage stability insecure N−2 contingencies (kind 5) are the last set of contingencies to be addressed because they have a lower probability of occurrence than kind 3 contingencies. Often the root cause for kind 3 contingencies will be the same as that for kind 5 contingencies. That is, given the enhancement or protective control for root causes of unsolved/unstable N−1 and unsolved/unstable individualistic N−2 contingencies, and those root causes for solved N−1 contingencies that are unique and not healed by the enhancement or postured protective control for the unsolved/unstable N−1, SSHCC and unsolved/unstable individualistic N−2 contingencies, one would next address the root cause for solved N−2 contingencies not healed via that enhancement or protective control. Root causes for such contingencies may be healed by the operation planning-based or network enhancement-based root cause postured protective controls for solved N−1 contingencies. Using operations-based protective control for solved N−2 contingencies, such as generation dispatch, unit commitment, load shedding that interrupts firm transfer or load and voltage rescheduling, provides far more options for solved voltage stability insecure N−2 contingencies.

The root cause determined in step 38 and for which a solution is determined in step 39 is an intersection of a set of root cause subareas and a root cause bus cluster for a contingency cluster of the particular kind. As also mentioned briefly above, the subarea for a contingency is defined by those generators whose reactive reserves are exhausted using the representative solution for the contingency. Note that if a contingency does not exhaust reactive reserves of any generators, then it does not have a subarea. Such a contingency experiences clogging alone without loss of control if it experiences voltage instability, and its root cause is determined by a connected bus cluster whose boundary branches have SIL problems that have large reactive losses served by drawing whatever small reactive power that can be obtained from buses from within the isolated connected bus cluster of the root cause bus cluster buses that are connected to branches that exhibit symptoms (thermal overload and SIL), from buses outside the bus cluster and boundary, and from buses exhibiting low voltage violations for one or more contingencies of the contingency cluster. Note that for clogging, the buses within the root cause bus cluster are not connected to any generators with reactive reserves in the base case. The SIL branches in the boundary obtain the remaining reactive supply for the SIL losses of the boundary from the network connected to the isolated connected bus cluster. Bus clusters and root cause subareas are discussed in more detail below with reference to the description of FIG. 10A.

The determination of root cause of a particular contingency cluster starts with the separation of the contingency cluster into loss of control and clogging contingency sub-clusters because the analysis of root cause varies depending upon the cause of the system stress. More specifically, and without being bound by theory, there are fundamentally at least two different types of root causes for unsolved contingencies in a power system model. One type of root cause is solely due to network clogging where no generator reactive reserve is exhausted in any of the potential subareas of the system and the other is where network clogging is accompanied by loss of generator voltage control that occurs when the reactive reserves of a set of generators protecting a subarea is exhausted and the boundary of the coherent and connected bus groups within that subarea experience clogging. Note that for some systems there can be more than one clogging coherent or connected group that are isolated by the SIL on their boundary branches, which form a barrier to reactive power flow and require enhancement of the coherent or connected bus cluster boundary to overcome the network clogging barrier, restoration of reactive supply within the coherent or connected bus cluster to help overcome the network clogging barrier and restoration of reactive power flow into and out of the coherent or connected bus group.

Figure 10A:
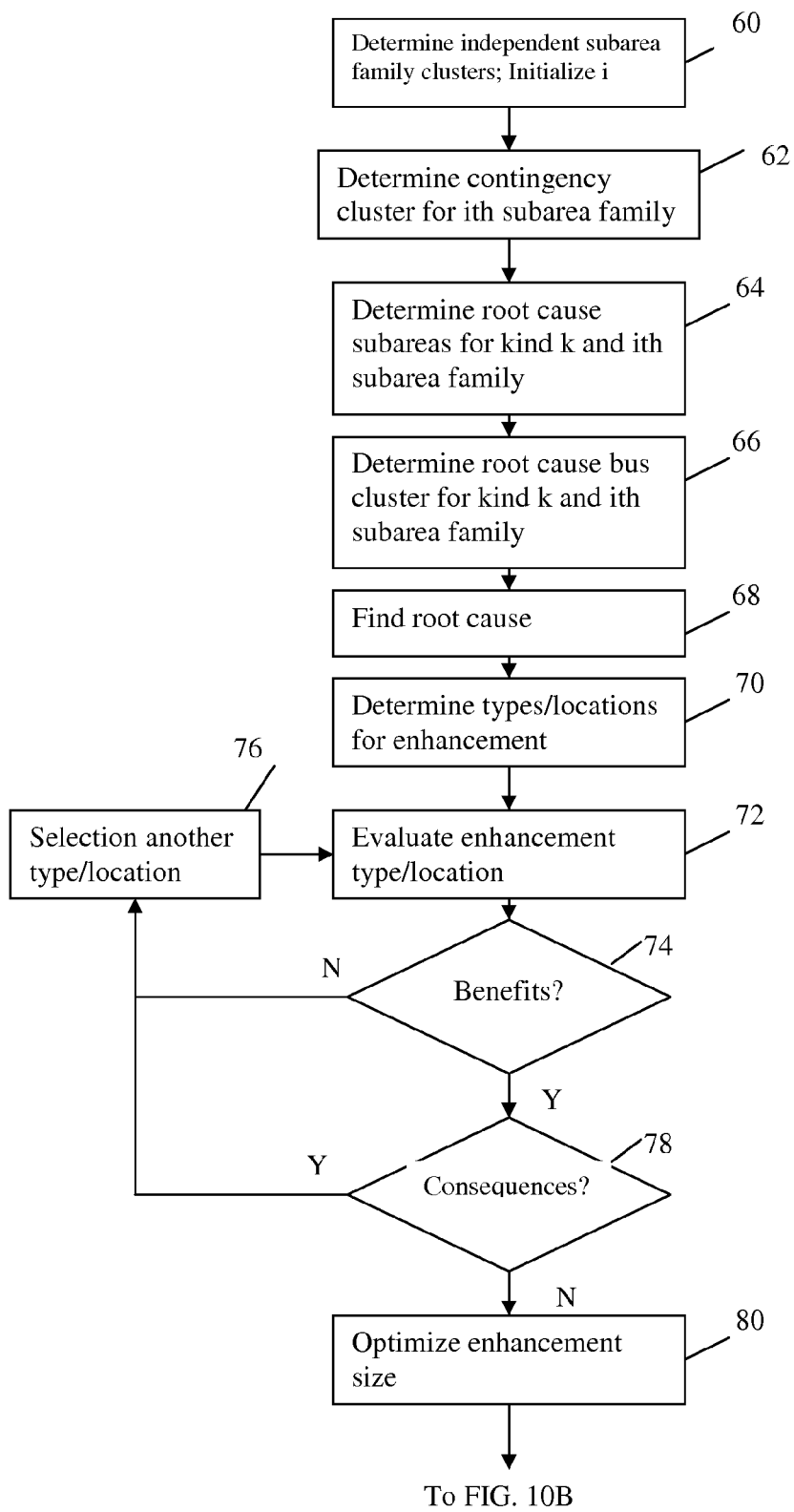
FIG. 10A is a flow chart depicting the identification of a root cause and the determination of a solution for contingencies involving loss of control.
Figure 10B:
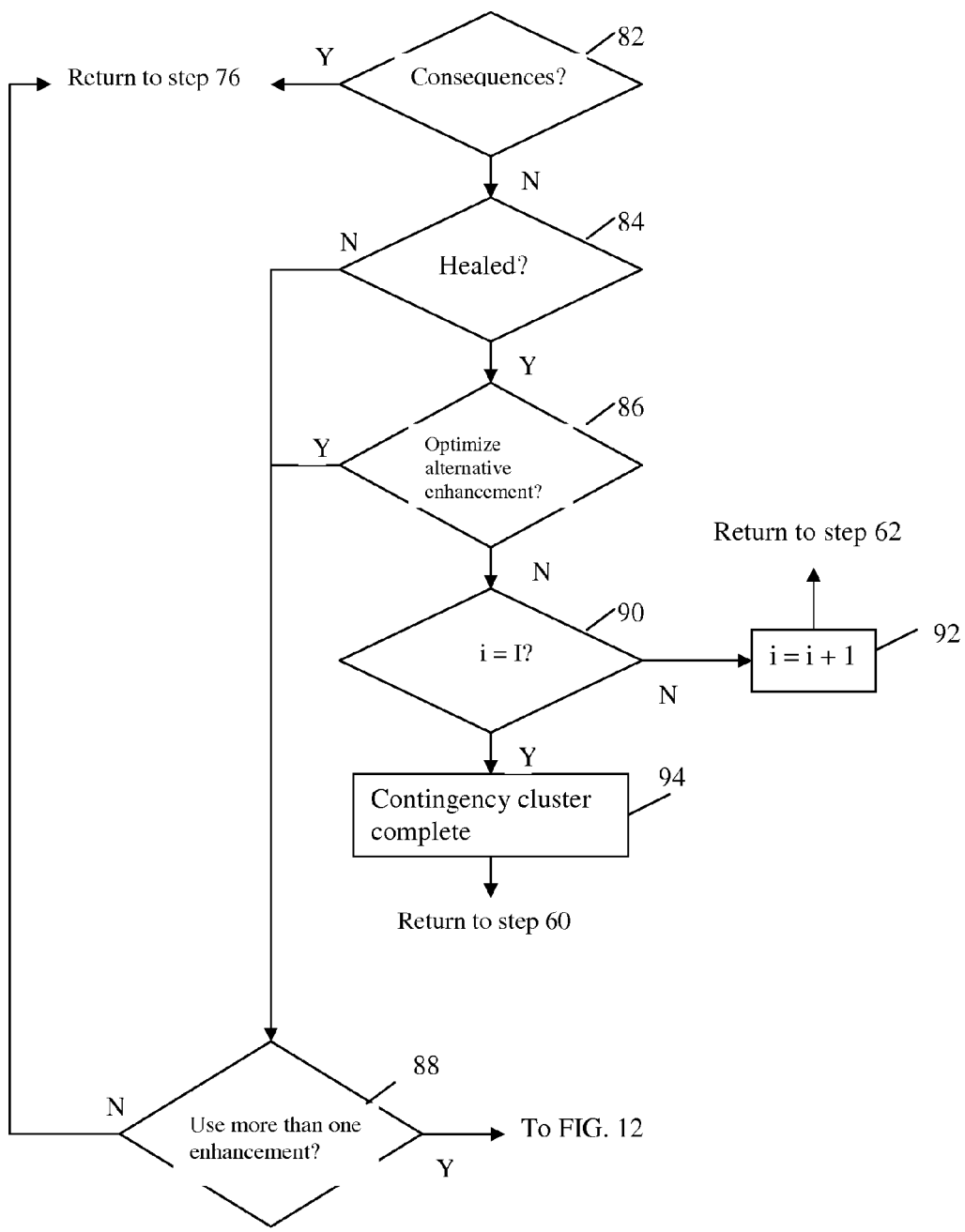
FIG. 10B is a flow chart continuing the flow chart of FIG. 10A.
Figure 11:
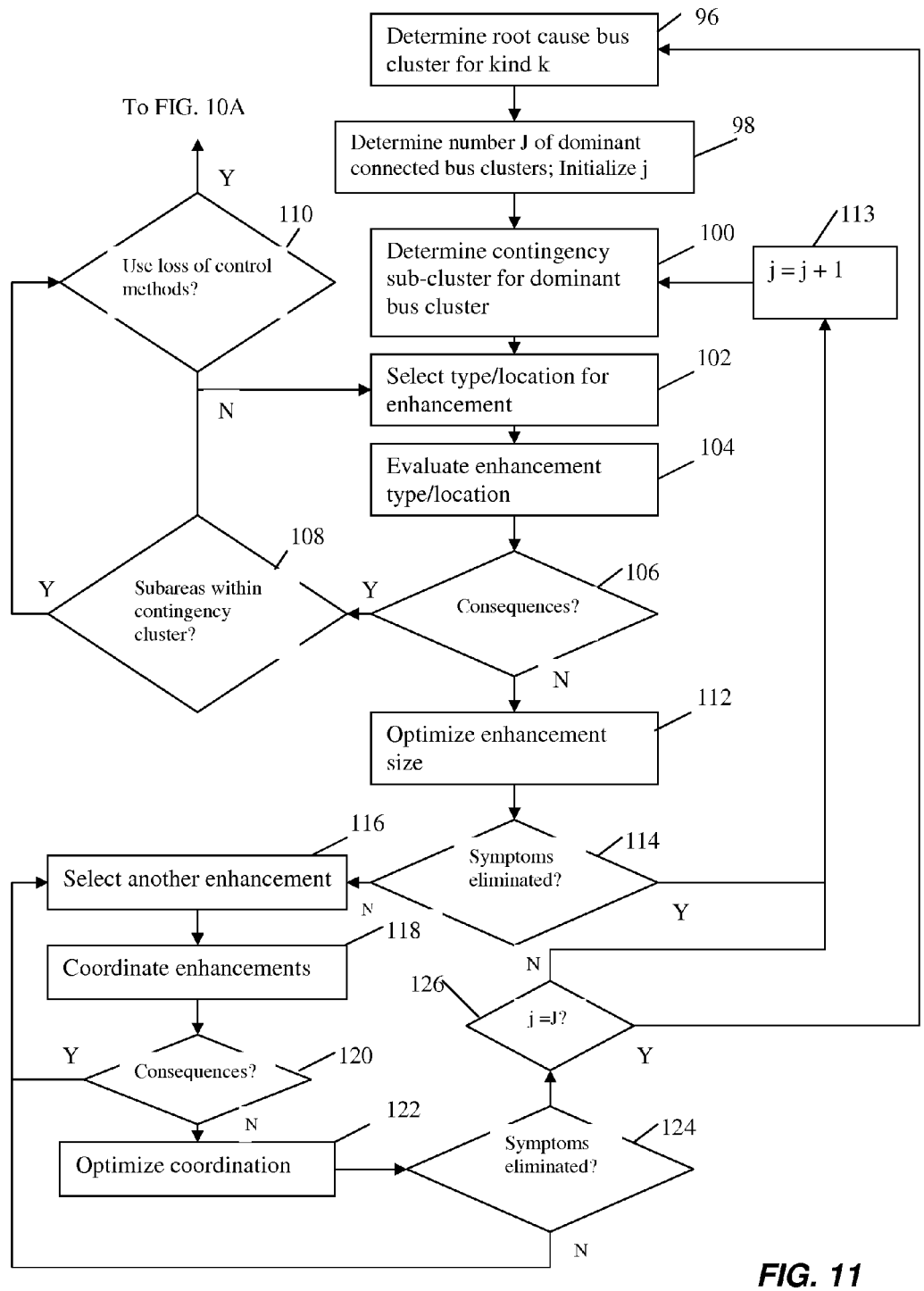
FIG. 11 is a flow chart depicting the identification of a root cause and the determination of a solution for contingencies involving network clogging.

Each sub-cluster for each contingency cluster is addressed in the order described above, that is, first kind 2 contingencies, then kind 4 contingencies followed in order by kind 3 and kind 5 contingencies. The kind 2 contingencies can have sub-kind contingency clusters that need to be treated separately if they have different root causes as mentioned briefly above. The flowchart of FIGS. 10A and 10B is used herein to address sub-clusters involving loss of control, while the flow chart of FIG. 11 is used herein to address sub-clusters involving network clogging. Typically, loss of control contingencies would be addressed before contingencies resulting in network clogging, but this is not necessary.

Starting with FIG. 10A, the number of independent sub-area family clusters (I) for the contingency cluster (here kind k) is determined and ordered in step 60. Also, the first cluster is selected for the remaining steps with an initialized counter i=1. Subareas, when incorporated into embodiments of the invention, can aid in defining how many root causes exist and thus how many solutions are needed. Therefore, subareas and their families are first discussed in additional detail with reference to FIG. 5.

The root cause based design procedure described herein preferably uses subareas (also called blackout regions) rather than agents because it allows a much more complex set of voltage instability problems to be addressed that are not associated with just one subarea comprised of families of agents emanating from one or more patriarch agents to one or more infant agents. The subarea using this definition is the union of the vulnerability regions of the patriarch agents that reside in it and is protected by the reactive reserves on the union of the generator sets that protect the patriarch agents from voltage instability. Using this understanding, root cause subareas, sub-regional subareas, inter-regional subareas and independent subareas can be explained with reference to FIG. 5.

Infant subareas are the smallest subareas that are protected by the fewest generators and contain the fewest buses. They are called root cause subareas because voltage instability or voltage collapse is initiated in therein. The voltage instability initiated in one or more root cause subareas for a specific contingency propagates up the family lines of subareas until a sufficient number of generators with sufficient reactive reserves provides for the reactive losses produced by a contingency in some family line in the direction of propagation of voltage instability. The provision of reactive reserves must occur for each family line of the subarea. Each subarea has several contingencies that require the reactive reserves and generator set of that particular subarea to absorb the reactive losses of the contingencies that are associated with that specific subarea. There are families of subareas that are comprised of family lines of subareas that emanate from a root cause subarea or that emanate from more than one root cause subarea when mergers occur on family lines of subareas emanating from two different root cause subareas. Root cause subareas or any subareas that emanate from one or more root cause subareas are comprised of infant agents, family lines of agents, families of agents and patriarch agents for each family of agents. A root cause subarea is comprised of root cause agents with the fewest generators and smallest voltage instability regions, family lines of agents with progressively larger vulnerability regions and generator sets than the root cause agent it emanates from, and patriarch agents that comprise the generator sets and vulnerability regions of families of agents. Subareas that emanate from the root cause subarea in family lines of subareas have patriarch agents with progressively larger vulnerability regions and sets of generators associated with protecting the patriarch agents from voltage instability.

The family line of subareas is called a sub-regional subarea and the progressively larger subareas in the family line experience cascading voltage instability as the generators protecting their patriarch agents exhaust reactive reserves. As discussed in further detail hereinafter, agents are ranked in a subarea in the order in which they are added to a control region for design of an enhancement or postured control for contingencies that produced voltage instability in that subarea or blackout region. This places the control region agents in a root cause subarea. One can open the lines that connect the buses in the vulnerability region of a patriarch agent to the vulnerability region of the patriarch agent of the next larger subarea to arrest the cascading voltage instability for contingencies that are associated with subareas that are larger than the subarea whose boundary branches are removed. In this case, the protection must be triggered before the propagation of the voltage instability exhausts the reactive reserves of the larger subareas than the subarea where the boundary branches are outaged.

There is a nesting of subareas that have progressively larger sets of buses protected from voltage instability or voltage collapse by progressively larger sets of generators, where the bus sets and generators sets of these nested set of subareas are nested. This implies the patriarch agents of progressively smaller nested subareas are members of the families of the larger patriarchs of the larger subarea they are nested in if the family of subareas emanate from a single root cause subarea. This kind of nesting of subareas is shown in FIG. 5 and describes sub-regional subareas. These sub-regional subareas often track transmission corridors. Inter-regional subareas have more than one root cause subarea with several family lines of subareas emanating from at least one root cause subarea. Family lines of subareas merge with family lines from the same root cause subarea or with different root cause subareas. The root cause and the enhancement or postured control are not necessarily in the smallest agents in one root cause subarea or in multiple root cause subareas. Instead, the root cause is the intersection of connected bus clusters called root cause bus clusters and the root cause subareas.

Based on this description, FIG. 5 can be said to show three root cause subareas, A 3, B 5 and E 8. There are two different patriarch subareas, ABC 1 and BDE 7. The BDE 7 patriarch subarea has two family lines of subareas (BDE 7-E 8 and BDE 7-BD 6-B 5), and ABC 1 has three family lines of subareas (ABC 1-AC 2-A 3 and ABC 1-AB 4-A 3 and ABC 1-AB 4-B5). One could view the two patriarch subareas with three root cause subareas as two teeth crowns (patriarch agents) with three roots (root cause subareas) where one root is shared. Essentially, FIG. 5 demonstrates inter-regional subareas where at least one root cause subarea has family lines of subareas that emanate from it such that at least some of the voltage instability problems are not independent.

Although not shown in FIG. 5, there can also be a starfish tooth that has multiple roots (at least two root cause subareas) with one tooth (crown), which is the body of the starfish. A starfish arrangement corresponds to an inter-regional subarea problem described above. Such large multiple reliability region problems affect one or more reliability regions and generally involve multiple network clogging and loss of voltage control problems that are not independent because the subareas that emanate from multiple root cause subareas merge into one very large set of families of subareas. Root cause subareas and the families of subareas that emanate from them generally track transmission corridors to merge at one load center. These inter-regional subareas appear as a starfish with root cause subareas at the tip of each arm of the starfish, have a root cause for each set of root cause subareas at the tip of the starfish arm, and yet merge at the body of the starfish to produce one very complex problem. The inter-regional subarea problem can be initiated on only one of the arms of the starfish or simultaneously on more than one arm of the starfish if the operating conditions and contingencies occur to make those arms of the starfish produce the blackout for the entire starfish.

Another arrangement involves an independent set of subareas, which are those that emanate from an independent set of root cause subareas and that can have mergers of subareas within the family lines from different root cause subareas as shown in FIG. 5 but cannot have mergers between family lines of subareas emanating from the independent root cause subareas. FIG. 5 does not display independent sets of subareas because the root cause subarea designated as B 5 is shared by both families of subareas.

Because a contingency cluster is the sum all contingencies of a particular kind or sub-kind that cause voltage instability or voltage collapse in one of the set of independent subareas produced for all contingencies, all contingencies of a particular kind or sub-kind of contingency given one independent set of subareas, or a subset of contingencies that have the same set of root cause subareas, are likely to have a common root cause. The addition of reactive reserves prevents voltage instability for every contingency in the contingency cluster that had reactive reserves added for that contingency in a specific root cause subarea. This suggests that adding a transmission enhancement or postured control in the root cause that resides in a particular root cause subarea is a remedy for all contingencies producing voltage instability or voltage collapse for a particular kind or sub-kind of contingency. The root cause for a particular kind or sub-kind of contingency may reside in more than one root cause subarea and may suggest adding reactive reserves in more than root cause subarea than intersects the root cause bus cluster so that reactive reserves is added in every subarea produced by the contingency cluster of contingencies. The mergers of subareas within an independent set of subareas allow one root cause subarea to add reactive reserves in all families of subareas that share that subarea's buses and generators. The exhaustion of reactive reserves occurs from root cause subareas up family lines to produce voltage instability in a family of subareas (that contain the root cause agents) if the contingency is severe. Contingencies that are more severe exhaust the reactive reserves of more subareas in every family line of subareas emanating from the root cause subareas that initially exhaust their reactive reserves.

Referring again to FIG. 10A, the number of independent subarea family clusters (I) for the contingency cluster (here kind k) in step 60 are those families of subareas where, in essence, a root cause subarea is not shared by more than one patriarch subarea. Thereafter, the contingencies of the contingency cluster that implicate the $i^{th}$ family cluster of independent subareas are determined in step 62, and the root cause subareas for the kind k contingency cluster and $i^{th}$ family cluster of subareas are determined in step 64. Because a root cause is the intersection of a set of root cause subareas and a root cause bus cluster, processing next advances to step 66 where a root cause bus cluster for the kind k contingency cluster and the $i^{th}$ family cluster is determined. Note that the root cause bus cluster should be broken down into connected bus clusters, each of which is itself called a connected root cause bus cluster. Of course, there could be only one such connected root cause bus cluster.

Details of determining a root cause bus cluster are next described. A root cause bus cluster indicates a summary of votes (or counts) for buses with or connected to each symptom of a number of symptoms of voltage instability and voltage collapse for each contingency in the contingency cluster. Finding a blackout region or control region of nested agents and placing successive additional control in successively larger agents to obtain a solution and/or increase in reactive reserves is a helpful approach for simple one family lines of agent voltage instability problems but not for multiple family lines of agents from multiple root cause agent problems emanating from one root cause subarea or for multiple root cause agents problems in one or multiple root cause subareas. By using the symptoms of voltage instability and voltage collapse with the determination of the root cause subarea, the root cause that lies within the one or multiple root cause subareas can be found.

The symptoms can include: a) BR GEN (blackout region generator rating), b) BR BUS (blackout region bus rating), c) pre-contingency BR GEN, d) pre-contingency BR BUS, e) buses connected to worse blackhole branches (contingency-induced SIL branches that exhibited SIL in the base case), f) buses connected to new blackhole branches (contingency-induced SIL branches not exhibiting SIL in the base case), g) new voltage limit violation buses (contingency-induced voltage limit violation at a bus that did not have voltage limit violation in the base case), h) worse voltage limit violation buses (contingency induced voltage limit violation at a bus that had voltage limit violation in the base case), i) buses connected to worse thermal overload branches (those branches exhibiting a contingency-induced thermal limit violation that had a thermal violation in the base case), j) buses connected to new thermal overload branches (those branches exhibiting a contingency-induced thermal limit violation that did not have a thermal violation in the base case), and k) buses connected to the contingencies of the contingency cluster whose symptoms are recorded in the current root cause bus cluster. More, fewer or different symptoms can be used.

While any symptoms used can be weighted in a variety of ways in the summary based on the teachings herein, one possible symptom weighting of buses is described herein.

First, every symptom at a bus has a weight of "1" if it is encountered in the representative case for a contingency or in the base case before any contingency occurs, whichever is relevant, except BR GEN and pre-contingency BR GEN. Some buses may have a higher count for a symptom than the number of contingencies if more than one branch connected to the bus exhibits the symptom. For example, one bus may have two branches exhibiting a contingency-induced thermal limit violation that did not have a thermal violation in the base case (symptom j). In this case, that bus would receive a weight (or count) of two for this symptom.

Next, the count for BR GEN and pre-contingency BR GEN equals the number of agents in family lines that have a particular generator/reactive source experiencing exhaustion of its reactive reserves and belong to the blackout region for the contingency. Pre-contingency BR GEN has a count when that generator is also exhausted in the base case. In FIG. 5, for example, if the subarea is the vulnerability region of patriarch agent ABC 1, the BR GEN count for generator A is four since generator A is found in four agents (A 3, AC 2, AB 4 and ABC 1). Even if the subarea was all eight agents in FIG. 5, the BR GEN count for generator A would still be four because patriarch agent ABC 1 includes generator A, and no other agent includes generator A. If the subarea were comprised of patriarch agents AC 2 and AB 4, the BR GEN count for generator A when exhausted by a contingency is three since agents A 3, AC 2 and AB 4 lie in this subarea that has the same root cause agent (A 3), which is the only agent containing generator A that is nested in the subarea defined by agents AC 2 and AB 4. Agents A 3 and B 5 could be root cause agents and root cause subareas, and thus the BR GEN count for generator A in subarea A 3 is 1 and the BR GEN count for generator B in subarea B 5 is 1. It should be noted that parents of root cause agents A 3 and B 5 that are subareas may not be subareas themselves because there are no contingencies that exhaust those subset of generators but the grandparent of these root cause agents (ABC 1) may be a subarea because there are contingencies that exhaust the reactive reserves of generators A, B and C.

The ranking of the frequency count of BR GEN is used to determine a generator set for a root cause subarea and root cause subareas that are impacted by a contingency cluster. The BR GEN symptom has its largest frequency counts for generators in root cause subareas because generators in a root cause subarea contain the generators belonging to the agents of all family lines of agents that emanate up to the contingency blackout region from the root cause subarea for each contingency in the contingency cluster. Progressively smaller BR GEN counts occur for additional generators beyond those of the root cause subarea that protect the parent subareas, that protect the grandparent subareas, that protect the great-grandparent subareas, etc., of a root cause agent because the agent family line for these generators start at the subarea where they are added and progress up the various family lines of agents that the generator is contained in to the contingency blackout region. The generators added to each subsequent subarea in the nested set of subareas in a family line have progressively lower identical counts. The generators in different family lines have different BR GEN counts for each subarea in that family line that are almost always not the same as those counts for generators protecting subareas in another family line of subareas.

The BR BUS counts for root cause subareas have bus groups that have the same count for all of the buses in that root cause subarea. Buses in subareas with the largest counts are the buses in a root cause subarea (or subareas) because all buses of all of the subareas nested in some particular subarea that experiences voltage instability for a contingency get an increase of one count for the contingency. Therefore, the root cause subarea gets counts for all contingencies for which its subarea contains the root cause subarea. The buses that are added for the parent subarea, buses added for a grandparent subarea, and buses added for a great-grandparent subarea all get decreasing counts because they are in the blackout regions for fewer and fewer contingencies. Each progressively larger subarea in a family line of subareas with progressively larger nested set of buses has a lower count on each set of buses added to the subareas in a nested set of subareas because fewer contingencies produce blackout on the additional buses of the larger subarea but progressively more contingencies produce blackout in progressively smaller subareas in the nested set.

That is, and more specifically, BR BUS counts the number of contingency induced/pre-contingency induced subareas that a bus belongs to for a contingency cluster of contingencies. One looks at the contingency induced blackout regions that may have generators that have zero reactive reserves in the pre-contingency case. BR BUS in the pre-contingency case determines nested subareas that have no reactive reserves in the base case. These pre-contingency subareas look like those in FIG. 5 because they are nested. Reactive reserves of these subareas cannot be exhausted by contingencies because their reactive reserves are exhausted in the base case (i.e., the pre-contingency case). Note that the agent structure and potential subarea structure are determined in the base case and are used for the base case and the solution for any contingency to determine its subarea. The subarea exhausted for a contingency has the pre-contingency blackout region as a subset. Current NERC criteria considers the base case (pre-contingency) blackout region problem as a Category A problem, but existing methods result in utilities having trouble monitoring their base case blackout region and linking it to the voltage stability security of the system for contingencies.

The count for every other non-blackout region bus-related symptom has a count equal to or exceeding the number of contingencies in the contingency cluster that produce that symptom at that bus or the buses connected to a branch type symptom. This includes buses associated with each of symptoms e) through k). The count for every branch related symptom has a count for all branches connected to the bus with that symptom summed over all contingencies in the contingency cluster for a particular kind of contingency.

Each root cause bus cluster in certain implementations is a table that includes every bus that has a count for contingencies of a particular kind of contingency/contingency cluster. A root cause bus cluster is subdivided into connected bus clusters that are isolated from one another. For example, the buses that have counts for one or more symptoms in a root cause bus cluster are broken into connected bus clusters that have a connection path between every pair of buses in the connected bus cluster. Certain of the connected bus clusters contain virtually all of the counts that occur for a certain symptom and these are the ones that are focused on here. That is, a connected bus cluster that has the majority of the counts of each symptom (and especially the BR BUS and BR GEN counts) is a potential root cause if the base case voltage stability symptoms and security have been addressed in producing the base case. A root cause is the intersection of the root cause subareas and the root cause bus cluster in one or more connected bus clusters. The description of the structure of a root cause for the contingency cluster of each kind of contingency is given above.

Multiple root causes can be detected for one root cause bus cluster if there are connected bus clusters for subsets of the contingencies of a particular kind (i.e., sub-kinds) with symptoms for the contingencies that reside in that connected bus cluster for a local subarea (no nesting of subareas, which implies the local subarea is the root cause subarea) and for sub-regional subareas (nested family line of subareas). Multiple root causes are very likely for inter-regional subareas made up of multiple root cause subareas and one or more patriarch subareas. If the kind of contingency has sub-kinds, the desirable procedure is to select the contingency cluster, root cause subareas, the root cause bus cluster, the connected bus cluster or clusters, and the root cause or causes for each sub-kind separately. The enhancement type, location and size for the root cause associated with a connected bus cluster is chosen based on that connected bus cluster if the BR BUS and BR GEN for the subareas are associated with one of the root cause subareas because buses in these root cause subareas have the highest counts in the root cause bus cluster due to the very high counts associated with BR-GEN and high counts associated with BR-BUS. Certain of the root cause bus cluster buses in the root cause subarea have a predominant number of symptom counts for symptoms e)-k) at buses within the root cause subareas and the number of counts for each of the symptoms further refine the generators forming the very high count BR-GEN and buses forming BR-BUS to define the root cause buses.

As described above, root cause bus cluster has both symptom information and root cause subarea information that is needed to detect a root cause. One would expect that all of the symptoms cluster around a certain set of buses that reside in the root cause subarea or subareas having the fewest generators where these generators in turn have the smallest reactive reserves. The lack of reserves on generators and the fewest generators in the base case and thus in the root cause subarea make it easy to initiate exhaustion of reactive reserves that propagate in nested agents in the root cause subarea through nested agents in subareas with more generators in addition to those of the root cause subarea. The additional generators of parent subareas have larger reactive reserve levels than the child subarea that shares its generators. A nested set of subareas contain additional generators that progressively have larger levels of base case and contingency reactive reserves because they are progressively closer to the EHV transmission system where many of the largest generators are connected.

It is desirable, but not necessary, to produce a frequency (or heat) map that can display the subset of buses of the connected bus cluster for each symptom or for combinations of symptoms. It would also be desirable to produce a sequence of frequency maps that display the different symptoms sequentially or in increasing combinations that help identify the root cause buses.

Referring again to FIG. 10A, after forming the connected root cause bus cluster(s) in step 33, the root cause is found in step 68. The root cause is the intersection of a dominant root cause subarea or subareas and one or more isolated connected root cause bus clusters. The dominant root cause subarea has higher values for both BR GEN and BR BUS compared to other root cause subareas as mentioned briefly above. Note that once the root causes for each sub-kind and kind of contingency are determined, one has completed the diagnostic steps needed to perform design. Next, the types and locations for network enhancements are determined in step 70, and an enhancement type and location are evaluated in step 72. The types and locations are determined using the map of symptoms.

As explained in more additional detail, steps 70 and 72 involve using a sequence of frequency maps that identify the root cause overlap of the root cause subarea(s) of the specific root cause and the symptoms of the root cause. The sequence of frequency maps considered depends on whether a loss of control or clogging is implicated as discussed in more detail hereinafter.

The sequence of frequency maps for loss of control voltage instability or voltage collapse for a contingency cluster analyzes symptoms to understand how to detect the root cause for loss of control contingency clusters.

First, BR GEN buses with a huge count or ranking in each connected bus cluster that has a high total ranking for the BR GEN symptom in that connected bus cluster define the root cause subarea or subareas in which the root cause is embedded. The root cause subarea can be identified from the ball diagram for subareas as those subareas connected to the star for a particular contingency cluster if the generators found do not bring to mind the exact root cause subarea. There can be more than one root cause subarea, and the generators with huge counts for a contingency cluster would belong to both root cause subareas. Usually there is a dominant root cause subarea that has the highest BR-GEN counts. The largest BR-GEN counts may be associated with root cause agents in root cause subareas that experience voltage instability for contingencies in the contingency cluster.

Second, the buses with highest BR BUS counts for a contingency cluster indicate the buses in each connected bus cluster with the high BR GEN count above define the root cause agents in the root cause subarea or subareas where voltage instability is initiated for the contingency cluster.

Third, the map of BR GEN and BR BUS for each connected bus cluster can be show buses that can be in the root cause subarea or subareas. SVC enhancements at buses in such a map that lie within this root cause are most effective in healing the root cause and thus solve unsolved and unstable contingencies to produce SSHCC contingencies, that in turn become voltage stability insecure contingencies with a smaller subarea, that finally become voltage stability secure contingencies with no subarea as the size of the SVC is increased. Since the buses can be outside the utility/ISO for which the study is performed, one would site enhancements at lower voltage rating buses that are directly connected to the utility/ISO EHV system that reside in the root cause subarea. The map helps find those buses. The root cause is at the intersection of the root cause agents in root cause subareas or in the root cause subareas and its intersection with symptoms described below.

Fourth, the map containing worse blackhole branches can be shown alone and together with the map of BR GEN and BR BUS buses. The buses connected to SIL branches supply large amounts of reactive power to both terminals to supply the large reactive losses on a SIL branch. The worse blackhole branches are those where SIL occurs for the largest number of contingencies in the contingency cluster and have SIL on the branch in the base case loadflow. A new blackhole branch table provides additional branches that do not have SIL in the base case but have SIL for contingencies in the contingency cluster. The SIL losses on the new blackhole branches are far less than those for the worse blackhole branches. A table can indicate the reactive power flow into both terminals and the reactive losses for each contingency that produces a worse blackhole count. The reactive losses can be ranked on the contingencies in the contingency cluster. The worse blackhole branches can be ranked on reactive losses. The map indicates why the loss of control stability problem exists for the contingency cluster since it indicates blackhole branches in the root cause bus cluster that surround the root cause for unsolved, unstable or SSHCC contingencies. Namely, reactive losses make it impossible to obtain reactive power from outside the root cause or transport reactive power across the root cause boundary branches in either direction. The unsolved, unstable and SSHCC contingencies are within the boundary of the root cause, the buses in the root cause experience low voltage violations, and branches in the boundary and within the root cause experience thermal violations. The root causes for solved voltage stability insecure contingencies have contingencies in the boundary or outside the root cause boundary in the loadcenter boundary or on major transmission paths into the loadcenter that place stress on a root cause. The reactive losses on the root cause boundary branches for the solved voltage stability insecure contingency cluster are less and extend further from the root cause buses. There are far fewer low voltage and thermal overload problems for solved voltage instability insecure contingencies that have a subarea. The BR BUS and BR GEN symptoms of the solved voltage instability insecure contingency cluster show the root cause agents in root cause subareas for these solved voltage stability insecure contingencies that have smaller counts, fewer generators and fewer buses than unsolved, unstable or SSHCC contingencies. Enhancements on these boundary branches with worse and new blackhole branches can be effective for solved voltage stability insecure contingencies but may not necessarily be effective for unsolved or unstable N–1 and N–2 contingencies.

Fifth, maps containing contingency buses, the buses associated with thermal overload branch violations and buses associated with low voltage limit violations should also confirm the root cause location for the contingency cluster. The root cause should lie in the center of all the symptoms whether from root cause subareas buses or from contingency buses, thermal overload buses and low voltage buses.

Sixth, the expansion planning enhancements for N–1 contingencies cannot modify load or transfers and thus can be additional lines, upgrading voltage ratings of lines, re-conductoring lines, series compensation of lines and adding SVC. The postured control enhancements can be postured voltage rescheduling, addition of switchable shunt capacitors near root cause subarea generators or both. The expansion planning postured control for N–2 contingencies are often SPS generator tripping or SPS loadshedding that can modify transfers or load. Active rescheduling and assignment of must-run generators for unit commitment are possible postured controls for N–2 contingencies. Voltage rescheduling with switchable shunt capacitors or without switchable shunt capacitor are also possible postured controls for N–2 contingencies and are lower in cost in general than active rescheduling or unit commitment that could be implemented in the operation planning time frame. The advanced voltage control implemented in operations can be used to heal N–1 and N–2 contingencies that develop in an operations time frame.

The sequence of maps for identifying a clogging voltage instability/collapse root cause are developed identically using the first through fourth points above. The clogging voltage instability has no subareas/blackout region buses or generators. Thus, there are no BR BUS or BR GEN symptoms. As a result, the subsequent sequence of maps would be as follows.

First, a map showing the worse blackhole branch buses ranking in the root cause bus cluster finds the branches with the largest contingency count in terms of having a SIL problem. The map can indicate the precise contingencies that produce a SIL problem on a branch, the reactive losses before the contingency and after the contingency, and the reactive injection into both terminals that generally accommodate a SIL problem. These blackholes on the boundary transmission paths into the clogging root cause make it difficult to transport reactive power to the clogging root cause set of buses.

Second, the clogging root cause buses generally lie within a boundary of SIL branches that can be observed on a frequency map that has just SIL branches, then SIL branches and low voltage buses, and finally SIL branches and thermal overloads as a sequence of maps. The thermal and low voltage buses lie in the root cause.

Third, a transmission enhancement for clogging root cause can be a SVC at a low voltage bus within the root cause loadcenter or can be transmission enhancements of the SIL boundary branches such as adding lines, re-conductoring lines, raising voltage ratings on lines that serve the root cause so that even after contingencies there is a non clogged path to the loadcenter. Most clogging root causes are for such weak transmission systems that postured control is generally not considered. SPS loadshedding or SPS generator tripping can be used to address unsolved or unstable N−2 contingencies that result in clogging.

Most broadly stated, in design optimization the first choice is to order the possible enhancement types for the loss of control or clogging root cause. Then, the enhancement type can be selected based on the ordering and the location based on the root cause knowledge obtained from the root cause identification. Several sizes for the enhancement can be selected for a particular enhancement type and each location to find a size that is most effective, produces the highest reliability and the greatest voltage stability security by determining if the unsolved contingencies are solved, the subarea for each loss of control contingency is eliminated and the symptoms in the root cause bus cluster are eliminated given each particular size for each location given a particular type. After the size is optimized, the location for the enhancement is optimized by a similar assessment of the optimized size enhancement for each location. The size and location are selected until these conditions are met or until it is determined that they can not met by repeating the selection of size and location for the enhancement option. If the criteria cannot be met given a specific enhancement type, another enhancement type is tried, including different sizes and locations, in an attempt to meet the criteria.

Note that the optimized design process may not seek just one design option that meets the criteria and may proceed through enhancement type, location and size optimization for a sublist of the ordered design options or all design options given a specific kind of contingency cluster and root cause.

More specifically, results of the evaluation of the enhancement are checked in steps 74 and 78. Specifically, whether there are benefits is assessed in step 74. Benefits include, for example, reduced count of each symptom and the severity of symptoms, shrinkage of blackout regions for contingencies, solutions for previously unsolved and unstable contingencies, etc. If there are no benefits, another type of system enhancement and/or location for the system enhancement is selected in step 76, and the new enhancement is evaluated in step 72. In contrast, if there are benefits to the enhancement in response to the query of step 74, processing advances to step 78 where it is queried whether there are adverse consequences to the enhancement. Adverse consequences would include, for example, increased count of each symptom and an increased severity of symptoms, increased number of buses in blackout regions and number of generators protecting them, change of a voltage stability insecure contingency to a SSHCC contingency, an unstable contingency or an unsolved contingency, etc. If there are adverse consequences that can be explained by observing the root cause, another type of system enhancement and/or location for the system enhancement is selected in step 76, and the new enhancement is evaluated in step 72. Various locations are tried for an enhancement type before trying another type. Note that in FIG. 10A, the locations and types are optimized for some given size and then the size is optimized. This is in contrast to the general description above where size is optimized for a type for each location to obtain the best size and location for a particular type and then the type is optimized once size and location are optimized. The benefits and consequences would be similar in that procedure as they are in FIG. 10A.

If there are benefits and no adverse consequences to a proposed enhancement location and type, the size of the proposed enhancement is optimized in step 80 so as to maximize the benefits. Processing then advances to FIG. 10B. Similar to step 78, next is a query in step 82 as to whether there are adverse consequences to the optimized design for the given enhancement type, location and size. If there are consequences, processing returns to step 76 to select another type of enhancement and/or location for the enhancement for analysis. If there are no adverse consequences in response to the query of step 82, the next query in step 84 is whether the optimized size achieves complete healing.

If the optimized size does not achieve complete healing, a query is made in step 88 as to whether to use more than one enhancement for the dominant root cause or to use more than one dominant root cause enhancement for the ith subarea family for kind k or a sub-kind of kind k. If the response is no, processing returns to step 76 in an attempt to find one enhancement that will completely heal the root cause. If the response is yes, the processing described hereinafter with respect to FIG. 12 begins.

If the optimized size achieves complete healing in response to the query of step 84, processing advances to step 86. Step 86 is a query as to whether an alternative type, size or location of system enhancement is to be optimized. If an alternative type, size or location of system enhancement is to be optimized, processing advances to step 88. If not, processing advances to step 90. Note that the information on root cause can be used to determine alternative type, locations and sizes of enhancements. A number of different types, locations for each type, and sizes for each location and type of enhancement are deemed credible given the SIL losses on the branches of the boundary of the connected bus cluster or coherent bus group, its proximity to the connected bus cluster or coherent bus group, the kind of contingency cluster and whether the contingencies lie inside or outside the connected bus cluster, the number and severity of low voltage and thermal overload symptoms in the connected bus cluster or coherent bus group, the number and severity of the contingencies in the contingency cluster and their locations with respect to the boundary of the connected bus cluster that hinder or make it impossible for reactive power to flow across the immediate or extended boundary of the connected bus cluster/coherent bus group.

Stated more generally, steps 72-78 try an enhancement type and location repetitively. The steps address benefits such as eliminating all or some of the subareas and symptoms for a cluster of contingencies between the base case and each enhancement/location combination case. The benefits and consequences are understood by comparing the number of unsolved contingencies, the number of unstable contingencies, the number of SSHCC contingencies, the number of voltage stability insecure single contingencies, the number of voltage instability insecure double contingencies, the number of buses in the patriarch subarea for each contingency in the cluster, and the number and severity of each of the symptoms that are embedded in the root cause bus cluster for the base case and for any enhancement case. These comparisons are used in steps 80-88 to optimize the size of each type and location of enhancement that seems successful in steps 72-78 for an enhancement of a particular size. This thus allows a determination of whether complete healing occurs by observing that the family of subareas is completely eliminated by eliminating the subarea for every contingency in the contingency cluster through providing reactive reserves in each subarea after the contingencies that produce it have occurred and all the symptoms in the root cause bus cluster for every contingency in the contingency cluster disappear by comparing the enhancement case and the base case on these metrics in step 84 with no consequences as checked in step 82. If the healing is not complete in step 84 or consequences exist in step 82, one proceeds back to step 72 through step 88 and repeats the loop until determining that complete healing is not possible based on optimizing type, location and size of one enhancement. Then, complete healing is attempted with two enhancements in two dominant root causes.

In step 90, a query is made as to whether all independent subarea families have been considered. If not, the counter i is incremented in step 92, and processing starts at step 62 for the next subarea family for the current contingency cluster (kind k) being analyzed. In contrast, if all subarea families have been considered (that is, i=I), the current contingency cluster is completed. The next contingency cluster is selected in step 94, and the processing of FIGS. 10A and 10B is repeated for the next contingency cluster after the enhancement or postured control design for the previous contingency clusters are embedded in the loadflow base case scenario. For example, after kind 2 contingencies are analyzed and resolved, kind 4 contingencies are analyzed. Note that one may simultaneously study several base case scenarios for an enhancement, several enhancements for a scenario, or multiple scenarios and several enhancements for each scenario simultaneously. Performing design and comparison simultaneously rather than one at a time is a particular benefit of certain embodiments of the invention over existing technology. Here the comparisons are automatically conducted as part of the design process.

When sub-clusters for a particular contingency cluster involve only network clogging, such contingencies are addressed using the flow chart of FIG. 11. The processing of FIG. 11 could be performed before, after or concurrently with the processing of FIGS. 10A and 10B, but it is preferable that the processing of FIG. 11 be performed after all contingency clusters involving loss of control are considered. In FIG. 11, the root cause bus cluster for a contingency cluster (here, kind k) is determined in step 96. Note that the design is based solely on the connected bus clusters of the root cause bus cluster that has no BR BUS or BR GEN columns for contingencies because there are no subareas when only network clogging exists. After this, a number J of dominant connected bus clusters is determined in step 98. A counter j is also initialized so that the remaining steps are performed for the first dominant bus cluster. After the first connected bus cluster (and thus its clogging problem) is addressed, processing addresses the next most dominant connected bus cluster clogging problem.

Step 100 involves determining the contingency sub-cluster for the dominant connected bus cluster. Then, using a map of symptoms for the contingency sub-cluster, the type and location of enhancement is selected for the first sub-cluster in step 102. The symptoms considered are the worse blackhole, the new blackhole, the worse thermal, the new thermal, the worse low voltage and the new low voltage as well as the contingency symptoms that have a count at buses connected to each contingency in the cluster. Often clogging occurs on the paths to a bus after a contingency occurs. After the type and location of the enhancement are selected, the enhancement is evaluated in step 104 by comparing the severity and count for each symptom for the enhancement with the base case. An enhancement that completely heals a clogging problem eliminates all symptoms in its connected bus cluster. If there are adverse consequences to the enhancement in a query step 106, processing advances to step 108. Step 108 queries whether there are subareas within the contingency cluster. That is, the query asks whether the enhancement causes the exhaustion of reactive sources within subareas for contingency cluster under consideration in the enhancement case when there is no exhaustion of generator reactive reserves in the base case. If no, this means that the adverse consequences should be addressed by the selection of a new type or location for a system enhancement starting at step 102. If yes, a further query is made as to whether the loss of control methods should be used in step 110.

If the loss of control methods should be used in response to the query in step 110, processing advances to FIG. 10A for analysis using the loss of control analysis of FIGS. 10A and 10B. Note that if processing proceeds to FIG. 10A, steps 60, 62, 64 and 68 are omitted from the analysis. If the loss of control methods should not be used in response to the query in step 110, processing returns to step 102 for the selection of an alternative type and/or location for a system enhancement. In making this decision, one consideration can be whether the enhancement brings about exhaustion of reactive supply. If so, one determines whether this is a step of healing or a consequence of the enhancement type and location being investigated. If exhaustion of reactive supply is a step of healing then it is desirable to proceed to the loss of control analysis of FIGS. 10A and 10B to complete the healing. If the loss of control is a consequence of a poor choice of enhancement or postured control type and location, then one can continue using clogging procedures to optimize enhancement type, location and size by returning to step 102.

If there are no adverse consequences to the enhancement in response to the query of step 106, the size of the enhancement is optimized in step 112. The size is optimized so as to eliminate the count for every symptom without consequences, if possible. If the symptoms are eliminated in response to the query of step 114, the counter j is incremented at step 113 and the next dominant connected bus cluster with a clogging problem is considered starting at step 100.

If the count for all symptoms in the root cause bus cluster for clogging is not eliminated after optimizing the enhancement size in step 114, another enhancement is selected in step 116, and the enhancements are optionally coordinated in step 118. These steps are performed using the map of symptoms and the partial success in removing symptoms of worse blackhole, new blackhole, new thermal, worse thermal, new low voltage and worse low voltage. Next step 120 queries whether there are any adverse consequences to the coordinated enhancements in step 118. If there are adverse consequences, processing returns to select another enhancement in step 116 for coordination with the first enhancement. If there are no adverse consequences, the coordination is optimized in step 122. Note that coordination is not needed if the symptoms of the connected bus clusters require different enhancements and there are no adverse consequences or benefits in the dominant connected bus cluster where the first enhancement or postured control is designed. When used, coordination attempts to maximize the synergistic benefits of two enhancements if both enhancements had benefits for the two associated connected bus clusters. If the enhancement for either connected bus cluster had consequences for the other connected bus cluster, one would look for enhancements or postured control that addressed both simultaneously in an effort to heal both. If one enhancement had benefit for both connected bus clusters and the other had benefit for only the connected bus cluster it was designed for with no consequence or benefit for the other connected bus cluster, one might attempt coordination (such as a combination) with care.

After the optimization of coordination in step 122, processing advances to the query in step 124. The query of step 124 asks whether the symptoms of network clogging are eliminated. If the symptoms are not eliminated, another enhancement is selected for consideration of coordination in step 116. If the symptoms are eliminated, processing advances to step 126 to determine if all dominant connected bus clusters have been considered. If not, the counter j is incremented in step 113, and the next dominant connected bus cluster is considered starting in step 100. If all dominant connected bus clusters have been considered, processing ends for the current contingency cluster. The next contingency cluster is considered starting with step 96 if there are any remaining contingency clusters. This consideration preferably occurs with the enhancements or postured control for all previous contingency clusters embedded in the loadflow scenario or scenarios. If there are no remaining contingency clusters, enhancements to address network clogging are completed.

Figure 12:
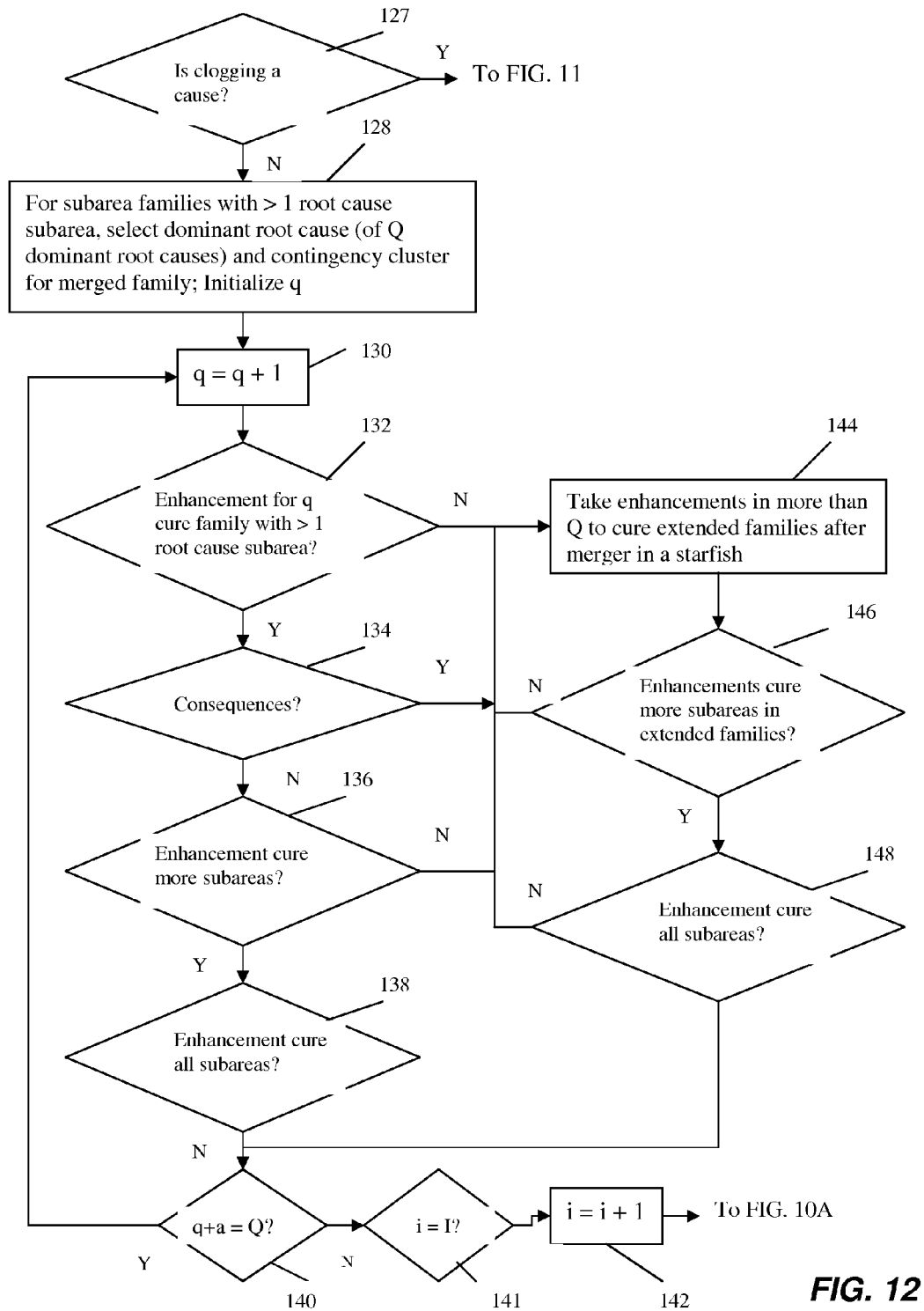
FIG. 12 is a flow chart depicting design guidance and optimization for loss of control and inter-regional subareas.

As described with respect to FIG. 10B, if the response to the query in step 88 is yes, processing advances to FIG. 12. FIG. 12 addresses the situation where large subareas or interregional (such as starfish) subareas are involved in contingencies. The first step 127 in FIG. 12 is to determine if solely clogging is a cause of any of the root cause problems in the inter-regional subareas. This is possible but not likely since the structure depends on nesting of subareas that are due to exhausting reactive reserves on an increasing number of generators protecting increasing-sized subareas. If clogging could have a role, processing advances to the steps of FIG. 11. If not, processing advances to step 128.

In step 128, for subarea families with greater than one root cause subarea, a dominant root cause and contingency cluster for the merged family is selected. Note that there are Q dominant root causes for the arms of the starfish. If there were only one root cause per arm, which generally may not be the case, one would have Q root causes in Q arms for the starfish. A counter q is initialized to zero in step 130, then processing advances to step 132, where q is incremented by one. Counter q represents the current root cause in an arm of the starfish for which the enhancement is being provided. For the current (first) dominant root cause q in the first starfish arm, next step 132 queries whether enhancements (including system upgrades and protection) for any dominant root cause family of the current dominant root cause q cures families of subareas and their contingency cluster having more than one root cause subarea. Note that this suggests that an enhancement or postured control in one starfish arm in one root cause subarea may not only cure its family line of subareas but more than one family line and family of subareas in the current starfish arm. This can be true even though that arm might have other root cause subareas and other families or family line of subareas due to the other root causes in the same starfish arm due to merger of subareas in that starfish arm. It might also cure subareas in other starfish arms due to the merger of subareas within the body of the starfish.

An enhancement that provides protection against cascading would outage all branches connecting a specific subarea's buses to the buses in the next largest subarea in a family line emanating from a root cause to prevent cascading of voltage stability beyond the specific subarea to larger subareas. This protection against cascading may need to be performed for each family line of subareas in each family of subareas in each arm of the starfish for the specific contingencies that produce voltage instability or voltage collapse in that family line in a family in each arm of the starfish. In the same way, one may need to provide and coordinate enhancement or protective control in one or more root causes in one or more root cause subareas in each arm of the starfish if the family lines in a family of subareas in the arm have no mergers of subareas that may make family lines of subareas depend on one root cause subarea and root cause. Some contingencies initiate cascading voltage instability of subareas in more than one family or family line of subareas in more than one arm. The protection would attempt to prevent cascading where it is initiated before the cascading pattern becomes complex. Such protection would be useful for utilities or ISOs that can not provide enhancements where voltage instability is initiated but must curtail cascading voltage instability or voltage collapse that enters its boundaries. Enhancement and protective control can be provided and coordinated so that the cascading patterns never develop for any arm or arms of the starfish.

If the response to the query of step 132 is no, it means that there exists at least one sub-regional starfish subareas comprised of a set of nested subareas with one given root cause subarea and one root cause and one proceeds to step 144 to develop multiple enhancements for multiple family lines and families of subareas in that arm and later for other arms of the starfish. One enhancement in one arm generally would not cure all subareas in all starfish arms despite the merger of the subareas of within different family lines in families of subareas in each arm at the body of the starfish. If the enhancement does not produce consequence in step 134, one would determine whether the enhancement produces healing of subareas in other family lines and possibly in other families in the arm with the enhancement and in which of the other arms of the starfish in step 136. If the enhancement does produce consequences in step 134, one would try all alternative enhancement types, locations and sizes to find an enhancement that has no consequence so that one could proceed to step 136 hoping one has found an enhancement that heals families of subareas and the contingency cluster for multiple root cause subareas and could cure even more subareas in other arms of the starfish if one could proceed to step 138 for this dominant root cause. If the enhancement does not cure some or all subareas in a family in an arm and possibly in other arms of the starfish with one enhancement in one root cause in one root cause subarea in one arm in step 138, processing then advances to step 144 as discussed hereinafter.

If all of the subareas in the arm are cured, processing queries whether q+1=Q (a=1). If so, processing advances to step 130 where another root cause in another arm is tried in an effort to cure subareas in that arm. If no consequences are encountered for each arm and all the subareas in all the families of subareas in the arm are healed by adding enhancement at the root cause in that arm, the healing process keeps looping back to step 130 to heal each of the Q arms given one root cause in an arm by setting q=q+1. When proceeding to step 144 after step 138, success with one root cause in an arm without consequence has occurred, but an enhancement needs to be provided in a separate root cause in the same arm (or possibly in another arm) to complete the healing of all subareas in the arm under consideration. The process may also proceeds to step 144 to try enhancements in other root causes in the same arm and coordinate designs in the different root causes if the consequences in step 134 are not removed with enhancements of various types, locations and sizes for the current root cause in that arm. If enhancements types, locations and sizes in current root cause do not produce healing in other families in the arm and in other arms in step 136, processing also proceeds to step 144 to add and coordinate enhancements in two root causes in the arm or in dominant root causes in more than one arm.

If all of the subareas in the arm are cured in step 138, processing returns to ask if q+1=Q (a=1). If not, processing proceeds to step 130 where another root cause in another arm is tried in an effort to cure subareas in that arm. If no consequences are encountered for each arm and all the subareas in all the families of subareas in the arm are healed by adding enhancement at the root cause in that arm, the healing process keeps looping back to step 130 to heal each of the Q arms given one root cause in an arm by setting q=q+1. When processing proceeds to step 144 after step 138, success with one root cause in an arm without consequence has occurred, an enhancement in a separate root cause in the same arm (or possibly in another arm) is needed to complete the healing of all subareas in the arm under consideration. Processing also proceeds to step 144 to try enhancements in other root causes in the same arm and coordinate designs in the different root causes if the consequences in step 134 are not removed with enhancements of various types, locations and sizes for the current root cause in that arm. If enhancements types, locations and sizes in current root cause do not produce healing in other families in the arm and possibly in other arms in step 136, processing also proceeds to step 144 to add and coordinate enhancements in two root causes in the arm or in dominant root causes in more than one arm.

If processing proceeds to step 144, one is trying to add enhancement at more than one root cause in the arm to get rid of consequences in subareas in that arm or heal all subareas in all of the families in that arm. To do this, one attempts adding enhancements at another root cause in that arm or, if needed, in another root cause in another arm. Step 146 determines if all the subareas in the arm can be healed (and in the second arm, if implicated) and the consequences in the root cause are addressed by a=2 root causes by selecting and coordinating two enhancements of two types, locations and sizes. If the answer is no at step 144 with two root cause subareas and two enhancements, another root cause (a=3) is added in the arm or in another arm and the healing coordinated to heal the original arm. If the answer is yes at step 144, processing advances to step 146 to determine if the "a" enhancements heal all the root causes in all the arms they are located in. If not, processing returns to step 144 to add another enhancement at another root cause. If the answer is yes at step 146 processing advances to step 148 to determine if additional subareas are healed in additional arms by the "a" enhancements. If so, the process returns to step 144 to determine "a" enhancements where a=a+1. This loop continues through step 144 until subareas in arms are healed solely by root causes within them and then processing exits 148 to perform step 140. A check is made as to whether q+a=Q. If no, processing returns to step 130. If q+a=Q, all root causes in all arms have been addressed, and processing advances to step 141 to determine if all independent families of subareas are addressed. If the answer is yes, the processing stops. If the answer is no, processing proceeds to FIG. 10A with i=i+1 to address the next independent families of subareas. One would expect that all subareas in arms are healed by one root cause enhancement, and, if that is the case, the primary loop that involves step 130 would never reach step 144.

One can display the results for multiple base cases together and a specific enhancement or postured control or no enhancement in one table. One can then view whether an enhancement is successful across a peak, a shoulder and a normal base case scenario for each kind of contingency in one run. One could also make comparisons for different transfers, generation dispatch, unit commitment and loading patterns within the peak, shoulder and normal base case scenarios. One could also make the comparison for a particular enhancement for each kind of contingency in one run for the multiple scenarios that one might envision for expansion planning in a reliability region (such as the Eastern Interconnection, the Western Interconnection or the Electric Reliability Council of Texas (ERCOT) for example).

One can also display results for different type, location and size enhancements for a specific root cause in one table for every kind of contingency. The display result could show the results for a number of sizes of a particular enhancement type and location to obtain a size that achieves solving all unsolved contingencies (kind 2 or kind 4), eliminating the blackout region for all contingencies in the contingency cluster for that kind of contingency, eliminating the root cause bus cluster of all symptoms for that contingency cluster, reducing the number of contingencies that produce voltage instability or voltage collapse for the contingency clusters for other kinds of contingencies, and eliminating subareas of unsolved contingencies and shrinking or eliminating the symptoms in their root cause bus clusters. Monitoring other kinds of contingencies to observe the benefits is possible without additional computation by preferably just clicking the results already obtained and located in different files. In some cases, a poor choice of enhancement type and location will not show benefits but consequences such as changes moving solved to unsolved contingencies, an increase in the size of subareas or an increase in number and severity of symptoms in the root cause bus cluster for the specific kind of contingency as well as other kinds of contingencies. One selects the size optimally to achieve the best benefits and no consequences. If one has selected a number of locations for a particular type of enhancement and optimized the size for each, one could then display all the results for all the locations with optimized sizes and select the optimized location based on maximizing the benefits and eliminated or minimized consequences. If one has maximized size and location for a number of types of enhancements for a particular contingency cluster of a particular kind of contingency, one could optimize the type of enhancement by a comparison table.

Without being bound to theory, it is useful to provide a theoretical discussion here of the differences between root causes for contingencies that solve in response to either the series of snapshots Newton-Raphson simulations process and/or the increasing percentage simulation process sequential solution process in the representative solution process and those that do not. Eigenvalues can be so small that none of the series of snapshots process using Newton Raphson loadflow nor the increasing percentage process do not solve due to the occurrence of network clogging that is far more severe for these unsolved contingencies. Network clogging for unsolved contingencies, which results in SIL on most if not all branches of a boundary surrounding a connected bus cluster, a coherent bus group or a root cause (each called generically a bus group hereinafter), (a) sucks large amounts of reactive power into the terminal bus outside the bus group for each branch on its boundary; and (b) either does not allow any of that reactive power to enter the bus group or sucks reactive power from inside the bus group into each of the branches in its boundary. The severe network clogging on boundaries of these bus groups associated with unsolved contingencies is clearly observed in the voltage collapse diagnostic results because the clogging boundary lies within the root cause and surrounds the buses with severe low voltage violations and branches with thermal limit violations, and contains buses connected to the unsolved contingency or contingencies. These observed results on the identification of root causes confirm the above theory concerning the effects of clogging on the ability to obtain solutions for the bus groups where (a) a bus group has negative reactive generation minus reactive load, (b) a bus group has fully exhausted its internal reactive generation, and (c) a bus group must obtain reactive supply from outside the bus group to have a solution. This clogging barrier prevents reactive power from flowing into the buses within the bus group from outside the group, sucks the reactive generation reserves off the generators connected to the bus group into serving reactive losses on boundary branches, produces severe low voltage violations within the bus group, contains the unsolved contingency or contingencies within the bus group and produces thermal overloads within the bus group for unsolved contingencies.

The difference between unsolved N-1 or possibly SSHCC contingencies (which have root causes similar to unsolved N-1 contingencies and easily become unsolved N-1 contingencies) and individualistic N-2 contingencies is the size and severity of the root cause symptoms at sets of buses that experience low voltage, the number of buses in the blackout region (defined as a root cause subarea for unsolved N-1 or subareas for unsolved individualistic N-2 contingencies), the number of branches that experience SIL in the boundary of the root cause and the size of the reactive losses on those branches, and the number of branches that experience thermal overload in the root cause when the root cause for unsolved N-2 contingencies (both individualistic and SSHCC-associated) as compared to the root cause for unsolved N-1 and SSHCC contingencies. The size and severity of the root cause is generally larger for unsolved/unstable N-2 in terms of number of buses in the root cause and the symptom counts for unsolved N-2 compared to unsolved/unstable N-1 or SSHCC contingencies. The unsolved N-2 contingencies do not generally reside in the root cause as do unsolved N-1 or SSHCC contingencies but reside in the transmission corridor connecting the root cause and the loadcenter or a corridor in the loadcenter that has huge SIL losses due to its role in distributing the active generation. The root cause for individualistic N-2 contingencies can encompass the root cause for more than one N-1 or SSHCC contingency and yet there may be a number of root causes for unsolved individualistic N-2 contingencies that exploit different root cause structural deficiencies than the unsolved N-1 and SSHCC contingencies. This result as can be observed on software provided maps of the connected bus cluster on unsolved contingencies strongly confirms the analysis and discussion for why a contingency is unsolved due to clogging and why this representative solution process desirably obtains solutions for the very large number of unsolved N-2 contingencies found by the comprehensive contingency selection process when simulated by series of snapshots process. Root causes for unstable N-1 and unstable N-2 contingencies (individualistic and SSHCC-associated) obtained from the representative solution process can be similar to those for unsolved N-1 and to the unsolved N-2 contingencies respectively produced by the representative solution process.

The root cause for contingencies solved by the series of snapshots process also confirms the analysis on why the unsolved contingencies are far more severe because they better exploit the potential clogging on a bus group or its boundaries in the attempt to completely eliminate the possibility of obtaining a solution for the contingency. The symptoms associated a representative solution obtained with the series of snapshots process are far less numerous, far less severe and far less able to consume and choke off reactive supply because the SIL is not on the immediate bus group or its boundary. Rather, SIL is further and further away from the bus group and is possibly due to a worse remote loadcenter boundary (not necessarily a solely contingency-induced boundary), and finally not with such contingency-induced large blackhole consuming reactive losses on as many boundary branches as those for the increasing percentage simulation of the representative solution process solved (unstable) and unsolved contingencies. The N-1 contingencies solved by the series of snapshots process (a) do not generally lie within the root cause as they do for an unsolved/unstable N-1 or SSHCC contingency, but rather they occur more remote from the root cause in the loadcenter boundary or on the corridor that connects the loadcenter to the root cause, (b) have SIL losses that are not within the root cause boundary but occur on branches that connect the root cause and the loadcenter and on the load center boundary, (c) have low voltage violations within the root cause but not as severe and not nearly as many buses as occur for unsolved contingencies, and (d) result in very few thermal limit violations in the root cause compared to unsolved contingencies. The SIL losses on the corridor between the loadcenter and the root cause produced by the solved contingencies result in clogging and are very clearly removed by enhancement of the root cause. This allows reactive to flow into the root cause on some branches and flow out of the root cause into the transmission corridor that connects it to the loadcenter. The occurrence of this network clogging for contingencies on the corridor and the removal of the clogging that allows free flow of reactive into and out of the root cause due to the enhancement (including protective controls) shows clearly the role of clogging for solved contingencies. The role of clogging for unsolved contingencies is even more apparent because it occurs within the root cause and disappears for enhancement(s) within the root cause given that the root cause includes buses and branches inside the boundary and on the boundary.

The above description fits the case where the root cause lies outside the loadcenter but has been observed to be located in a structurally weak portion of a loadcenter as well. The corridor branches can then be those that connect the root cause to the remainder of the loadcenter.

As described above, a root cause based design procedure is developed that can find remedies for all of the voltage stability insecure, unstable and unsolved N-1 and N-2 contingencies via generally one enhancement or postured control for each root cause that solves all of the contingencies that were unsolved or unstable, shrinks and eliminates the subareas for each of the contingencies, and eliminates the symptoms of voltage instability such as low voltage violations, thermal limit violations and surge impedance loading on branches for each of the contingencies that exploit the root cause to produce voltage instability or voltage collapse. This root cause based design procedure is a desirable complement to the comprehensive contingency selection that finds so many unknown and yet very severe contingencies because it provides a means of designing a single enhancement without extensive manpower required to design enhancements for each separate contingency or small group of contingencies that make performing expansion planning for a power grid that has voltage instability or voltage collapse so time consuming.

The root cause based design procedure is aided by a representative solution process that finds solutions for contingencies using a (Newton Raphson) series of snapshots process if that is possible by using different generation response (governor, AGC and dynamic system approximation modes) in combination with different discrete voltage control options (such as switchable shunt capacitors and underload tap changer control) to overcome convergence difficulties or stability difficulties that are not universal for all control options. The representative solution process then uses the results of this series of snapshots process to adaptively and optimally seek solutions for an increasing percentage simulation that breaks the simulation of an equipment outage contingency into steps where the size of the percentage removal at each step is adaptively chosen to achieve a series of snapshots solution at that step and to achieve it with the largest percentage removal possible. The increasing percentage outage process can remove smaller percentages of the equipment to achieve a solution at that step as the total percentage of the equipment removed in previous steps increases in order to cause the change in state (bus angle and voltage) at each successive step to decrease, which is a condition for convergence to a solution for a contingency. A factor that determines whether a Newton Raphson-based series of snapshots process has a solution for one of the snapshots is whether the norm of the jacobian inverse is below a certain bound or, equivalently, the smallest jacobian eigenvalues are above a certain bound. The increasing percentage outage solution process reduces the mismatch at each successive step as the solution obtained gets closer to being unsolvable with zero eigenvalues and/or becomes unsolved by having almost zero eigenvalues. Convergence of the representative solution algorithm to a solution is assured if the change in state (jacobian inverse times the mismatch) at each successive step decreases monotonically. This monotonic reduction in the change in state can be accomplished by reducing the percentage of the equipment removed at each successive step sufficiently to reduce the mismatch sufficiently at that step at the same time the norm of the inverse of the jacobian has increased due to approaching unsolvability or being possibly unsolved so that one can continue to obtain converged solutions with a decreased change in state at each step. The decrease in the percentage of the equipment removed and thus the decrease in the mismatch at a step also helps the series of snapshot Newton-Raphson algorithm to obtain a solution at each step. This process continues until one either removes all of the equipment and achieves a solution (called an unstable solution) or does not obtain a solution (i.e., it is an unsolved contingency needing a predicted solution). Predicting a solution using trend information on the reactive generation and loadflow model state as the increasing percentage outage process removes equipment allows one to obtain a solution for the an unsolved contingency so that even unsolved contingencies have a representative solution from which the root cause design can be made.

The subareas found for all voltage stability insecure, unstable and unsolved single and double contingencies can be displayed in a ball diagram that shows the nesting of subareas as described previously with respect to FIG. 5. Subareas are comprised of families of agents that are all of the children, grandchildren, great-grandchildren of agents, etc., in family lines that emanate from the patriarch agent of each family. The vulnerability region of a patriarch agent, which is the set of buses that would experience voltage instability or cascading voltage instability due to a contingency that exhausts the reactive reserves of a patriarch contains the union of the buses of the voltage instability region of every agent in the family since these agents are each protected by a subset of the generators that protect the patriarch agent from voltage instability. The vulnerability region of any child of the patriarch agent is nested in the vulnerability region of the patriarch because (a) the vulnerability region of each child is its voltage instability region and (b) the voltage instability region of each child is contained in the vulnerability region of each agent of the family lines that emanate from that child, including that of the patriarch. This argument can be made to support a position that the vulnerability region of each successive agent in any family line emanating from the patriarch agent is nested in the vulnerability region of every successively larger agent, including the patriarch agent in the family line. The generator sets whose reactive reserves protect the agents in any family line emanating from the patriarch agents are also nested in the same manner. Potential subareas (determined before contingencies are selected and one does not know whether a potential subarea ever is a convenient location for instability of any contingency that causes it to be called a subarea) are comprised of families of agents with patriarch agents that may be any agent in any possible family of agents of the largest possible patriarch agents are thus nested because their generator sets and vulnerability regions are nested. The ball diagram of the actual subareas provided by the software includes buses within it, generators whose reactive reserves protect it, and contingencies that produce voltage instability, cascading voltage instability, voltage collapse within it. Each ball in the ball diagram is a subarea that experiences voltage instability or voltage collapse for a subset of the set of voltage stability insecure, unstable and unsolved single and double contingencies by exhausting the reactive reserves of the subarea, provides an understanding of why the root cause enhancement design methodology can solve the unsolved contingencies and shrink and eliminate all of the subareas for the contingencies associated with the family of subareas and their contingencies, as well as eliminate the symptoms of voltage instability or voltage collapse for the contingencies by providing reactive reserves in every subarea after any contingency occurs that would have previously exhausted the reserves of that specific subarea before the enhancement in the root cause. The ball diagram is thus intended to display the nesting of subareas that experience voltage instability in the union of the vulnerability regions of its patriarchs and exhaust the reactive reserves of the union of the generator sets protecting the patriarchs.

Note that, as described previously, agents protected by reactive reserves of generators or reactive sources in the base case are defined by running curves (e.g. V-Q curves) at every bus and clustering buses that exhaust the reactive reserves on the same set of generators. Accordingly, the structure of potential subareas referred to in the previous paragraph is established by the family lines and families of agents that would have no reactive reserves if a certain set of generators had no reactive reserves but their vulnerability regions and generator sets are determined out of V-Q stress tests at all buses and have reactive reserves in the base case. An actual subarea, also called generally a subarea, is a potential subarea that has its unique set of generators exhausted by a contingency. Not every potential subarea has its set of generators exhausted by a contingency, and thus not every potential subarea is a subarea.

The diagnostic can not only determine whether a subset of the contingencies is due to clogging or both clogging and loss of control depending on whether the contingency cluster causes exhaustion of generator reactive reserves or not. It can also determine the number of connected bus clusters within the root cause bus cluster where enhancement may be needed for clogging root cause problems and treat each contingency cluster for each connected bus cluster that has an identical set of clogging problems requiring possibly an identical set of enhancements or protective controls.

The diagnostic also determines the following. First, it determines independent subareas for loss of control and clogging root cause problems that are totally independent in terms of initiation, propagation and cause of the voltage instability. Second, it determines the root cause subareas for a specific kind of contingency where voltage instability initiates for a particular kind of contingency. Third, it determines the families of subareas that have one or more of the root cause subareas initiating voltage instability or voltage collapse in one of its subareas for that kind of contingency. Fourth, it determines the contingency cluster for a particular kind of contingency that is the union of the contingencies producing voltage stability insecurity for solved N–1 and N–2 contingencies and voltage instability (and possible cascading voltage instability or voltage collapse) for unstable or unsolved N–1 and N–2 contingencies in one of the subareas emanating from the root cause subareas for that kind of contingency. Fifth, it determines the root cause bus cluster symptoms and their buses and boundaries that display the impacts of the contingency cluster of contingencies of a particular kind, that define why the contingency kind solves and produces voltage stability insecurity and why another kind is unsolved or unstable and produces voltage instability and possible cascading voltage instability that successively impacts nested subareas in one or more family lines that lie in the large subarea in a sub-regional or inter-regional subarea, and that determine the contingencies that cause blackout for a root cause by the symptoms that make a solution impossible to obtain. Finally, it determines the root cause for each kind and sub-kind of contingency.

Among other things, the categorization of the kinds and sub-kinds of contingencies based on the contingency clusters that affect each root cause subarea are new and do not have industry and NERC standardization of practice. The categorizations made are all based on diagnostics that indicate where and why loss of control and clogging voltage instability occurs, where and why clogging occurs, and the different kinds of voltage instability and voltage collapse problems occurring. Based on the NERC Planning Criteria category and its requirements on enhancement or control, the structure and severity of the root cause, the enhancement types and locations for each contingency kind to heal the structure and severity of the root cause are proposed in certain implementations.

There are, however, some observed properties for different sub-kinds of different kinds of contingencies and some utility/ISO practices that differ among utilities and ISOs and may change how different sub-kinds or kinds of contingencies are diagnosed and how one would provide design guidance. Certain non-limiting examples are now provided.

First, different root cause subareas that have identical contingency clusters could have identical root causes depending on the root cause bus cluster presence in these root cause subareas for different contingency clusters for different kinds of contingencies and result in one enhancement for both kinds of contingencies. This means that the kind 2 contingencies, which include unsolved N–1, unstable N–1 and SSHCC contingencies, can be broken into more one kind if the root cause subareas, root cause bus cluster, intersection of the root cause bus cluster and root cause subareas, the structure of the root cause in terms of symptoms, and the NERC Planning Criteria and utility practice in terms of investment in enhancements for each specific sub-kind of kind 2 contingencies are different. That is, although one could treat these sub-kinds of kind 2 contingencies as being addressed as part of the kind 2 contingency cluster, root cause bus cluster, root cause subareas and root causes, one could separate them into different kinds if that fit the practice of a utility or ISO. This ability to label contingency clusters differently is due to the fact that there is no standardization because the concept of unsolved, unstable and SSHCC contingencies is new.

Further, testing has indicated that one could separate SSHCC contingencies from unsolved/unstable N–1 contingencies for some utilities/ISOs, and yet in other cases one would want to treat all three sub-kinds as one kind of contingency with one root cause and one enhancement.

In another variation, separating individualistic unsolved and unstable N–2 contingencies from SSHCC-induced unsolved and unstable N–2 contingencies into different sub-kinds of kind 4 contingencies rather than treating SSHCC contingencies and their associated unsolved and unstable N–2 contingencies as a kind 2 problem is possible.

Another factor in classifying individualistic unsolved and unstable N–2 contingencies is the possibly very different enhancements and protective controls to heal each specific kind 4 individualistic N–2 contingencies compared with the enhancement/protective control required to heal the unsolved and unstable N–2 contingencies associated with a SSHCC contingency or the enhancements needed for Category C contingencies provided by the utility or ISO. Enhancements proposed herein for the individualistic N–2 contingencies that do not have a component of a SSHCC contingency include a tailored SPS for that contingency or a SVC that solves one or more of the individualistic unsolved N–2 contingencies. Many of these unsolved individualistic N–2 contingencies can be due to clogging. In some utilities, the SSHCC contingencies and their associated unsolved and unstable N–2 contingencies have the same root cause as unsolved and unstable N–1 contingencies, but in other utilities they have a different root cause. In one example utility used for testing where the SSHCC contingencies had a separate root cause from those for unsolved N–1 contingencies, the SSHCC contingencies and the unsolved N–2 contingencies associated with them were solved by a SVC enhancement. The SVC enhancement for these SSHCC contingencies and the unsolved and unstable N–2 contingencies associated with them also solved certain utility C contingencies along a transmission corridor and not associated with SSHCC contingencies that had been solved through SPS load shedding controls of a load center at the end of the transmission corridor. The individualistic unsolved N–2 contingencies, the unsolved/unstable C contingencies, and the unsolved N–2 associated with SSHCC contingencies all are very different contingencies in different locations with different root causes in this example utility. Thus, there are sub-kinds of unsolved and unstable N–2 contingencies that included (a) individualistic N–2 contingencies produced by clogging on transmission corridors that were cured by SVC and SPS load shedding controls that target each individualistic unsolved N–2 contingency; (b) C contingencies on paths into the load center produced by loss of control and clogging that were cured by SPS loadshedding control that reduced flow on these paths as well as by SVC associated with the SSHCC contingencies even though the C contingencies were not associated with a SSHCC contingency, and (c) unsolved N−2 contingencies associated with the SSHCC contingencies that were treated as a sub-kind of kind 2 contingencies with a separate enhancement from that for unsolved N−1 contingencies but could also be considered a sub-kind of kind 4 contingencies that dealt with the unsolved/unstable C contingencies and unsolved N−2 associated with the SSHCC contingencies. One could justify either classification based on the root cause analysis for the sub-kinds of N−2 and N−1 contingencies.

Accordingly, this discussion provides insight into the fact that the kinds of enhancements and classification depends on the utility being studied and that the root cause diagnosis described herein is capable of identifying root causes for different models.

Diagnosing the root cause bus cluster provides diagnostics design on where solely clogging occurs, why it occurs, how severe the clogging is, for what contingency cluster it occurs, the boundary or boundaries of connected bus clusters or coherent bus groups, the severity of the SIL reactive losses on branches on the boundary of a connected bus cluster or coherent bus group in terms of partially or completely eliminating reactive flow into or out of the bus group, the location of each bus group and boundary with respect to the contingencies, whether the SIL boundary problems are apparent in both the base case and the contingency case and the severity of low voltage violations and thermal violations that result from the SIL boundaries.

Note that the above description of system enhancements above deals with particular types of contingencies designated as kinds 2-5. These categories conform to NERC categories of contingencies, which is why this breakdown is used as the example herein. Kind 1 is a NERC category (e.g. category A) that does not describe a contingency class and the ability to operate with stability but rather designates an operating condition where the network is unstable. This reflects that many power grids have an underlying network that is unstable. Some expansion planning models can have families of agents protected by generators that are fully exhausted in the base case expansion planning model. This can occur because an expansion planning model is typically a worst case model with the fewest generators, experiencing transfers that allow further reduction in the number of generators, and experiencing peak, shoulder and normal load stress. The existence of a kind 1 problem would be demonstrated by an expansion planning model where a base case blackout region encompasses a large percentage of the transmission grid over a wide region, causing the comprehensive contingency selection process to find large number of unsolved contingencies compared to other expansion planning models studied for the same system. Accordingly, a kind 1 stability problem should be addressed before one can address the stability problems resulting from kinds 2-5.

Although at times directed to expansion planning, the procedures described above can be used for operations and operation planning for a day ahead, week ahead, month ahead by identifying contingency clusters for unique root causes and then seeking voltage rescheduling with and without capacitor switching, active rescheduling, unit commitment, and load shedding options depending on the contingency cluster, whether a contingency in the cluster has occurred or not, and whether there is sufficient reactive reserves after every contingency in the contingency cluster.

That is, it cannot be presumed that all unsolved, unstable and SSHCC contingencies can be addressed in expansion planning scenarios and are never encountered in operation planning or operations. If such contingencies are found in the operation planning or operations time frame, have not been observed in the expansion planning studies, are predicted to occur but have not yet occurred in the operations model and are found to have inadequate reactive reserves in the subareas of the root cause of the contingency cluster, then a preventive control could be selected from voltage rescheduling, active rescheduling and unit commitment options to heal the root cause and provide adequate reactive reserves for every contingency that would or could produce cascading voltage instability or voltage collapse without the preventive control due to the inadequate reactive reserves. The objective of the preventive control is to provide the reactive reserves for every contingency in such a contingency cluster. The preventive control would implement such options as voltage rescheduling, active scheduling, and unit commitment if the reactive reserves for a contingency, many contingencies, or most likely all contingencies in a solved voltage stability insecure cluster did not have adequate reactive reserves if these contingencies occurred. The preventive control would avoid load shedding when any one of contingencies in the contingency cluster occurs given that a preventive control has been applied that provides adequate reactive reserves. The preventive control that simulates the contingencies with a representative solution process provides an understanding as to how voltage instability cascades from subarea to subarea for an unstable or unsolved contingency with a subarea in a family line of subareas and an understanding that there may be an unstable equilibrium point or no computable unstable equilibrium point if the contingency has no solution before the preventive control.

Note that active rescheduling, unit commitment and load shedding would not typically be provided in expansion planning for unsolved single, unstable single and SSHCC contingency clusters in expansion planning because such contingencies should not interfere with firm load or firm transfer for N−1 contingencies and thus violate NERC Planning Criteria. As noted above, all of the above control options are possible in expansion planning for unsolved or unstable N−2 contingencies because there is no restriction in the NERC Planning Criterion on modifying firm load or firm transfers. Voltage scheduling with and without shunt capacitors or SVC, load shedding or generator tripping could be implemented for unsolved and unstable N−2 contingencies in expansion planning.

Preventive control can thus be applied to unsolved and unstable N−2 contingencies that have inadequate reactive reserve margins for operation planning models and for operations models.

A separate preventive control is designed for the root cause for solved voltage stability insecure N−1 contingencies knowing its root cause and that the solved voltage stability insecure contingencies have inadequate reactive reserves. The preventive control could again be voltage rescheduling, active rescheduling or unit commitment. If a contingency from the solved voltage stability insecure N−1 contingency occurs, the preventive control can be a corrective control already implemented for that contingency (and preventive for the other contingencies in the contingency cluster). The preventive control developed for the cluster of solved voltage stability insecure N−1 contingencies might not be viewed as providing enough margin if one of the contingencies in the contingency cluster occurred and a load shedding control could be applied for the root cause or individually for each occurring contingency to provide additional margin for avoiding voltage instability, cascading voltage instability and voltage collapse. This is true even though there is a margin from the results of the loadflow solution process, there is margin from the preventive control, and then there is additional margin from the load shedding emergency control if that option is also taken in addition to preventive control that is corrective if the contingency occurs. These preventive controls are quite simple compared to preventive controls that could be calculated and implemented for each of the solved N−1 contingencies impacting its root cause and each of the solved N−2 contingencies impacting its root cause.

If two contingencies occur simultaneously, the control would be for the root cause of the N−2 contingencies and very likely was preventive before it became corrective once one of the N−2 contingencies in the contingency cluster actually occurred.

In operations, one could choose to implement load shedding as has been implemented by various competitive tools for each contingency that occurs and experiences voltage stability insecurity. This is in sharp contrast to the proposed preventive control for solved voltage stability insecure, unsolved, and unstable N−1 and N−2 contingencies where preventive control would be implemented that becomes corrective control if the contingency occurs. One could provide for load shedding or cascading interface protection extremesis control for unstable and unsolved N−1 and N−2 contingencies that occur and produce cascading voltage instability or voltage collapse. Load shedding could be used for such control and would be armed and triggered when an unsolved, unstable or SSHCC contingency occurs and would prevent initiation and propagation of voltage instability in agent families and cascading voltage instability in subareas depending how quickly the contingency is detected and the load is shed. A cascading voltage instability control (a) identifies an interface between subareas that experience cascading voltage instability and (b) opens all the boundary branches in the interface so that the contingency does not propagate beyond the smaller subarea. This control should be triggered before propagation of the blackout reaches the interface between subareas where the boundary branches are removed. This cascading voltage instability control is desirable for a utility when voltage collapse or cascading voltage instability occurs in an entity that is not owned or somehow controlled by the utility. An ISO has a much more difficult task because the root cause can be in an entity within the member utility and the ISO has no ability to provide control in the entity or in some cases in the utility. Despite this, the ISO must prevent the voltage collapse from cascading or producing voltage collapse in the remainder of their system. The cascading control can be pre-computed and the protection armed on an interface between subareas ready to implement for the contingency or the root cause for a contingency cluster of such unsolved, unstable or SSHCC contingencies. This cascading control can also be implemented for N−2 or higher contingency clusters that have a given root cause when they occur.

Control for actually occurring solved voltage stability insecure N−1 contingencies may be taken care of by preventive control for such contingencies since reactive reserves would be supplied in the root cause before any of the contingencies actually occur. Some preventive advanced voltage control is desired to posture the system against voltage stability insecurity and the possibility of forming a SSHCC contingency with a small number of associated unsolved and unstable N−2 contingencies, a SSHCC contingencies with a large and growing number of associated unsolved and unstable N−2 contingencies, an unstable single contingency, or unsolved contingency set if very small additional stress were added and one of the contingencies of the solved voltage stability insecure contingency cluster actually occurred.

When addressing problems that can or need to be resolved by network enhancements that involve operating procedure changes in addition to or instead of structural changes to the transmission, reference can additionally be had to FIGS. 13-22. Note that the operations or operation planning controls refer to control set or control region. Herein, the use of a control set or control region does not necessarily imply ranking of agents in root cause subareas for a particular kind of contingency although the description refers to agents instead of subareas. Instead, the control set or control region is within the root cause for a particular kind of contingency or modifies active and reactive flow over the boundary branches of the root cause, connected bus cluster, or coherent bus group so that the contingency can be solved such that reactive can freely flow across the boundary in both directions rather than being drawn to and then consumed in the coherent/connected bus group boundary. One needs to select the control option, the location and the size that best accomplishes this objective. Expansion planning for N−1 contingencies generally does not change firm load or firm transfer, but generation tripping and load shedding control can change firm load and transfer for N−2 contingencies. Operations controls and short term operation planning controls can perform load shedding and generation re-dispatch for unsolved, unstable, SSHCC, voltage stability insecure N−1 and N−2 contingencies if root causes for different contingency clusters occur for various operations scenarios or for various short term operation planning scenarios. Preventive controls for operation planning and operations may require such change if it is possible for the utility or ISO. Voltage rescheduling with or without discrete voltage controls changes can be performed in operation planning and operations as preventive or corrective control. Active rescheduling and unit commitment changes of so-called must run units can be performed at an economic cost and thus would need to be traded off against other options that achieve the same or approximately the same healing without the economic cost or a reduced capital cost. On-line load shedding has often been performed via competitive tools as an emergency control in operations. These procedures are described for only one contingency or one set of contingencies but can be performed for every contingency of every contingency cluster for a particular kind or can be limited to only certain contingencies. Note also that when discussing generators hereinafter, other sources of reactive power can also be included, desirably but not necessarily dynamic reactive power sources.

Figure 13:
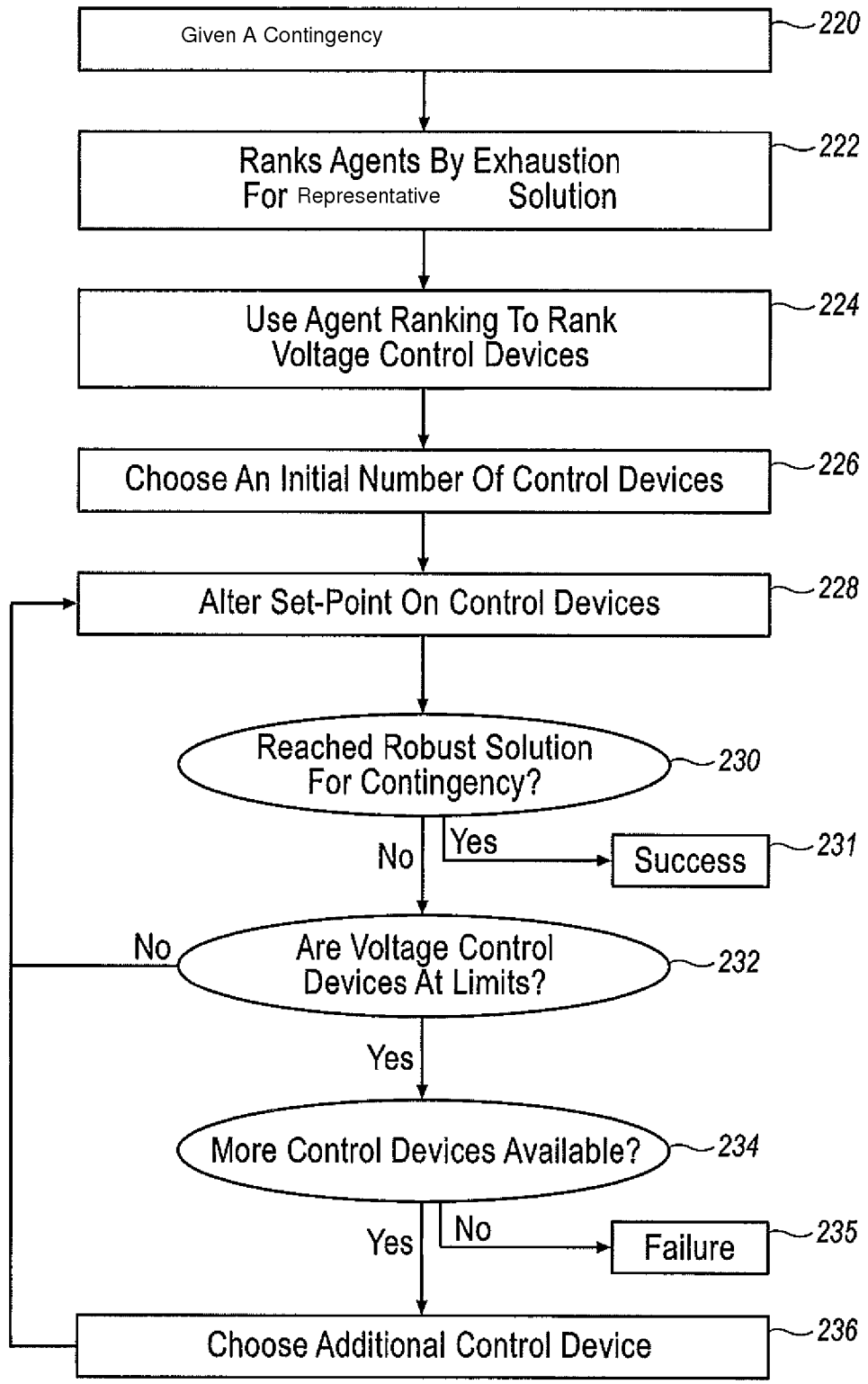
FIG. 13 is a flow chart of a procedure for preventative voltage rescheduling control.

FIG. 13 shows a procedure for preventive voltage rescheduling control. Given a contingency in step 220, step 222 requires that the agents are ranked based on their exhaustion of reactive reserves at the representative solution found using the series of snapshots process, the increasing percentage process or the prediction step of the representative solution process. This determines the predicted control region of agents. The exhaustion factor used can be one of those discussed in step 54. Using the agent ranking, a ranking of the voltage control devices within the agents is determined in step 224. Step 226 selects an initial number of control of voltage control devices based on the ranking to form a control set where preventive voltage rescheduling control will be applied. The ranking can be from smallest to largest or from largest to smallest. The control set can also be at generators that raise voltage within the root cause or reduce the reactive losses on the root cause boundary. The smallest agents in the root cause subareas often lie in the root cause.

Next, the voltage setpoint on the control devices in this control set is altered in step 228. One can make these changes in small increments and determine if a loadflow solution is obtained. If voltage control devices are at limits, then the voltage control on these control devices are held at the limits in the next alteration of the voltage setpoints on the control devices in the control set as shown in step 232. A robust solution for a contingency cluster of contingencies of a particular kind or sub-kind of kind 2 or kind 4 would require that a solution is obtained and the reactive reserves on the generators in the control region or control set be increased by a certain percentage of their reactive capability or that loadflow solutions be obtained for a certain number of consecutive small voltage setpoint changes for all contingencies in the contingency cluster. A robust solution for solving contingencies would add reactive reserve in the control set or root cause for all solved contingencies of a contingency cluster for kind 3 or kind 5 contingencies that exhibit voltage instability insecurity due to the exhaustion of the reactive reserves on the generators protecting a subarea. A robust solution would eliminate the root cause bus cluster and subareas for a contingency cluster any kind of contingency. If a robust loadflow solution is found in step 230, a robust loadflow solution is used for preventive voltage rescheduling control. The preventive control could be implemented in step 231 either by modifying the voltage setpoints on the control devices or by adding shunt capacitors close to the generators that experience reactive reserve increases predicted via the preventive voltage rescheduling control. The preventive control is implemented if the voltage decreases sufficiently in the control region of agents, if the contingency occurs, or if the system is known to be vulnerable to voltage collapse for this single contingency or if the first contingency (SSHCC or non-SSHCC) component of a double contingency occurs. Other criteria for implementation of the preventive control are possible.

If there is no loadflow solution obtained or no robust loadflow solution obtained or if all devices are at their voltage control limits based on step 232, then additional voltage control devices are sought in step 234 that can be added to the control set based on the ranking of those in the control region. If additional voltage control devices are available, an additional voltage control device is added to the control set and the procedure returns to step 228. If there are no additional voltage control devices in the control region, then there is no preventive voltage rescheduling control possible for the contingency selected in step 220.

Figure 14:
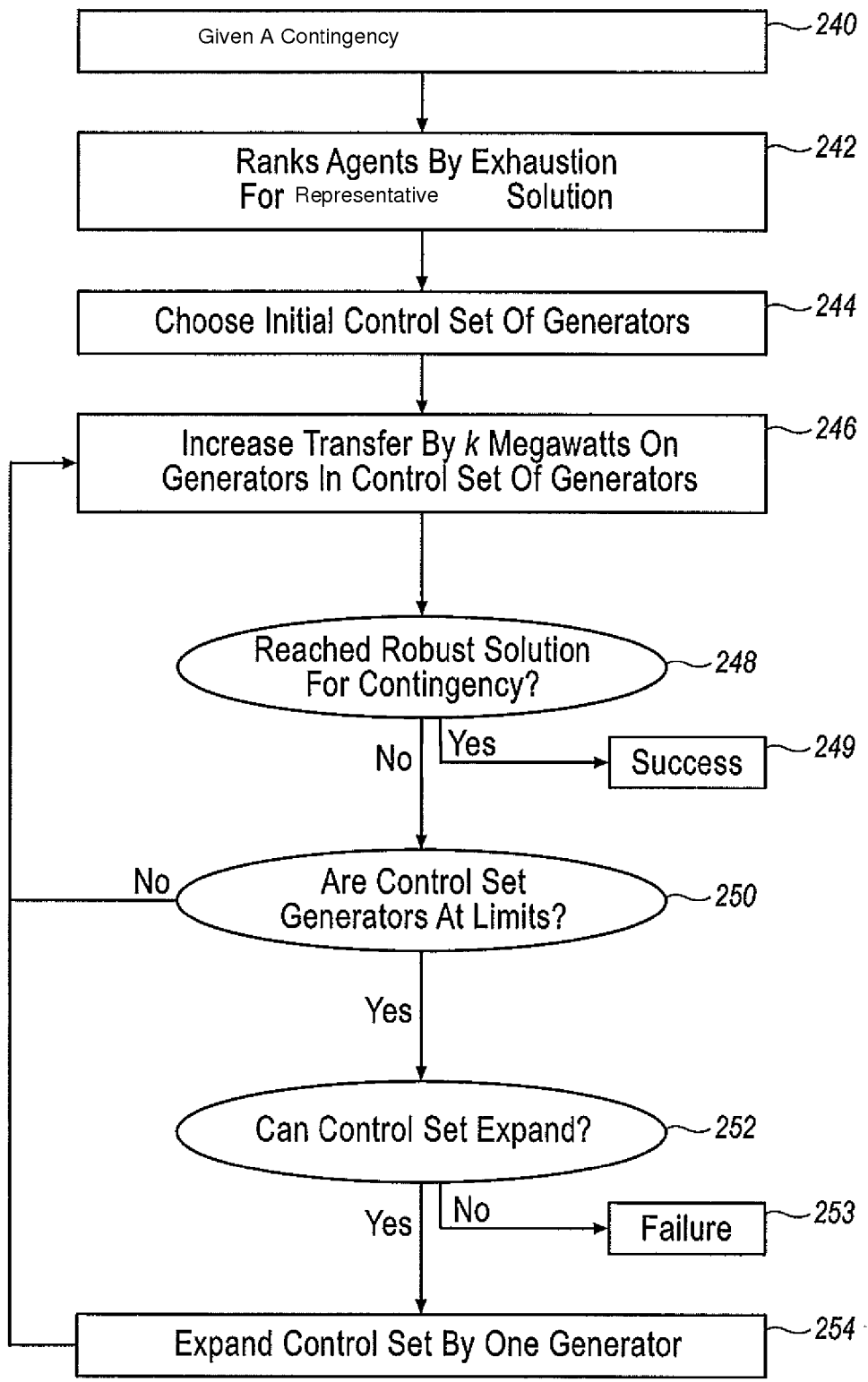
FIG. 14 is a flow chart of a procedure for preventative active power rescheduling control.

FIG. 14 shows a procedure for preventive active power rescheduling control. Given a contingency in step 240, step 242 requires that the agents be ranked based on their exhaustion of reactive reserves in the representative solution found using the series of snapshots process, the increasing percentage process or the prediction step of the representative solution process. This determines the predicted control region. The exhaustion factor used can be one of those discussed in step 54. Using a ranking of generators in the predicted control region, an initial control set of generators is determined in step 244. This ranking could be from smallest to largest or from largest to smallest. The control set can also include generators that reduce transfer over the root cause boundary branches in some manner to reduce the SIL losses on boundary branches that exhaust reactive supply on generators in the control region and suck reactive power within and outside of the boundary to produce these reactive losses.

In step 246 an initial subset of the generators and control devices is selected based on a ranking of generators in the control set used on an exhaustion factor where an increase in generation of a total of k MW occurs. The remaining generators in the control set experience a decrease in power of a total of k MW. The distribution of the k MW increase among the generators experiencing generation increase is based on participation factors for each generator that can be proportional to the active power loading factor, reactive power loading factor or the increase in reactive losses picked up by the generator for a small increase in generation on that generator. The participation factors for the generators experiencing the total k MW decrease of generation can be the inverse of the variable used for generators that experience active power generation increase, altering the active power setpoint on the generators in this control set. One can make these changes in small increments and determine if a loadflow solution is obtained or if reactive reserves increase on generators in the control set or control region. If generators are at limits, then the active power generation on these control devices is held at the limits in the next iteration involving alteration of the active power generation setpoints on the generators in the control set as shown in step 248. A robust solution for a contingency cluster of contingencies of a particular kind or sub-kind of kind 2 or kind 4 would require that a representative solution be obtained and the reactive reserves on the generators in the control set be increased by a certain percentage of their reactive capability or that loadflow solutions be obtained for a certain number of consecutive small active power generation setpoint changes for all contingencies in the contingency cluster. A robust solution for solving contingencies would add reactive reserve in the control set or root cause for all solved contingencies of a contingency cluster for kind 3 or kind 5 contingencies that exhibit voltage instability insecurity due to the exhaustion of the reactive reserves on the generators protecting a subarea. A robust solution would eliminate the root cause bus cluster and subareas for a contingency cluster any kind of contingency. The robust solution could be at the center of the set of consecutive solutions if the robust criteria required a set of consecutive loadflow solutions be found or would be the point where the reactive reserves exceed a given percentage of the reactive supply capability on generators in the control set or control region.

If a robust loadflow solution is found in step 249, a robust loadflow solution is used for preventive active power rescheduling control. This preventive control could be implemented by modifying the active power generation setpoints if the first of any double contingency in a kind 4 contingency cluster that have the same root cause occurs with no solution, or if the system is known to be vulnerable to voltage collapse for any single contingency in the contingency cluster with the same root cause for kind 2 or one of its sub-kinds before it actually occurs on the system. If the contingency cluster is for kind 3 (single solved) contingencies, re-dispatch of generation can remove voltage instability insecurity if the contingency cluster has a number of contingencies, the re-dispatch would not modify firm transfers or load, and voltage rescheduling could not remove the voltage insecurity for the contingency cluster. Active scheduling for the first contingency of a kind 5 contingency may occur depending on the number of contingencies in the contingency cluster and if voltage rescheduling could not remove the voltage stability insecurity that is often accompanied by thermal branch violations and low voltage violations.

If there is no loadflow solution obtained or no robust loadflow solution obtained or if all devices are at their active generation limits based on step 250 in FIG. 14, then additional generation units are sought in step 252 that can be added to the control set based on the ranking of those in the predicted control region discussed based on ranking of agents or reducing flow over a root cause boundary. If additional generators are available, an additional generator is added to the control set and the procedure returns to step 240. If there are no additional generators in the predicted control region, then there is no preventive active power rescheduling control possible for the contingency selected in step 240.

Figure 15:
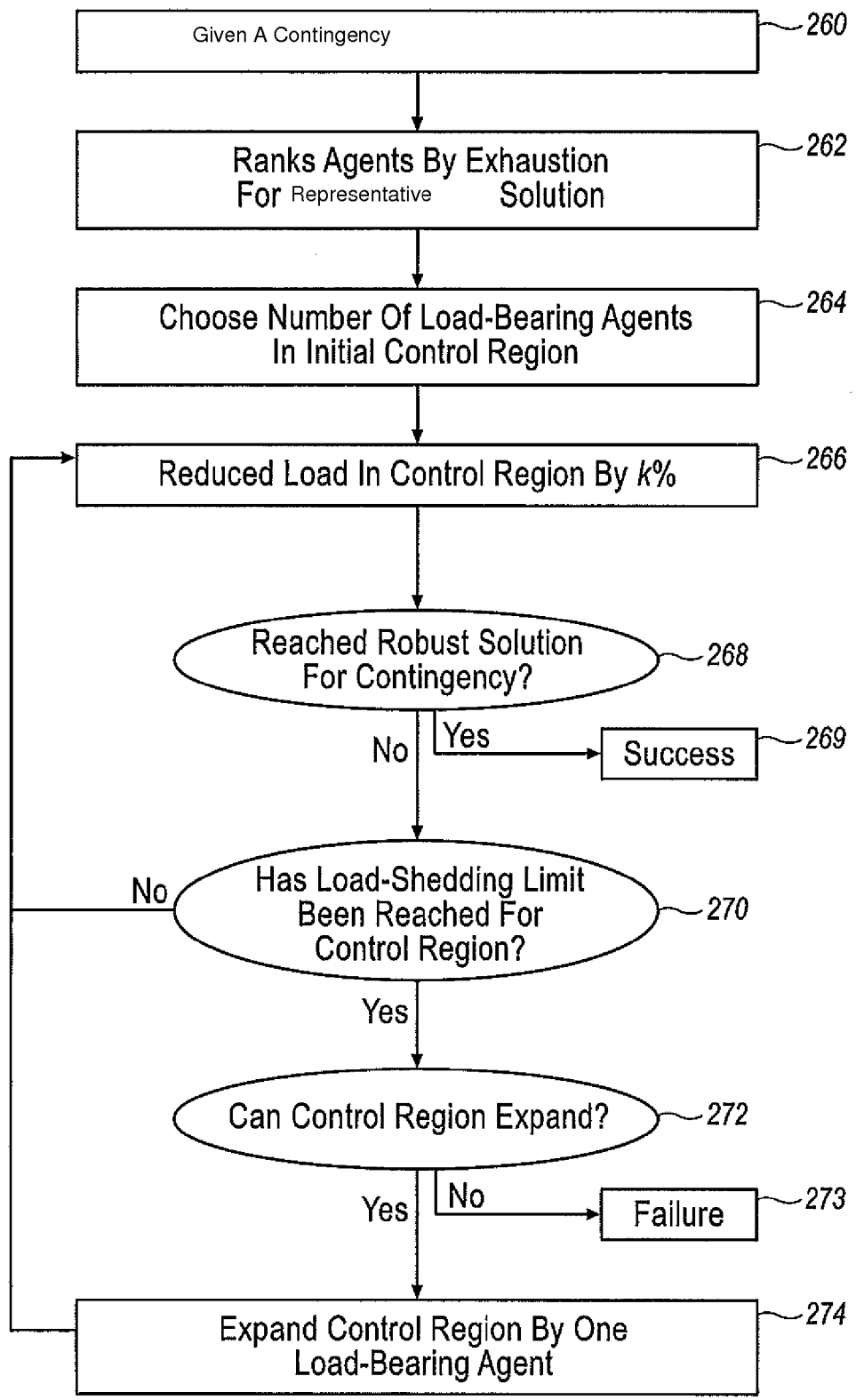
FIG. 15 is a flow chart for a procedure for preventative load shedding control.

FIG. 15 shows a procedure for preventive load shedding control. Given a contingency in step 260, step 262 requires that the load bearing agents be ranked based on their exhaustion of reactive reserves in the representative solution found using the series of snapshots process, the increasing percentage process or the prediction step of the representative solution process. The exhaustion factor used can be one of those discussed in step 54. Using the load bearing agent ranking of step 262 and/or using load bearing agents within the root cause that reduce the active and reactive flow on the root cause boundary branches, an initial control region comprising a set of load bearing agents is determined in step 264. Step 266 decreases load in the initial control region by a total of k %. The decrease in generation that accompanies the decrease in load can be from the swing bus, from all generators in a utility, or from all generators in the control region. The participation factor for generation response can be either for a governor loadflow or for an AGC loadflow. If the load shedding percentage in agents are at limits, then load shed on these agents are held at the limits in the next increase in load shedding percentage on the load bearing agents in the control set as shown in step 270. The decrease in generation on generators would reduce the generation below its lower limit, and the generation is set at the limit value and remains at that level for the next iteration of load and generation decrease. One can make these changes in small increments and determine if a loadflow solution is obtained.

A robust solution for a contingency cluster of contingencies of a particular kind or sub-kind of kind 2 or kind 4 would require that a representative solution be obtained and the reactive reserves on the generators of the agents in the control region be increased by a certain percentage of their reactive capability or that loadflow solutions be obtained for a certain number of consecutive small load shedding percentage changes for all contingencies in the contingency cluster. If a kind 2 or kind 4 contingency occurred, the control would be an emergency control to avoid blackout and cascading voltage instability or voltage collapse if either was occurring. If a kind 2 or kind 4 contingency had not occurred, then the control would be a preventive control if implemented but one might choose to implement a voltage rescheduling or if that is unsuccessful an active rescheduling control since load shedding is an emergency control for a contingency that has not occurred and thus has not produced an emergency condition. Furthermore, NERC Planning Criteria for expansion planning would not allow shedding of firm load for an unsolved or unstable N−1 contingency that occurred but would allow load shedding of firm load for an unsolved or unstable N−2 contingency. A robust solution for solving contingencies kind 3 or kind 5 contingencies in their contingency clusters and associated root causes for operations planning and operation would add reactive reserve in the control set or root cause by voltage rescheduling or by active rescheduling control and be a corrective control if such a contingency occurred and be a preventive control if no contingency in the contingency cluster occurred. One would not use load shedding for voltage stability insecure contingencies in the kind 3 or in the kind 5 contingency cluster that had occurred unless there were no feasible preventive control (voltage rescheduling, active generation rescheduling, unit commitment change) that becomes corrective control because the contingency occurred. A robust solution obtained by any preventive, corrective or emergency control would need to eliminate the root cause bus cluster and subareas for a contingency cluster for any kind of contingency.

If a robust loadflow solution is found in step 268, a robust loadflow solution is used for emergency load shedding control in step 269. This emergency control could be implemented by tripping large motors or industrial loads by tripping lines out of a substation if voltage at buses in the control set within the root cause. Other methods of implementation are possible to the skilled artisan in view of the teachings herein. A load shedding emergency control for a contingency cluster of contingencies with a root cause is needed if there was no feasible preventive control that becomes corrective if one of the contingency cluster contingencies occurs. The level of load shedding is decided to address all contingencies in the contingency cluster but could be adjusted to just those that are less severe than the one that actually occurred. This effort to minimize control would not be wise if additional stress in the root cause would cause the size of the subarea and the sub-kind of kind 2 contingency to be more severe.

If there is no loadflow solution obtained or no robust loadflow solution obtained or if all agents are at their load shedding percentage limits based on step 270, then additional load bearing agents are sought in step 272 that can be added to the control region based on the ranking of load bearing agents and/or the effect on the root cause used in selecting the initial control region. If additional agents are available, an additional load bearing agent is added to the control region and the procedure returns to step 260. If there are no additional agents in the control region in response to the query of step 274, then there is no emergency load shedding control available for the contingency selected in step 260.

Figure 16:
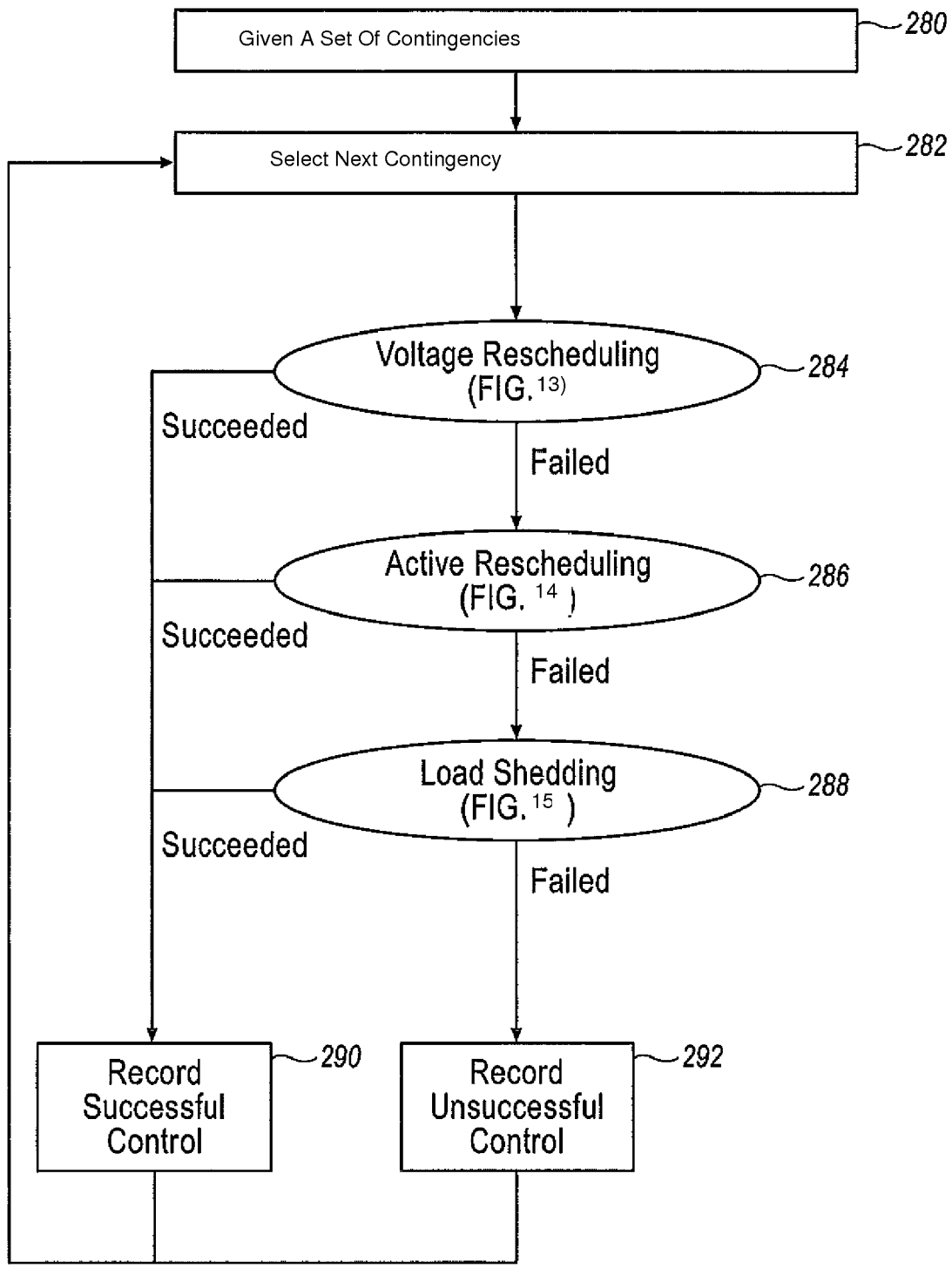
FIG. 16 is a flow chart for a procedure for determining preventive voltage rescheduling, active rescheduling and load shedding control for a set of contingencies.

FIG. 16 provides a procedure for determining preventive/corrective/emergency control for every contingency in a set of contingencies, preferably but not necessarily grouped by contingency kind and/or by root cause subareas. The control can be one or more of voltage rescheduling, active rescheduling and load shedding controls discussed above. Given a set of unsolved or unstable contingencies in step 280 that are to be considered in some determined or arbitrary sequence, control for each control option can be attempted for all contingencies in the set before proceeding to determine if another control is possible for all of the contingencies for which the first control option does not obtain a loadflow solution or obtains a solution where the subarea and root cause bus cluster symptoms are not eliminated using any or every possible simulation method as a list of contingencies or as shown in FIG. 16 for each individual contingency. The control would be preventive, corrective or emergency depending on whether the contingency occurred or whether no contingency in the set has occurred and the type of control used as noted above.

Furthermore, the sequence of controls shown is by no means the only sequence that is possible for any unsolved or unstable kind 2 and/or kind 4 contingency since one could employ adding generation through unit commitment or system design or could add additional voltage control devices as part of operation planning or system design. Given the implementation shown, one would select the contingency in step 282 and then successively apply voltage rescheduling, active rescheduling and load shedding. If the contingency has a loadflow solution for a single snapshot, multiple snapshot approximation of a dynamic simulation, for the increasing percentage simulation process, or for any other simulation method for obtaining a solution for any control option as well as eliminating the subareas and root cause bus cluster symptoms, it is recorded in step 290 without attempting any other control option. If the contingency has no loadflow solution via any and every simulation procedure for any control option it is passed to the next control option for determining control. If a contingency has no loadflow solution for a single snapshot or multiple snapshot approximation, for the increasing percentage simulation process or any other additional simulation methods that also eliminates the subareas and root cause bus cluster symptoms and thus the root cause after proceeding through all of the control options that could include voltage rescheduling of step 284, active rescheduling of step 286 or load shedding of step 288, one would record the contingency as having no possible control in step 292.

Note that one might restrict the kind of contingencies for which the load shedding option would be used to solely kind 4 and for a contingency cluster where a contingency has occurred. Each control option would involve knowing the root cause for a contingency cluster for a particular kind of contingency, applying the control sequence to all contingencies of the contingency cluster, and applying the control sequence appropriate for the kind of contingency.

Figure 17:
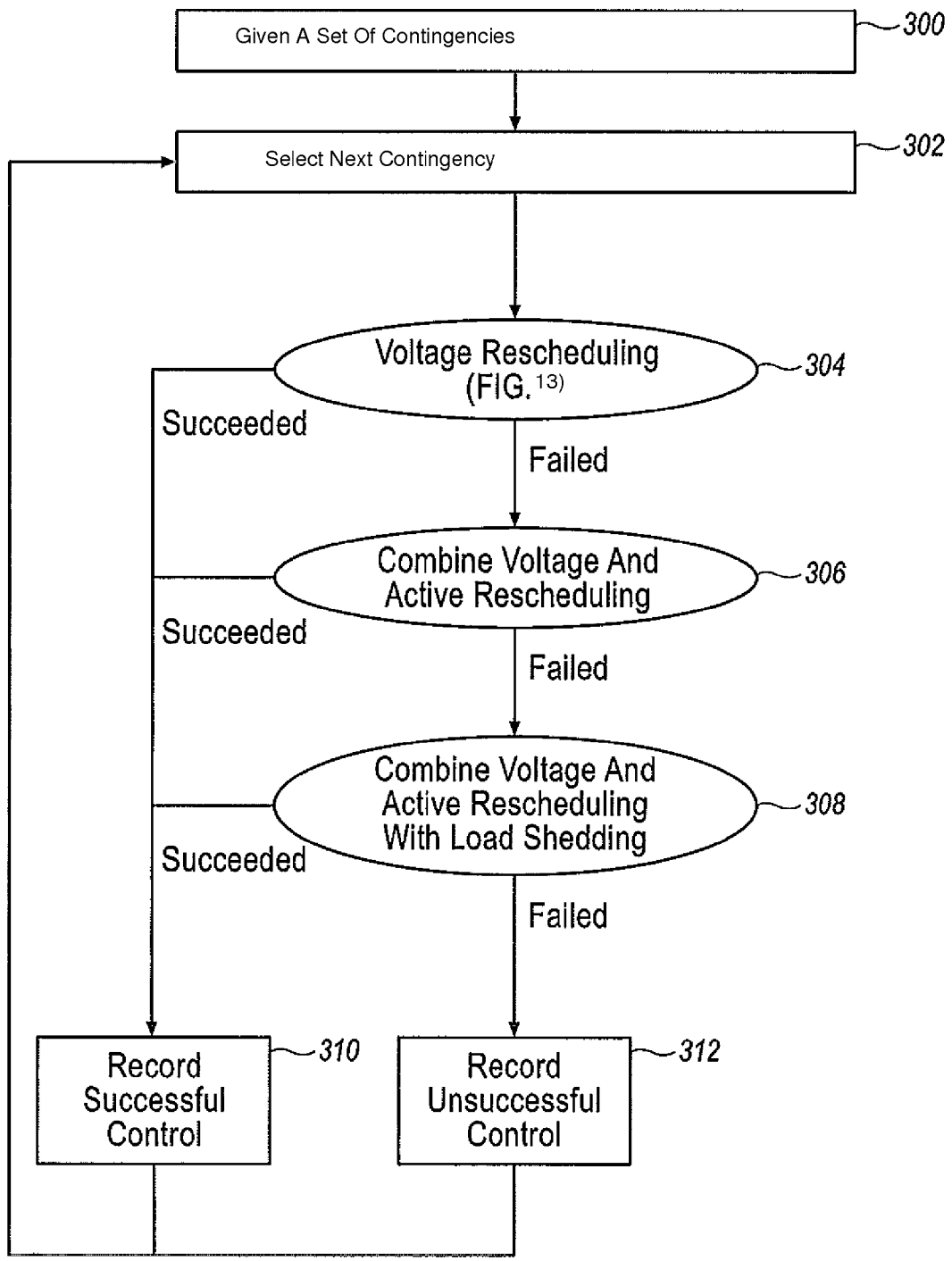
FIG. 17 is a flow chart of a procedure for performing combinations of preventative voltage rescheduling, preventative voltage and active rescheduling, and preventative voltage and active rescheduling with load shedding control.

FIG. 17 provides a procedure for performing combinations of voltage rescheduling, voltage and active rescheduling and voltage and active rescheduling with load shedding as a means of obtaining control for every unsolved or unstable contingency of kind 2 and/or kind 4. Note that current NERC Planning Criteria restricts shedding firm load for N−1 contingencies, so load shedding is not considered for kind 2 contingencies. Load shedding is not considered for kind 4 contingencies unless a first contingency of such N−2 contingencies has occurred. Given a set of contingencies in step 300 that are to be considered in some determined or arbitrary sequence, preferably but not necessarily grouped by contingency kind and/or by root cause subareas, control for each combination of control options can determined for all contingencies in the set before proceeding to determine if control is possible using another control option combination for all of the contingencies for which the first control option combination does not obtain a loadflow solution using any or every simulation method or does not eliminate the subareas and the root cause bus cluster and thus the root cause for the set of contingencies or as shown in FIG. 17 for each individual contingency of the contingency set. Furthermore, the sequence of control option combinations shown is by no means the only sequence that is possible for any contingency since one could employ adding generation through unit commitment or system design or could add additional voltage control devices as part of operation planning or system design to produce additional control option combinations.

Given the implementation shown, one would select the contingency in a contingency cluster in step 302 and then successively apply voltage rescheduling in step 304, voltage and active rescheduling in step 306 and voltage and active rescheduling with load shedding in step 308. If the contingency has a loadflow solution that eliminates the subareas and root cause bus cluster and thus the root cause for a single snapshot, multiple snapshot approximation of a dynamic simulation, for the increasing percentage simulation process, or for any other simulation method for any control option combination, it is recorded in step 310 without necessarily attempting any additional control option combinations. If the contingency has no loadflow solution for any control option combination, it is passed to the next control option combination for determining control. If a contingency has no loadflow solution for a single snapshot or multiple snapshot approximation of a dynamic simulation, for the increasing percentage simulation, or any other additional methods for simulating to obtain a solution or does not eliminate the subareas and root cause bus cluster and thus the root cause after proceeding through all control option combinations, one would record the contingency as having no possible control in step 312.

The voltage and active rescheduling control combination could increase voltage setpoints on all generators in the control set and increase and decrease generation on subsets of the generators in the control set by any of the participation factors used for active rescheduling alone. Voltage and active rescheduling could increase voltage and active power via participation factors for the same set of generators and could decrease voltage setpoints and active power via participation factors on the same set of generators. The set of generators experiencing voltage and active power increase and the generators that experience voltage and active power decrease could be selected by the same procedure as used in active power rescheduling. This would produce an active and reactive transfer increase on the same paths and root cause boundary elements and hopefully reduce losses on the branches in the root cause boundary so that the one would eliminate the root cause subareas and the root cause bus cluster. The participation factors for generators experiencing active power generation increase and the participation factors for generators experiencing active power generation decrease could be the same as for active power rescheduling. Voltage and active rescheduling with load shedding could perform load shedding on an agent when all the generators belonging to the agent are in the control set.

Figure 18A:
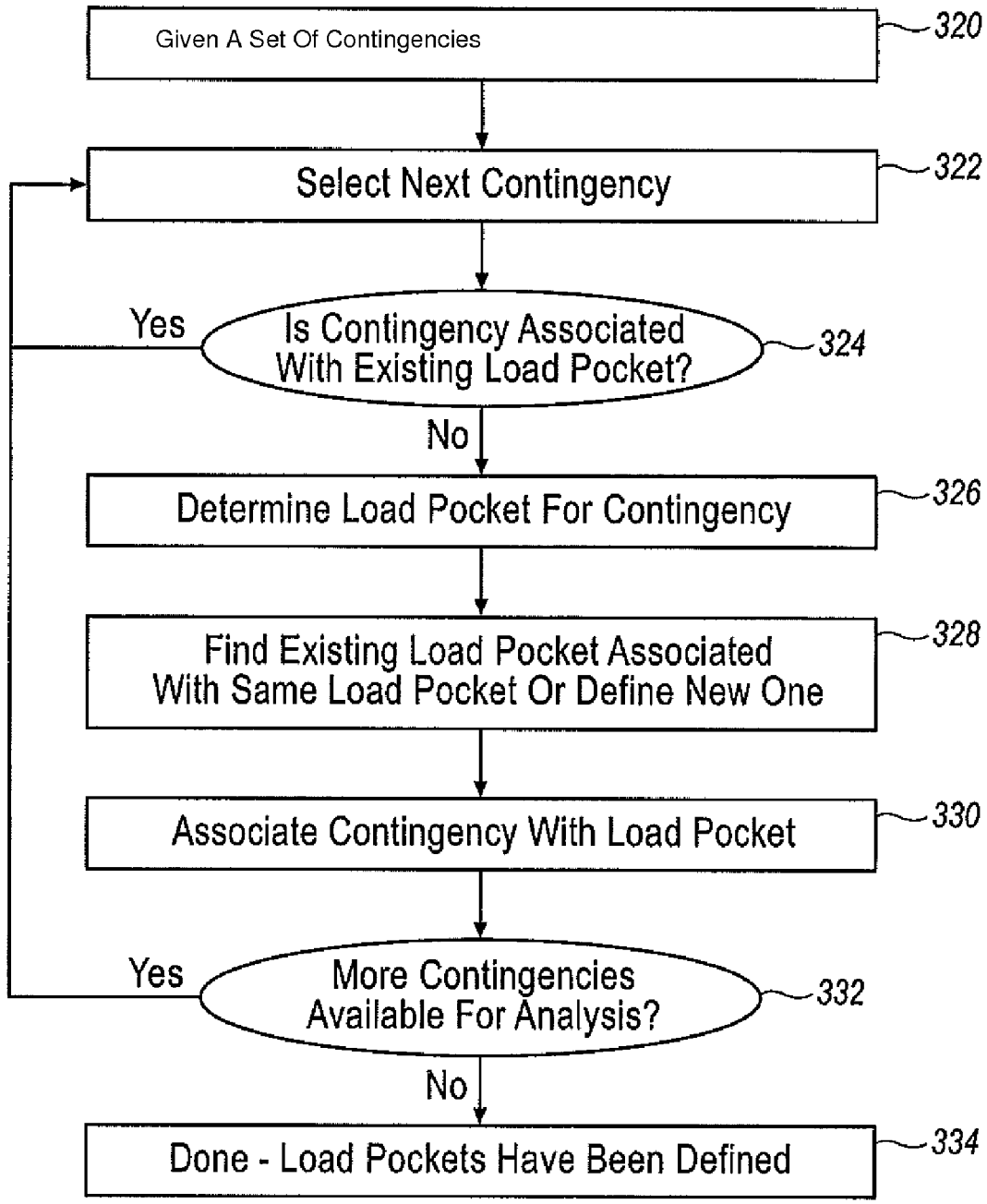
FIG. 18A is a flow chart for a procedure for associating non-solving contingencies with load pockets and thereby finding all of the load pockets for area and regional family subnetworks that are vulnerable to voltage instability.
Figure 18B:
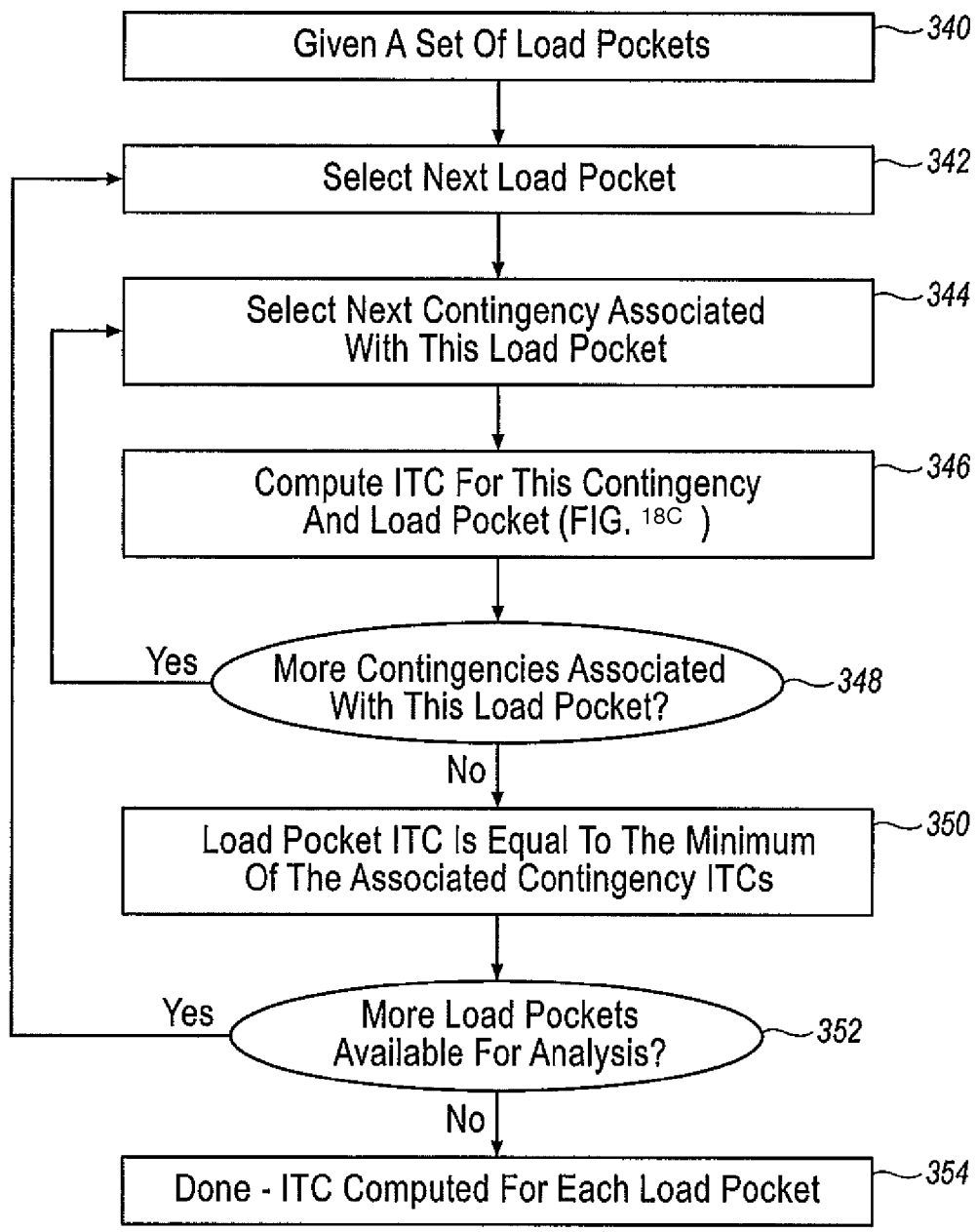
FIG. 18B is a procedure for calculating incremental transfer capability for a load pocket.
Figure 18C:
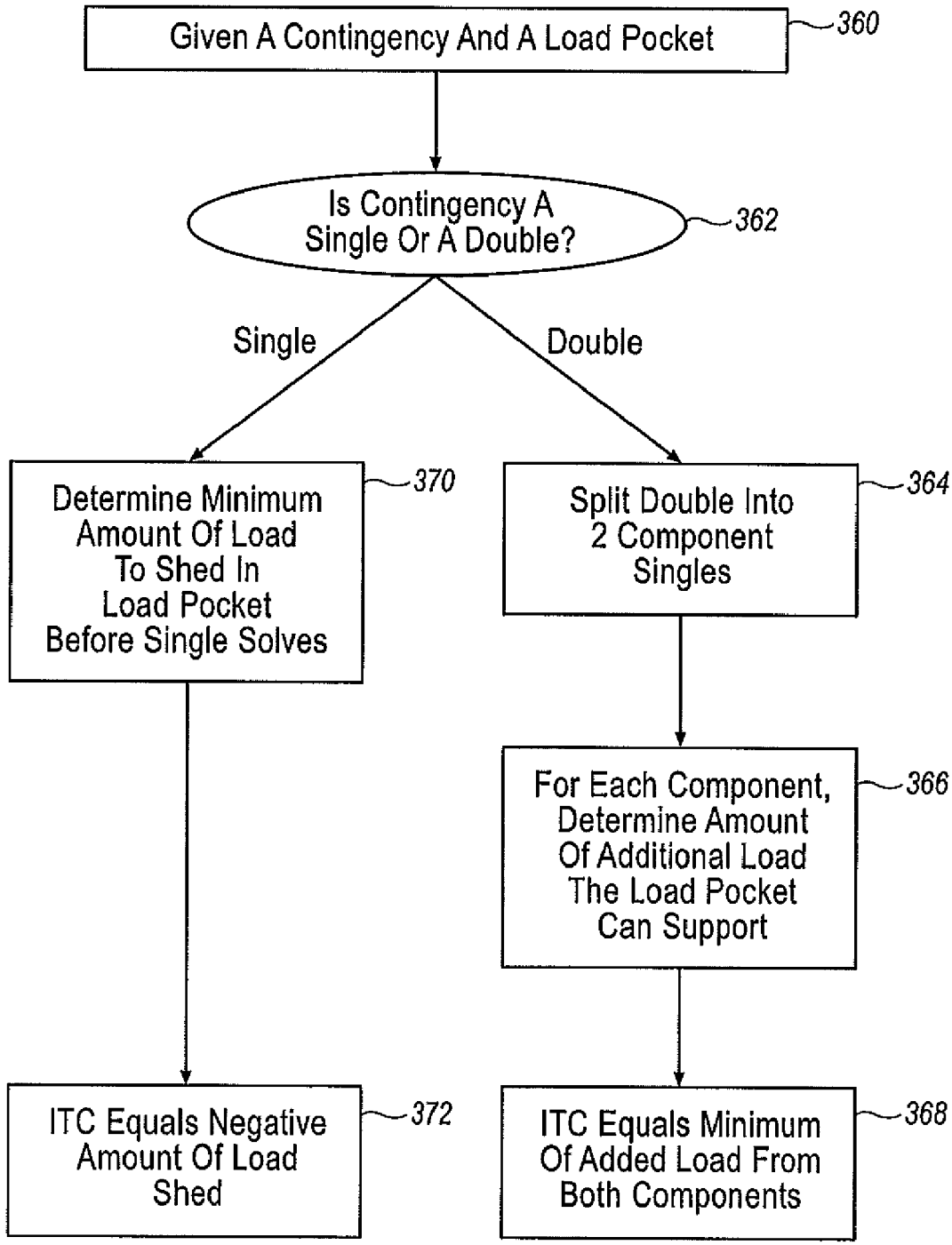
FIG. 18C is a flow chart for a procedure for determining incremental transfer capability for each single and double contingency that is vulnerable to voltage instability on a particular load pocket.

FIGS. 18A-C provide a procedure for finding all of the loadpockets or area (inter-regional) and regional family subnetworks that are vulnerable to voltage instability in FIG. 18A, a procedure for determining Incremental Transfer Capability for each of the single and double contingencies that are vulnerable to voltage instability on a particular load pocket in FIG. 18C, and finally the incremental transfer capability for each load pocket in FIG. 18B.

FIG. 18A selects a contingency in step 322 from a set of single and double contingencies that are given in step 320. In step 322 the load pocket is determined (a) based on an exhaustion factor such as discussed in step 54 or (b) an exhaustion factor and an exhaustion factor criteria that determines which subnetworks or subareas belong to the impact region of a contingency for a specific system based on the knowledge of a skilled artisan in the field in view of this disclosure. The impact region is divided into family lines and families. The local area or regional subnetwork or subarea contains all the subnetworks/subareas in a family of subareas. The sub-regional subarea contains all of the subareas in a family line of subareas. The impact region for a contingency can be one or more of a local subarea where voltage stability only occurs within it and can not cascade along one or more family lines of subareas for more severe contingencies, a family line of subareas (sub-regional subarea) or family of subnetworks/subareas (regional subareas) or can be an inter-regional subarea. Step 326 determines the control region for the contingency based on the preventive control determined in FIG. 16 or 17. Step 324 determines if the control region and/or impact region (e.g. subarea) for a contingency is similar to a load pocket for a contingency already evaluated and is identified as a contingency impacting that load pocket in step 330. If the control region and/or impact region is not similar to that found for any other contingency evaluated, then an additional load pocket is identified in step 328 and the contingency is associated with it in step 330. If there are additional contingencies that have not been identified as being associated with a load pocket, then the procedure returns to step 322 and selects the next contingency. If all contingencies have been identified with a load pocket, the procedure in FIG. 18A is complete. Load pockets with overlapping control regions may require coordination of control with other load pockets that share generators, voltage controls devices and loads. The control for each overlapping load pocket must be modified with the possibility of adding to the control set for each load pocket so that the control can obtain a solution for all contingencies associated with each load pocket.

FIG. 18B starts at step 340 having completed the procedure of identifying all load pockets. Step 342 selects a load pocket for computation of incremental transfer capability (ITC). Step 344 first determines if there is any single contingency associated with the load pocket since if there is a single contingency associated with the loadpocket, incremental transfer capability will be negative and determined based on the amount of load that needs to be shed in the load pocket to determine a solution for every single contingency associated with the load pocket. If there are no single contingencies that are associated with the load pocket, the procedure computes the maximum transfer of power or maximum loading of buses in subnetworks/subareas in the load pocket using a PV curve where the generation response due to loading is a governor loadflow on generators in the utility, transmission operator, control region or impact region if the generators in the control region cannot pick up additional generation due to generation limits. The procedure for computing the maximum loading or transfer limit, required to be determined in step 346, is given in FIG. 18C. A test is made in step 348 to determine if there are additional contingencies associated with the load pocket for which an ITC value has not been determined. If there are additional contingencies for which an ITC value has not been computed, the next single or double contingency is selected and an ITC value is determined from steps 344-348. If an ITC value is computed for every contingency (only singles if there are singles associated with the load pocket and only double contingencies if there are no single contingencies associated with the load pocket), then an ITC is computed for that load pocket as the minimum ITC value for all contingencies for which an ITC value is computed and are associated with the load pocket in step 350. A test is performed to determine if there are any additional load pockets in step 352. If there are additional load pockets in step 352, a load pocket is selected in step 342, and the ITC is evaluated for that load pocket using steps 342-350. If there are no additional load pockets for which an ITC is to be computed in step 352, the procedure of FIG. 18B terminates having computed an ITC value for each load pocket.

Having determined if there are single contingencies associated with the load pocket in step 344 in FIG. 18B and either having determined all of the single contingencies for which an ITC value is to be computed or determined all the double contingencies associated with the load pocket if all of the contingencies associated with the load pocket are double, then an ITC value is required to be computed for each of these contingencies in step 346.

FIG. 18C shows the method of computing ITC given a specific contingency and load pocket in step 360. In step 362, the contingency is tested to determine if it is a single or double contingency. If the contingency is a single contingency, preventive load shedding control described previously is used to determine the minimum amount of load to shed in the control region before the single contingency has a loadflow solution. The variation in the amount of load to be shed based on factors other than generators that respond to the load shedding can be used to determine a transmission reliability margin (TRM) and the variation due to governor response can be used in part to determine a capacity benefit margin (CBM) for that contingency. If the contingency is a double contingency, the double contingency is split in two component single contingencies in step 364. The minimum amount of additional load or transfer into the control region before the loadflow has no solution for either component single contingency due to variation in governor response and due to such changes as power factor and load pattern variation is the ITC value for that double contingency. If load is scaled in the control region, the transfer could be the load increase minus the generation increase on the control region generation. The variation due to governor response can be taken in part within the capacity benefit margin and the variation due to non governor response factors can be taken in part to determine the transmission reliability margin for the double contingency.

Figure 19:
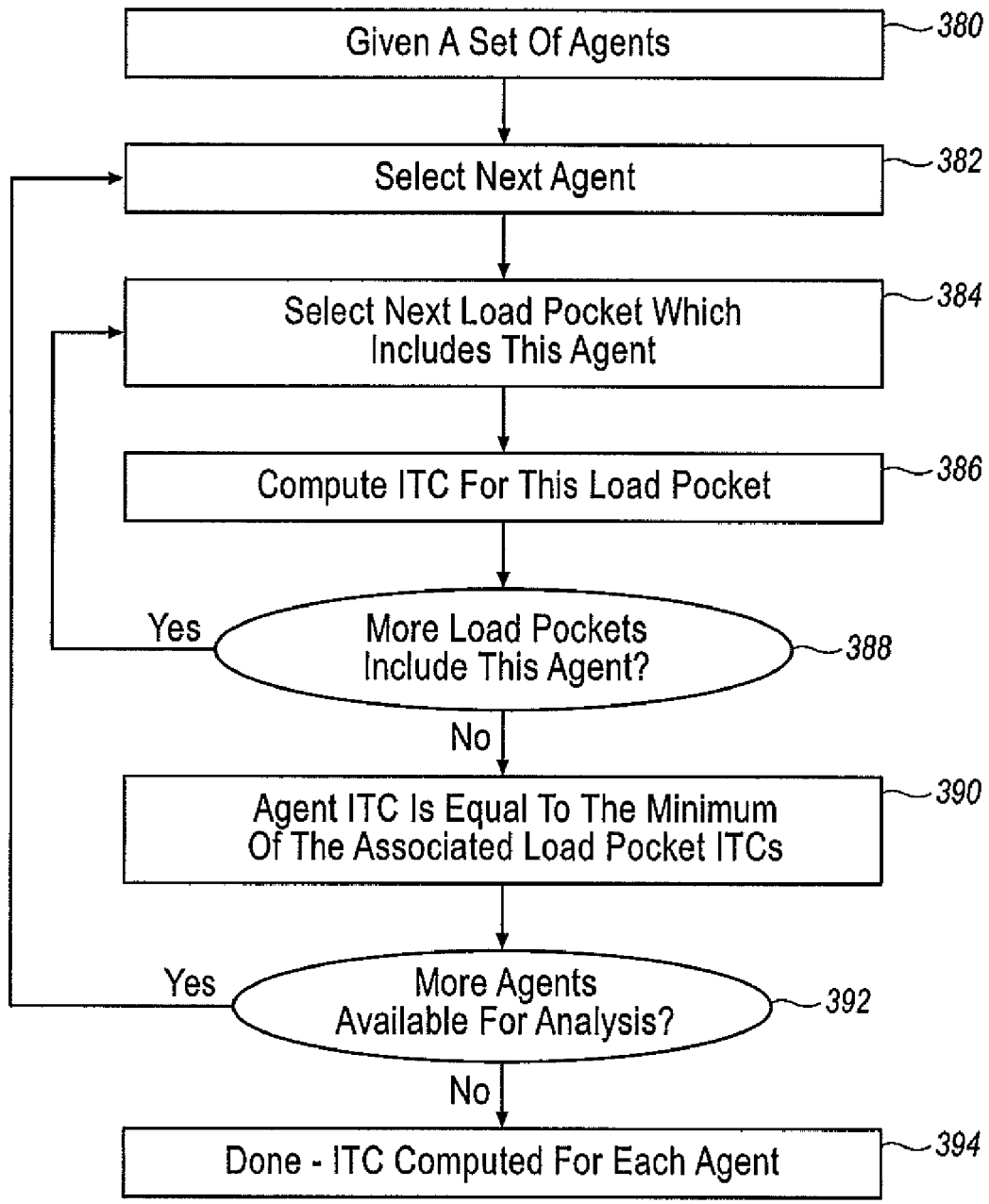
FIG. 19 is a flow chart for a procedure for computing incremental transfer capability for an agent that belongs to a regional or an area subnetwork.

FIG. 19 shows a procedure for computing an ITC value for an agent that is an inter-regional, regional, sub-regional, or local area subnetwork/subarea or belongs to one since the procedure in FIG. 18 is associated with the specific subnetworks/subareas in the control region of a load pocket. Although the load or transfer into the control region of a specific load pocket with one or more local area, sub-regional, regional or inter-regional subnetworks/subareas is critical to obtaining a solution, one cannot ignore additional stress in other subnetworks/subareas in the loadpocket as being a cause of voltage instability. The procedure as shown in FIG. 19 requires a set of agents in one or more load pockets be given in step 380. A specific agent is selected in step 382. A load pocket is selected that contains this agent is determined in step 384. The ITC value for adding load to this agent that belongs to a specific load pocket is determined for all contingencies associated with the load pocket and can be negative if there are single contingencies that have no loadflow solution in step 386. A test for additional load pockets that contain this agent is conducted in step 388. If there are additional load pockets, the ITC value is computed for that load pocket using steps 384-388. If there are no additional load pockets, an agent ITC is the minimum of the ITC values associated with the load pockets that contain that agent in step 390. In step 392, a test is used to determine if there are additional agents for which an ITC value is desired. If there are additional agents, the procedure of steps 382-390 is repeated. If there are no additional agents for which an ITC value is desired, the procedure terminates.

Figure 20:
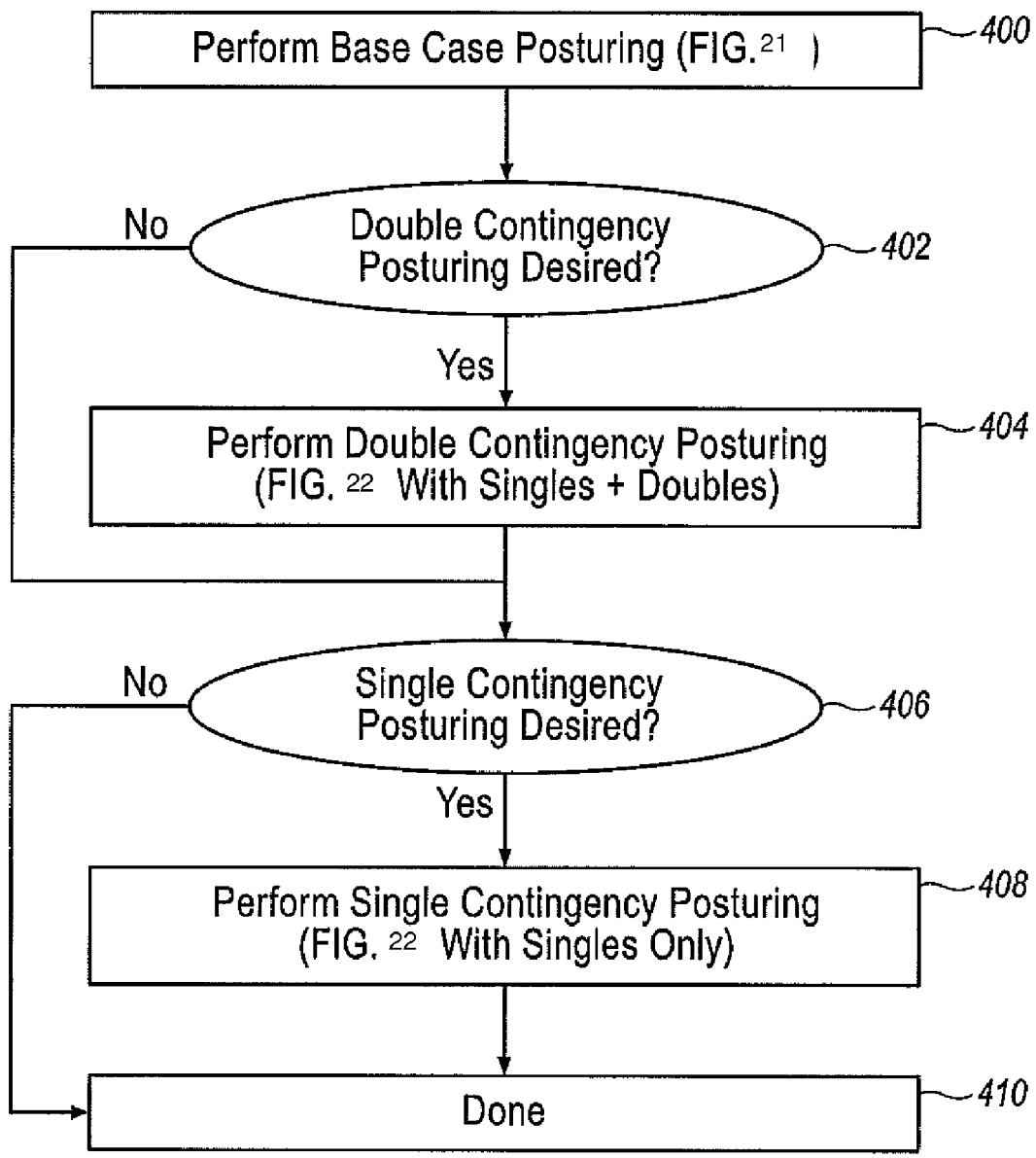
FIG. 20 is a flow chart of a procedure for posturing a system so that voltage instability will not occur for contingencies caused by one or more load pockets.

FIG. 20 shows a procedure for posturing a system so that voltage instability will not occur for contingencies caused by one or more load pockets. Load pockets can be determined using the procedure of FIG. 18A. Load pockets such as local area, sub-regional, regional and inter-regional subnetworks/subareas are associated with voltage instability in several subnetworks/subareas contained in the load pocket and for all cascading instability problems in the load pocket. The control regions for all of these contingencies that affect the load pocket are contained in the load pocket. The first procedure would attempt to perform posturing in the base case in step 400 using a procedure described in FIG. 21. A question on whether posturing is desired for double contingencies is asked in step 402, and if the answer is yes, the procedure given in FIG. 22 is implemented in step 404. A question on whether posturing is desired for single contingencies is asked in step 406, and if the answer is yes, the procedure given in FIG. 22 is implemented in step 408.

Figure 21:
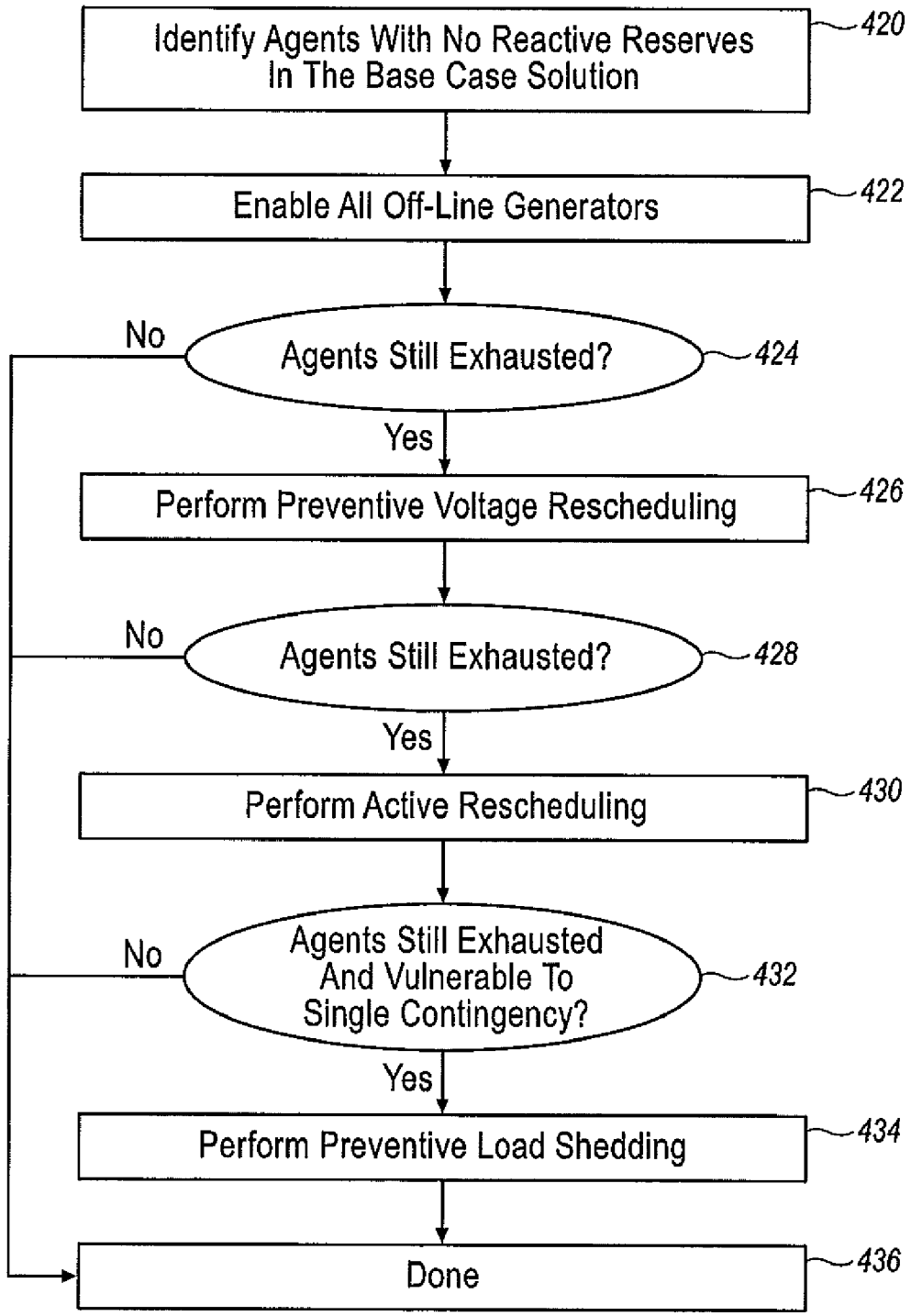
FIG. 21 is a flow chart of a procedure for base case posturing.
Figure 22:
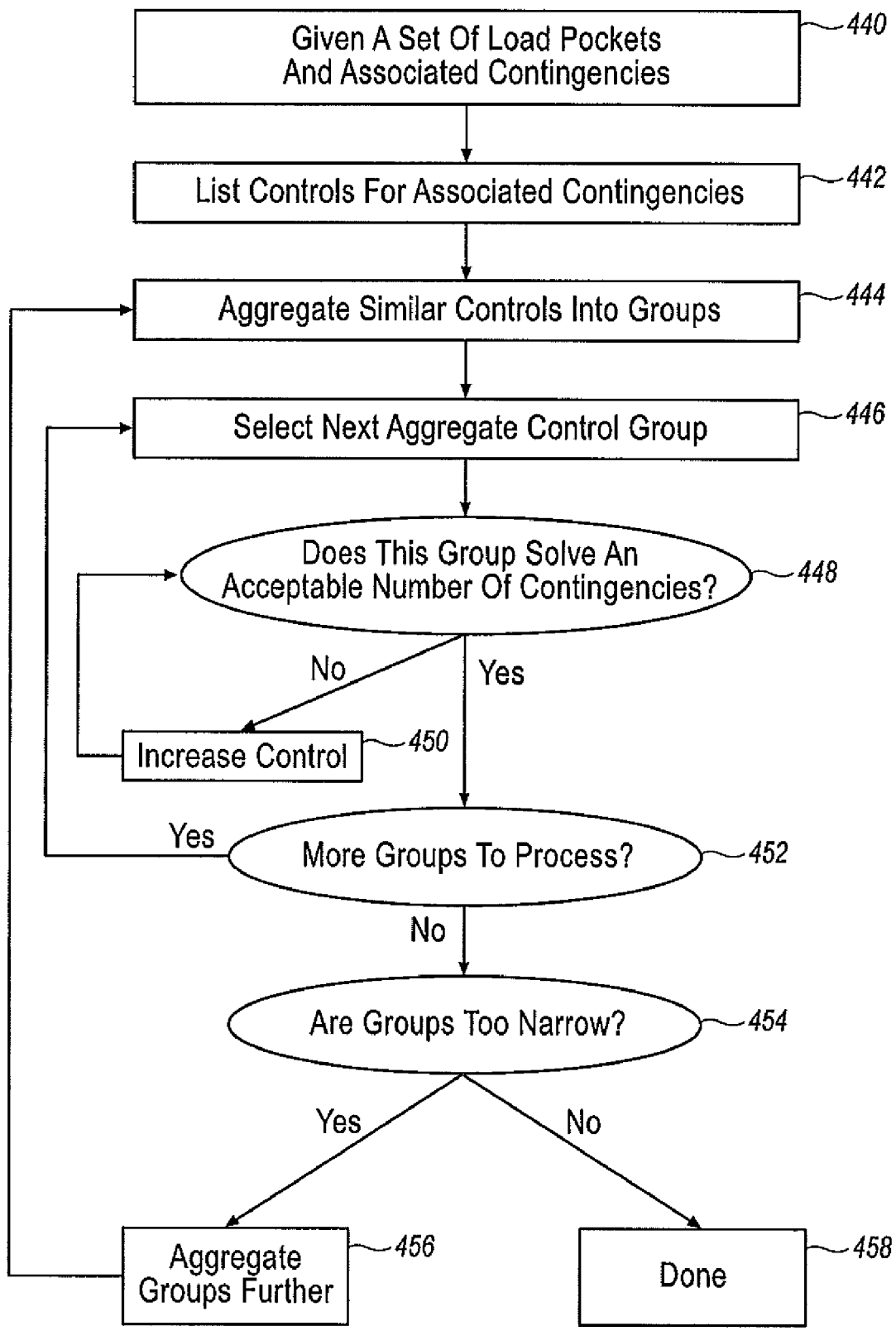
FIG. 22 is a flow chart of a procedure for associating controls with groups of load pockets.

FIG. 21 shows a procedure for base case posturing. In step 420 all agents with no reactive reserves in the base case are determined. In step 422 all off line generators are connected that belong to the same stations as generators belonging to the set of voltage control/reactive supply devices (a) that belong to the fully exhausted base case agents or (b) that belong to the same stations of generators that have fully exhausted reactive reserves and belong to the vulnerability region of fully exhausted agents. This should dramatically reduce the number of contingencies with no loadflow solution. Generators are then added that are electrically close to the vulnerability region of regional subnetworks/subareas that cover a large number of buses and a large customer load and that contain some subnetworks/subareas that are fully exhausted. This should also dramatically reduce the contingencies that have no loadflow solution. Adding generators close to the vulnerability region of regional subnetworks/subareas that have no fully exhausted subnetworks and that contain a large number of buses and a large load should reduce the number of contingencies that cause voltage instability on these subnetworks/subareas as well as the importance of these subnetworks/subareas, which is proportional to the number of buses, generators and load contained in each subnetwork/subarea. Finally, adding generators close to area subnetworks/subareas that are contingency vulnerable and belong to the impact region of a large number of contingencies should reduce the number of contingencies for which voltage instability is produced, reduce the reactive and active reserves on the subnetworks/subareas that indicate weakness, and possibly reduce the importance of the network produced by the number of contingencies.

The identification of load pockets and control regions for each contingency is useful for determining postured control. This should dramatically reduce the number of equipment outages that cause these area subnetworks/subareas to belong to the impact region. An alternative to changing the unit commitment would be adding switchable shunt capacitors near the affected agents' generators that are fully exhausted or that are regional and contingency vulnerable as a operation planning change or as a system design change. In step 424, the agents that remain fully exhausted are identified and in step 426, preventive voltage rescheduling is performed in an attempt to increase reactive reserves on these agents that remain fully or partially exhausted and thus reduce the number of contingencies that have no solution or that place the agent in its impact region. In step 428, the agents that remain fully exhausted are identified after adding generators or switchable shunt capacitors and performing voltage rescheduling. In step 430, preventive active rescheduling is performed in an attempt to increase reactive reserves on these agents and thus reduce the number of contingencies that have no solution or that place the agent in its impact region. In step 432, a test is performed to determine if there are agents that are fully or partially exhausted or that lie in the impact region of single contingencies. In step 434, preventive load shedding is performed in such agents to reduce the number of contingencies that have no loadflow solution or that are in the impact region for single and double contingencies.

FIG. 22 shows a postured control for a set of load pockets and associated contingencies given or determined in step 440. This postured control for a set of load pockets is accomplished by root cause based control. In step 442, the controls for each of the contingencies associated with the load pocket are listed. In step 444, similar controls are aggregated into a groups of aggregate controls, where the aggregate control is scaled, contains all of the control action of similar but not identical control and may include additional control in the control region for the aggregate control than are part of the union of the controls used for any of the contingencies for which the aggregate postured control is successful in obtaining solutions. An aggregated postured control is selected for testing in step 446 and is tested for all contingencies associated with any of the controls that are aggregated in step 448. If the aggregate postured control solves all of the contingencies then the aggregate postured control is used for all of those contingencies. If the aggregate postured control is not sufficient to obtain solutions for all of the contingencies, processing continuously scales the control and adds additional controls to the control region in step 450 in an attempt to obtain solutions for all of the contingencies that have similar controls that are aggregated into a single postured control. Next it is determined if there are additional aggregated controls that have not been tested in step 452. If there are aggregate controls that need testing, steps 446-452 are repeated to test these aggregate controls. The possibility of further aggregating controls that are similar is assessed in step 454, and these more robust aggregate postured controls are formed and tested in step 456.

Once the single and double contingency analysis is performed and the boundary case solution's maximum percentage of the outage for each contingency has been identified, the flowchart depicted in FIG. 8 is used to determine the agents in the predicted control region where control can be performed in step 39 of FIG. 3. In step 39, if the agents are assessed according to the exhaustion of the reactive reserves, then control actions such as voltage rescheduling, active rescheduling and load shedding will be performed according to the agent severity rankings. The agents with the greatest exhaustion of reserves Y for each contingency are identified as the predicted control region for that contingency. A specific example of certain teachings herein is set forth below.

EXAMPLE

By way of a non-limiting hypothetical example, the above-described process is explained in conjunction with an example based on the tables set forth below. In Table 1, the leftmost column identifies each specific bus of an area in the determined region of interest and buffer zone in the electrical power system that is under study. The middle column in Table 1 defines the actual loads on the respective buses. The rightmost column defines the reactive reserves or generators that are depleted at the point of maximum load for the specific bus using a stress test such as a VQ curve. For the purpose of this example, reactive reserves are listed only as generators. The generators A, B, C, D, and E referenced in Table 1 correspond to the generators listed in FIG. 5.

TABLE 1

Reactive Reserves of buses

| Bus # | Real Load (MW) | Gens Exhausted |
|---|---|---|
| 1 | 15 | A |
| 2 | 0 | B |
| 3 | 0 | B |
| 4 | 100 | A, C |
| 5 | 0 | A, B |
| 6 | 0 | A |
| 7 | 10 | A, B, C |
| 8 | 30 | B, D |
| 9 | 40 | B, D |
| 10 | 200 | E |
| 11 | 0 | B, D, E |
| 12 | 10 | A |

The results in Table 1 above are used to group buses into agents as shown in Table 2 by finding buses that exhaust exactly the same set of generators at the point of maximum load for the bus.

TABLE 2

Reactive Reserves of Agents

| Agent # | Buses Included | Shared Generators | Load on Agent (MW) |
|---|---|---|---|
| 1 | 7 | A, B, C | 10 |
| 2 | 4 | A, C | 100 |
| 3 | 1, 6, 12 | A | 25 |

TABLE 2-continued

Reactive Reserves of Agents

| Agent # | Buses Included | Shared Generators | Load on Agent (MW) |
|---|---|---|---|
| 4 | 5 | A, B | 0 |
| 5 | 2, 3 | B | 0 |
| 6 | 8, 9 | B, D | 70 |
| 7 | 11 | B, D, E | 0 |
| 8 | 10 | E | 200 |

Each generator is defined as shown in Table 3 according to its Qgenbase, Qmax and Qmax-Qgenbase as is described in the previous sections.

TABLE 3

Base case reactive values of Generators (before Contingency)

| Generator ID | Qgenbase (MVar) | Qmax (MVar) | Qmax-Qgenbase MVar) |
|---|---|---|---|
| A | 500 | 1000 | 500 |
| B | 0 | 10 | 10 |
| C | 90 | 100 | 10 |
| D | 25 | 100 | 75 |
| E | 50 | 200 | 150 |

Next, all single contingencies are analyzed by sequentially outaging elements such as lines, generators, transformers and buses to calculate the reserves on generators after an outage has occurred. The results of this analysis for this hypothetical contingency, which will be referred to as contingency F, are shown in Table 4.

TABLE 4

Effects of a contingency F on the reactive output of generators

| Generator ID | Qgenbase (MVar) | QgenOutage (MVar) | Qmax (MVar) |
|---|---|---|---|
| A | 500 | 500 | 1000 |
| B | 0 | 10 | 10 |
| C | 90 | 50 | 100 |
| D | 25 | 100 | 100 |
| E | 50 | 150 | 200 |

The values are then summed for each agent and the exhaustion factor for hypothetical contingency F is then calculated by using the summed values in equation (1) or equation (2) for each agent. The results using equation (1) are shown below.

TABLE 5

Exhaustion factors for agents for contingency F.

| Agent # | Shared Generators | QgenBase (MVar) | QgenOutage (MVar) | Qmax (MVar) | Exhaustion Factor |
|---|---|---|---|---|---|
| 1 | A, B, C | 590 | 560 | 1110 | 105% |
| 2 | A, C | 590 | 550 | 1100 | 107% |
| 3 | A | 500 | 500 | 1000 | 100% |
| 4 | A, B | 500 | 510 | 1010 | 98% |
| 5 | B | 0 | 10 | 10 | 0% |
| 6 | B, D | 25 | 110 | 110 | 0% |
| 7 | B, D, E | 75 | 260 | 310 | 21% |
| 8 | E | 50 | 150 | 200 | 33% |

The agents can then be assessed according to reactive remaining exhaustion factor as shown in Table 6.

TABLE 6

Agents assessed on exhaustion factor for contingency F

| Agent # | Exhaustion Factor | Load (MW) | Included Generators |
|---|---|---|---|
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

Following the same procedure, another table of data similar to that of Table 6 is defined below in Table 7 for two more hypothetical single contingencies (G and H). The sample exhaustion factors for each are provided and could be derived in a similar manner, but will be omitted to avoid redundancy. Also, data for contingency F is provided from Table 6 for convenience.

TABLE 7

Exhaustion factors for hypothetical single outages F, G and H

| Agent # | Exhaustion Factor F (%) | Exhaustion Factor G (%) | Exhaustion Factor H (%) | Load (MW) | Included Generators |
|---|---|---|---|---|---|
| 5 | 0 | 60 | 100 | 0 | B |
| 6 | 0 | 50 | 5 | 70 | B, D |
| 7 | 21 | 0 | 5 | 0 | B, D, E |
| 8 | 33 | 30 | 10 | 200 | E |
| 4 | 98 | 100 | 0 | 0 | A, B |
| 3 | 100 | 110 | 20 | 25 | A |
| 1 | 105 | 10 | 40 | 10 | A, B, C |
| 2 | 107 | 20 | 50 | 100 | A, C |

In a realistic study, these reactive remaining exhaustion factors are computed for all single outages within the region of interest, but this example will contain only F, G and H. The skilled artisan will then select values of X % and N indicating that single contingencies which exhaust at least Y=(100−X) % of the reactive reserves (or has less than X % of its reserves remaining) of N agents will be considered for double contingency analysis. A sample tool to aide this selection process is defined in Table 8.

TABLE 8

Aid in selecting double contingencies based on the exhaustion factors of single contingencies

| Exhaustion Factor (%) | 1 Agent | 2 Agents | 3 Agents | 4 Agents | 5 Agents |
|---|---|---|---|---|---|
| 0 | FGH | F | | | |
| 10 | FGH | FGH | H | H | |
| 20 | FGH | FGH | FGH | H | H |
| 30 | FGH | FGH | FGH | GH | H |
| 40 | FGH | FGH | FGH | FGH | H |
| 50 | FGH | FGH | FGH | FGH | GH |
| 60 | FGH | FGH | FGH | FGH | GH |
| 70 | FGH | FGH | FGH | FGH | GH |

For the purposes of this example, a tool with N=1-5 and X %=0%-70% in steps of 10% has been provided. It is possible to increase or decrease any or all of these values to create a much larger and more granular set of cells. The outages placed in each cell represent the pool of single outages that would be combined to make double outages if that particular cell is selected. If N=3 agents is selected as well as X %=30, then, using Table 8, the single outage pool would consist of the set {F, G, H}. These are then combined to create all possible combinations M*(M−1)/2. In this case M=3, so the number of combinations is 3, namely FG, FH and GH. In this example, these three double contingencies will be simulated. In a more realistic example, there would be hundreds or thousands of single outages in each cell. The procedure for a particular X % and N selection will not in general find all double outages that have no solution. Increasing X and decreasing N will cause more double outages to be evaluated. Another possibility is to perform the step of selecting X and N twice and add the non overlapping outages in the two sets. The second selection might be N=1 when the first selection was N=3. There are several possible methods for determining all the outages have no solution that would be apparent to the skilled artisan based on the teachings herein.

Once the pool of single and double contingencies has been simulated, those that are determined to be potential causes for voltage collapse, local blackout or voltage instability are identified. One possible way to make this determination is by choosing the set of single contingencies as well as the set of double contingencies that were unable to reach a solution to the load flow equations when outage is simulated but the increasing percentage method and the maximum percentage of the outage remaining in the system is not equal to zero. Herein, this determination is made using the representative solution process.

Using the representative solution process, a representative solution is obtained for each of the single and double contingencies. Loadflow values in the representative solution indicate symptoms of voltage instability that can be tabulated, including exhaustion of generators and other reactive sources.

Referring to step 38 in FIG. 3, the symptoms can be grouped to identify one or more root cause(s) for different kinds of contingencies. Based on the kind of contingency, a solution is proposed at the root cause(s).

For a contingency kind involving operations planning or control, for example, results of exhaustion factor ranking for sources within a root cause can be used to identify remedial actions, such as shedding load, adding new generation, rescheduling active power on existing generation or rescheduling voltage for strengthening the electrical power system in critical locations. More specifically, by knowing the specific agents that are the most completely exhausted, one can determine the generators where control actions should be taken as well as the specific loads that could be shed to obtain solutions to the load flow equations. As just one example, from Table 9 above it can readily be determined that agents 8, 7, 6 and 5 are depleted by a large percent and belong to a predicted control region. As such, these predicted control region agents may be characterized as critical agents and critical agents with buses that have load contained therein may be referred to as load pockets, as the reactive reserves of the agents are depleted beyond a significant amount. The actual amount needed to characterize an agent as a critical agent may be determined arbitrarily depending on system tolerances. For purposes of this example, agents depleted beyond 50% will be considered as critical agents belonging to the predicted control region. However, one skilled in the art will readily recognize that variations from the percentages provided in this application may be chosen to define critical agents in the predicted control region.

The order in which control actions are taken for critical agents in a predicted control region can be in the assessed order of the reactive remaining exhaustion factors (note that there are different possible methods for computing the exhaustion factors as noted earlier). This could be the order in which the reserves are exhausted. Thus, performing control on agents in this order attempts to obtain solutions on agents in the same order as their exhaustion of reactive reserves or where the impact of the exhaustion is greatest. This procedure works very well as the agents that exhaust first or are impacted greatest cause cascading exhaustion of reserves and presumably instability. Thus, if control can provide reverses on these agents, one has presumably addressed the problem at its source. Another method can be used is to perform control action at larger agents in family lines with non-zero exhaustion factors as voltage collapse can eliminate the ability to obtain reactive supply to the most impacted agents as determined by exhaustion factor. This method also provides solutions and has been effective when the exhaustion factor ranking method for deciding agent control priorities does not obtain solutions. The method uses an exhaustion factor control that increases reserves in the most impacted agents identified by ranking of the exhaustion factors, but would use the additional control in large agents in the different family lines to obtain solutions. Finally, one could attempt control in order of the largest to smallest exhaustion factor agents. This process attempts to reverse the cascading rather than track the cascading as in the first method. Other methods of determining the order of agents where control actions are tried can be used based on the teachings herein.

TABLE 9

Hypothetical exhaustion factors for double contingency GH

| Agent Number | Exhaustion Factor | Load (MW) | Included Generators |
|---|---|---|---|
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

The associated generators for the predicted control region critical agents, 5, 6, 7 and 8 are primarily B and D (as well as E). Accordingly, referring to Table 2, we can readily see that buses associated with these particular agents are 2, 3, 8, 9, 10 and 11. However, only buses 8, 9 and 10 have real loads associated with them. As such, one solution to strengthen electrical power system is to shed the loads on these buses in response to this specific contingency in increasing magnitudes until consecutive solutions to the load flow equations are obtained. It is desirable to obtain many consecutive solutions for increasing control changes. Corresponding reductions in generation can be performed by reducing the generation at the swing bus, by governor load flow or by decreasing generation on specific generators such as those where high reactive losses are observed or where reactive output is greatest. However, one skilled at the art may be able to find other suitable methods for selecting generators for reduction based on the teachings herein. The load pocket of agent 6 may be the control region if load shedding at buses 8 and 9 in increasing percentage have consecutive solutions. If one can not obtain consecutive solutions, one might select a control region of loadpockets 6 and 8. One can increase the number of load bearing agents in the control region until one obtains consecutive solutions from which a load shedding control is selected as nearer the center of the set of consecutive solutions.

It is desired to modify the controls of a minimum number of generators that belong to a control set. However, a small number may not be sufficient to obtain solutions to the load flow equations. In this case, the number of generators added to the control set can be increased. The process of establishing the sequence of generators of an agent that is added to the control region that are added to the control set must be decided for each control region agent. The sequence of agents added to the control region must also be decided and is sometimes based on the ranking of the reactive remaining exhaustion factors for the agents in the predicted control region. The sequence of generators added to the control set in each agent that belongs to the predicted control region can be based on those with higher capacities or loading factors.

The above example can be applied to a selection of generators on which voltage rescheduling is performed. Since it is determined that the generators for the most affected agents above are B, D and, to a lesser extent, E, voltage rescheduling would be performed by increasing or decreasing the voltage setpoint in small steps until several consecutive solutions to the load flow equations are found. The control used should be robust and could be taken at or near the center of the consecutive set of solutions. Care is taken with this increase to not violate physical voltage limits of the generators. If the voltage is increased or reduced, one must monitor reactive reserve in the control set of voltage control/reactive supply devices to see that it is increasing in total if not on each agent and every generator. If only one generator belonging to one agent is desired for the control region, we look to the most exhausted agents to decide the sequence of generators added to the control set. It is determined that generators B and D are candidates belonging to the control region composed of agents 5 and 6. However, since generator D has 100 Mvars of capacity and generator B has 10 Mvars, we may choose to select D as belonging to the control set since it has the larger reactive supply capability. If no suitable solutions can be found with one generator, two could be tried. In this case, D and B are selected as belonging to the control set and voltage setpoints are increased on both together or in series until consecutive solutions are obtained. If a third generator is required, E would be selected because it appears in the next most exhausted agent. Voltage rescheduling could increase the voltage setpoints on all generators in the control set sequentially or simultaneously until voltage limits are reached on a generator at which point that generator is maintained at its voltage limit.

Active power rescheduling can be performed on generators that are selected by the same method that is used in voltage rescheduling. Agents are added to the control region based on ranking of remaining exhaustion factors. Active power is reduced on a subset of generators selected to be part of the control set so that they supply large reactive losses on paths to the load pockets and active power is increased on the remaining generators in the control set that supply relatively small reactive losses on paths to the load pocket. The subsets of generators that experience increase and those that experience decrease are selected so that total increase in power on generators that experience increase and the total decrease on generators that experience decrease are about the same, which maximizes the amount of transfer possible. These subsets are not selected so that large reactive losses would be incurred on generators experiencing increase in active power to accomplish the transfer. The active power generation on generators that experience increase can only be increased on a specific generator until the active power generation level on that generator reaches its maximum active generation capability and then the active power generation on that generator is maintained at that maximum generation capability level. Similarly, the generators that experience active power decrease can only be decreased on a specific generator until the active power generation on that generator reaches its minimum active power generation capability and then the active power generation on that generator is maintained at that minimum active power generation capability.

The level of transfer is increased progressively until consecutive solutions are obtained for increasing transfer level or until the reactive reserve on the generators in the control region, control set or impact region achieve a specific level and a loadflow solution is obtained. The participation factors for this transfer are determined experimentally by determining the incremental change in reactive supply on generators in agents belonging to the control region for the same incremental increase in active power or voltage on each generator in the set. The subset of generators that decrease active power in the set of generators being used for control and the subset of generators that experience active power decrease depends on which generators have the largest increase in reactive losses and those that have the smallest increase in reactive losses on all generators in the network or the reactive power supplied by the specific generator.

The participation factors for the subset of generators that have an increase in power to accomplish a particular level of power transfer are proportional to the increase in reactive losses and the participation factors for the subset of generators that decrease generation are based on the reciprocal of reactive losses incurred on the generators. The loading factor for generators in terms of active or reactive power can be used for grouping the generators that have active power generation decrease and those that have active power generation increase and for determining the participation factors for each subset of the generators being used for control in place of reactive losses or reactive generation. The transfer level is increased until consecutive solutions are obtained and a control is used that is nearer to the center of the consecutive solution set. Removing active power on these paths with large reactive losses can be quite effective in obtaining loadflow solutions.

A combination of voltage rescheduling and active rescheduling can also be performed to achieve robust control for any contingency and postured control that is robust for a subset of the contingencies that cause voltage instability, voltage collapse or local blackout. The desire is to use the smallest level control actions on the minimum number of generators in the control set possible to obtain consecutive solutions for incremental changes in control. It should be noted that voltage decrease on generators with active power decrease and voltage increase on generators with active power increase can even more dramatically reduce reactive losses and obtain loadflow solutions. The coordination of voltage rescheduling control for outages where control is undertaken in different control set of generators belonging to agents in different control regions is anticipated since obtaining a solution for equipment outages affecting more than one family line may work well but be deleterious to obtaining solutions for outages affecting more than one family line as well as but where one or more family lines overlap. What works well in one control set of generators in one control region for the outages where control obtains solutions may complicate obtaining solutions for outages impacting another control region set of agents. The posturing control would possibly provide a modest change in voltage setpoint on a shared subset of the control set for the two control regions that does not cause too much harm for one control region in obtaining solutions and perhaps much benefit to the other control region in finding solutions.

Coordination of voltage control can be performed to produce a posturing control where the controls in the control set for shared family lines can be on active power for one subset of controls in the control set in one control region and voltage setpoint for the other subset of controls in control set in the shared family lines of two control regions. The posturing control can also be effective for a subset of the contingencies that have no loadflow solution and utilize this control region or a similar one with fewer or additional agents in each family line. A single posturing control would enable robust preventive control for an entire set of contingencies belonging to multiple similar control regions by adding additional members of different family lines to the control region and the active power and voltage of these generators of these agents to the control set. One can expand the control regions for each set of outages with somewhat different control regions and hopefully overcome the problem in that manner as well. The techniques for active power rescheduling, voltage rescheduling and even load shedding can be performed in various different combinations.

In addition to identifying the solutions for one particular contingency, the present invention is directed toward developing a postured control for a subset of contingencies that cause voltage instability, voltage collapse or local blackout by selecting specific contingencies and agents which need to be fortified for proper operation of the voltage control system using root cause analysis. The solutions to these specific outages may provide solutions to outages that affect the same agents, family lines and families. The number of outages typically found that have no solution when simulated by removal of the equipment in small steps is large. There can be solutions that require very little control in a very small control region of agents and a small set of controls. These outages are called parametric outages that suggest that the blackout is not severe as measured by the contingency measure and the control change is not large so it can be ignored as a cause of blackout. This is particularly true if one can show that when controls are found in large control regions for a few outages with severe contingency measures, the use of those controls as a posturing control for the system as prototype controls can lead to solutions of all other outages that cause voltage collapse for less severe outages using controls in a subset of the larger control set. One would be developing a posturing control rather than a preventive, corrective and emergency control for each outage. The posturing control would also add agents in family lines and families, add control from additional agents in the control region to the control set, coordinate voltage control or active power rescheduling control so only effective control in one or both control regions with no deleterious effect in the other control region is used when there are shared family lines in two control regions, and where power rescheduling control is used for one control region and voltage control is used in the other control region from controls in shared family lines in the two control regions. The removal of a base case blackout region through posturing by rescheduling of generators, voltage rescheduling and active power rescheduling is another application of posturing. The interrelationship between the severity of the outage in producing reactive losses in certain agents and the groups of buses, or agents, and their generators that experience exhaustion of reactive reserves are many times responsible for determining how far the cascading occurs. This suggests why a posturing control could be successful.

Accordingly, the vulnerability region for an agent can be defined as all of the buses associated with that agent combined with all of the buses associated with all of the children of that agent or with the family of that agent. For example, in the illustration depicted in FIG. 5, the vulnerability region for agent 1, which is the voltage instability regions of all agents in all agents in all family lines leading to that agent, includes all of the buses in agents 1, 2, 3, 4, and 5. Now referring to Table 2, the buses that comprise the vulnerability region for agent 1 are therefore, 1, 2, 3, 4, 5, 6, 7 and 12.

Agents with very little reactive supply or that have very little reactive reserves due to scheduling on generators, voltage setpoint, active power, etc., are called a base case blackout region, and they make a region vulnerable to outages that have no solution and can cause cascading voltage instability along a family line because its reserves are exhausted in the base case. The cascading instability is expected to be initiated in family lines containing these agents. Posturing control via unit commitment rescheduling, voltage and reactive rescheduling, active power rescheduling, and shunt capacitor rescheduling can (1) remove the vulnerability of this Base Case Blackout Region as well as (2) prevent blackout for all equipment outages that cause blackout by sequentially exhausting the reactive supply on all agents in a family line that is impacted by a large number of equipment outages or very severe outages as measured by the exhaustion factor. The agents may require either more reactive supply through unit commitment changes to match the reactive losses incurred, active power rescheduling and voltage rescheduling to reduce the reactive losses, additional FACTS (Flexible AC Transmission System) or switchable shunt capacitors to reduce reactive losses via better voltage control through maintaining reserves and increasing reserves on existing generators in those agents, improved transmission to reduce voltage and phase changes that cause reactive losses, or additional active generation to reduce reactive losses on supply reactive and active power to the agent. The agent with positive reactive values needs more reactive supply and the same type of enhancements may be necessary as are required for agents with very negative measures.

Available Transfer Capability

Available transfer capability or capacity (ATC) is an active power security constraint that indicates when too much power is being imported into a load bearing agent, a control region, or load pocket that is vulnerable to voltage collapse, local blackout and voltage instability if pre-specified single and double outages occurred. A security constraint is a constraint on the operation of a utility that, if satisfied, will prevent a thermal overload voltage limit violation, or prevent a voltage instability, voltage collapse or blackout from occurring in response to one or more contingencies.

Each load pocket has its own ATC security constraint based on the equipment outages or contingencies that cause it to experience voltage collapse, local blackout or voltage instability. Such a security constraint requires that ATC for a particular load pocket be greater than zero.

Rather than attempting to find the security constraint for each equipment outage that can cause voltage collapse, local blackout or voltage instability, an ATC security constraint can be computed for the change in flow possible into the load pocket. The ATC is obtained from a total transfer capability or capacity (TTC) for a load pocket by subtracting the firm and non-firm transfer into the load pocket and the TRM and the CBM for the load pocket. CBM is the amount of transmission transfer capability reserved by load serving entities to ensure access to generation from interconnected systems to meet generation reliability requirements (in case generation is lost in the load serving entity, it can obtain power from other generation in the utility or outside the utility). TRM is the amount of transmission transfer capability necessary to ensure that the interconnected transmission network is secure under a reasonable range of uncertainties and system conditions.

These ATC constraints for each load pocket are easily incorporated in the a security constrained dispatch and security constrained unit commitment that computes locational marginal prices for each hour of the day for a so-called day ahead market. ATC could be computed and updated hourly and used in a so-called hour ahead market and used to compute an hourly updated locational marginal price for congestion of each load pocket. The congestion prices can provide incentives for customers of the transmission system to commit additional generators in load pockets that are experiencing congestion, increasing generation on existing generators in the load pockets, installing additional lines into the load pocket, installing additional generation in the load pocket, or adding FACTS or special protection control for relieving congestion of the load pocket. Preventive voltage rescheduling, preventive active rescheduling and preventive load shedding discussed herein can increase ATC and thus eliminate the congestion and possibly the need for adding generation, transmission capacity, FACTS or special protection control for any load pocket.

The voltage collapse diagnostic and preventive control described herein indicates the single and single outage components of double outages that could cause blackout for each control region, the control region set of agents where preventive load shedding control can prevent the blackouts for these outages, and the control region where an incremental increase in load can cause blackout in that control region. These can in turn be used to compute the incremental transfer capability or capacity (ITC) for the control region or load pocket. The ITC for the control region is the minimum increase in transfer (load minus generation) into that control region after any single contingency from the set of component single contingencies that in combination cause blackout in that control region. The control region is chosen for computing the ITC because the preventive load shedding control performs load shedding in those agents of the control region to obtain load flow solutions for the double equipment outage combinations of the single outages used to compute the ITC. The TTC for the control region is the ITC for the control region plus the existing load minus the generation within the control region. Non-recallable available transfer capability or capacity (NRATC) is then the TTC minus the TRM minus the firm transmission reservation for that control region. Recallable transfer capability or capacity (RTC) is the TTC minus a percentage of the TRM, the firm transmission reserved for the control region, and the non-firm transmission reserved for point to point transfer into the control region.

The single outages that are components of double equipment outages that cause voltage collapse and that are corrected via control in a particular control region (problematic contingencies) are the outages required to compute ATC for that control region or load pocket. There are at least two methods to calculate the ATC value for a particular control region and the two here use the results from the voltage collapse diagnostic and preventive control described herein. One method is used when only double contingencies and no single outages can cause blackout in the control region and the second method is used when single outages cause blackout in the control region. The second method has precedence on control regions where there are one or more single outages that cause voltage instability voltage collapse or local blackout. The first and most straightforward approach involves finding preventive load shedding controls for all equipment outages that were unable to reach a maximum percentage of the outage remaining in the network equal to zero. These, as explained previously, are the equipment outages that will cause voltage instability, local blackout or voltage collapse in the electrical system. It is important to note that the preventive loadshedding control may require multiple loadbearing agents or load pockets be added to the control region to reach a suitable remedial action for a problematic contingency and also that each problematic contingency may require a different amount of load shedding on either the same, a similar or a completely different set of agents. An example calculation for double contingencies is set forth below.

EXAMPLE 2

Referring now to the tables illustrated below, a hypothetical non-limiting example is illustrated that will use the agents as defined in Table 2 and diagrammed in FIG. 5 as well as a set of single contingencies that are defined by the letters A-F as discussed above. Each letter represents a single contingency or piece of electrical equipment that can be switched off and effectively removed from the electrical system. This example asserts that the (1) voltage collapse diagnostic is performed as outlined in previous sections to obtain the agents from Table 2 and FIG. 5, (2) single contingency analysis is performed to find if any single outages cause voltage collapse and to find those outages that are used to find the double outages that will be simulated, (3) double contingency analysis is performed for determining the set of double outages to be simulated by selecting X and N and (4) by simulation of the resulting set of double contingencies produced out of single outage combinations and finding control regions corresponding to root cause for groups of contingencies (i.e., contingency kinds). A full discussion of this procedure is outlined in the previous sections.

According to one implementation, double outages that have no solution when simulated by removing the equipment in one step or in several small steps are saved and used to compute ATC for each control region. From this analysis, it is determined that the following combinations of double contingencies do not reach solutions to the load flow equations when the maximum percentage of the outage remaining in the network is equal to zero and are thus particularly problematic contingencies. The combinations are: {A,C}, {A,D}, {B,D}, {C,D} and {C,E}.

Next, loadshedding preventive controls are sought using the procedure outlined above referencing Table 6. After one or more attempts at loadshedding solutions, suitable values for loadshedding control are reached and the control region of load bearing agents for each double contingency is determined. The percentages of load shed at each agent in the control region for each contingency are enumerated in Table 10. This example assumes that generation is decreased at the swing bus or at generators outside the control region based on a governor load flow using preventive load shedding control as described above.

TABLE 10

Percentage Load shed on each agent to obtain a solution for certain double equipment outages

| Agent # | {A, C} | {A, D} | {B, D} | {C, D} | {C, E} |
|---------|--------|--------|--------|--------|--------|
| 1 | 0 | 25 | 10 | 5 | 0 |
| 2 | 0 | 25 | 10 | 5 | 0 |
| 3 | 0 | 25 | 10 | 5 | 25 |
| 4 | 0 | 0 | 0 | 0 | 0 |
| 5 | 0 | 0 | 0 | 0 | 0 |

TABLE 10-continued

Percentage Load shed on each agent to obtain a
solution for certain double equipment outages

| Agent # | {A, C} | {A, D} | {B, D} | {C, D} | {C, E} |
|---|---|---|---|---|---|
| 6 | 20 | 25 | 10 | 0 | 0 |
| 7 | 0 | 0 | 0 | 0 | 0 |
| 8 | 20 | 25 | 10 | 5 | 0 |

The numbers in Table 10 represent the percentage load shed on each agent that is required in order to reach a solution to the load flow equations for each hypothetical problematic double contingency.

Each column in Table 10 represents a set of load pockets in a control region where preventive load shedding control was successful in reducing stress on the electrical system with respect to that particular double contingency. As such, it stands to reason that, if only one component was outaged, the stresses produced by the other component may be reproducible by increasing load on the set of load pockets that were stressed due to the original outage combination. Load stress is applied in the control region agents for each double equipment outage shown in Table 10 after removal of one component of each problematic double contingency and then again after removal of the second component of that same problematic double contingency. The load stress is simulated with a governor loadflow. If there are generators that lie in the control region, the generation increase on those generators may be subtracted from the load added by scaling load in the control region since it reduces the stress on the boundary of the control region where reactive losses can cause voltage instability, voltage collapse and local blackout. The exhaustion of reactive reserves on the agents in the control region also cause the blackout and the governor loadflow models the system response to the load increase and thus the fact that generators in the control region pick up part of the load is properly accounted for by using the magnitude of the load increase without subtracting the increase in generation in the control region. The example will ignore the affects of generator governor response. The procedure for one problematic double contingency is described below.

The control region set of load pockets for contingency {A,C} as defined by Table 10 is agents 6 and 8, and the components of the double contingency are A and C. The buses associated with agents 6 and 8, as defined by Table 2, are 8, 9 and 10. An artificial stress, as defined below, is applied to these buses by scaling the load at these buses in steps of increasing percentage while simultaneously outaging one component A of the (A,C) double contingency. The percentage increase in load that can be added to these buses while still reaching a solution to the load flow equations, translated into the actual MW change, is equal to the ITC value for contingency A and load pocket set 6 and 8. For the purposes of this example this percentage is 30%, which translates to an ITC for a control region composed of agents 6 and 8 for outage A of 81 MW. Similarly, the set of load pockets is subjected to the same increasing pattern of stresses while simultaneously outaging component C to result in the ITC of component C and a control region set of load pockets 6 and 8, which in this example is 25% and which translates to an ITC for the control region composed of agents 6 and 8 for outage C of 67.5 MW. These two values are presented along with others in Table 11. Note that the same single contingency using the same control region required the same percentage load change but the same contingency using different control region load bearing agents required a different percentage load change to reach a boundary case solution.

Repeating this procedure for each problematic double contingency will result in measures for each respective set of load pockets for each respective contingency component, the hypothetical results of which are outlined in Table 11.

TABLE 11

Largest percentage increase in control region agents' load
possible after a single component of the double outage is removed.

| Agent # | A of {A, C} | C of {A, C} | A of {A, D} | D of {A, D} | B of {B, D} | D of {B, D} | C of {C, D} | D of {C, D} | C of {C, E} | E of {C, E} |
|---|---|---|---|---|---|---|---|---|---|---|
| 1 | | | 15 | 19 | 120 | 19 | 20 | 45 | | |
| 2 | | | 15 | 19 | 120 | 19 | 20 | 45 | | |
| 3 | | | 15 | 19 | 120 | 19 | 20 | 45 | 80 | 80 |
| 4 | | | | | | | | | | |
| 5 | | | | | | | | | | |
| 6 | 30 | 25 | 15 | 19 | 120 | 19 | | | | |
| 7 | | | | | | | | | | |
| 8 | 30 | 25 | 15 | 19 | 120 | 19 | 20 | 45 | | |

Table 11 is the largest percentage of increase in agent active power load in a control region in combination with a single outage that was able to obtain load flow solutions for each single outage that is a component of a double outage where load shedding provides a robust solution. The artificial stresses that are applied could be a Q-V style loading, a P-V style loading or an S-V style loading simulated via a governor loadflow that simulates the generation response in the system due to load reduction. The preferred embodiment uses P-V, or real load, increases to simulate the stress because an ATC value is desired that can be expressed in active power change across a control region boundary so as to be incorporated in a dc loadflow-based security constrained unit commitment or security constrained dispatch. If one used Q-V or S-V curves to determine ITC, a very different ITC measure is produced for any control region. The stress is applied incrementally to all agents in the stressed control region until there is no solution to the loadflow equations for every single equipment outage that is a component of a double outage that has a solution through load shedding control in that control region. One could also add load to the vulnerability regions of agents 6 and 8 (the specific buses within agents in the family associate with each agent in the control region for the contingency) and not just to the load pockets (agents) themselves to produce possibly a slightly more robust picture of ITC for all of the outages that cause blackout on a control region set of load pockets. In this example the vulnerability regions of agents 6 and 8 include agents 5, 6 and 8, which does not change the number of load bearing agents in the control region.

Using Table 11, all prospective ITC values are listed. The table shows each percentage of increased load required to reach the boundary case solution for each load pocket and single contingency. There are two applications for Table 11. The first is to find the minimum percentage change in load that can be added in a particular control region set of load pockets in combination with any single contingency that will result in no solution to the load flow equations. Since the control region loading pattern is the same for problematic double contingencies {A,D} and {B,D}, there are three independent percentages of increased load associated with three single contingencies, A, B and D. These three values can be used to calculate ITC for the set of load pockets described by 1, 2, 3, 6 and 8 by finding the minimum value which in this case is 15% (that translates to a 405*15%=60.75 MW value of ITC for that control region). Column "A of {A,D}" shows that a 15% increase in load will result in load flow non-solution when taken in combination with outage A. If an increase in load greater that 15% occurs, and contingency A unexpectedly occurs due to equipment failure, maintenance, or other reason, the electrical system would be anticipated to experience voltage stability, local blackout or voltage collapse problems. The same procedure is applied to every unique control region set of load pockets to derive a similar ITC for each control region set of load pockets.

Another measure of ITC is based on single load pocket rather than control regions composed of more than one load pocket. Despite the fact that a load flow non-solution is obtainable by exhausting reactive supply on a single agent or by adding load on a single agent in combination with a single contingency, the minimum addable load found in each row of Table 11 can be considered a measure of ITC for that individual load pocket when it is understood that such an ITC is evaluated for every load pocket in the system. Table 11 shows the load increase in a specific load pocket that could cause voltage instability that if accompanied by load increase in other load pockets would produce voltage instability in some control region. In the case of agent 8, this value can be observed to be 15% (that translates to 30 MW referring to Table 2) and is the minimum percentage across the agent 8 row in Table 11.

A similar measure of reliability can be determined for the case when the voltage collapse diagnostic procedure has determined that there are single contingencies that are unable to reach a load flow solution when the maximum percentage of the outage remaining in the system is equal to zero. This indicates that the power system is vulnerable to voltage instability, voltage collapse or local blackout in the event of a single contingency, which is considered an emergency situation. In such a critical situation, it is desirable to have a method of finding the geographic locations of the power system that are most vulnerable to collapse as a result of the single contingency. The single contingency ATC procedure outlined in Example 3 can determine the amount of loadshedding in a control region or in specific load pockets that will avert the emergency and restore normal operating conditions.

EXAMPLE 3

This hypothetical-non-limiting example will also use the agents as defined in Table 2 and diagrammed in FIG. 5 as well as a set of single contingencies that are defined by the letters A-F. As in Example 2, each letter represents a single piece of electrical equipment that can be switched off and effectively removed from the electrical system. These single contingencies are intended to be a set independent of those in Example 2. This example asserts that the voltage collapse diagnostic is performed as outlined in previous sections to obtain the agents from Table 2 and FIG. 5, and single contingency analysis is performed. From this single contingency analysis, it is determined that the single contingencies represented by the set A, C and E do not reach solutions to the load flow equations when the maximum percentage of the outage remaining in the system is equal to zero and are thus particularly problematic single contingencies. Preventive load shedding control is then performed on these single outages similarly to those in Example 2. The load shedding is simulated by governor load flow that would cause reduction in generation on generators under governor control. This reduction in generation can be used to reduce the load shed for any contingency or its effects can be ignored as discussed for the case where there are no single contingencies that cause voltage instability, voltage collapse or local blackout. The results of suitable hypothetical loadshedding are shown in Table 12.

TABLE 12

Percentage load shed on each agent required in order to reach a solution to the load flow equations for each hypothetical problematic single contingency

| Agent # | Contingency A | Contingency C | Contingency E |
|---|---|---|---|
| 1 | | | |
| 2 | | | |
| 3 | 45 | | 50 |
| 4 | | | |
| 5 | | | |
| 6 | | 16 | 50 |
| 7 | | | |
| 8 | | 16 | |

From the results in Table 12, it can be observed that a 45% reduction of load in agent 3 will obtain a loadflow solution to contingency A. Similarly, a 50% load reduction in agents 3 and 6 will also obtain a solution for contingency E (50 MW). This is the ITC value for one control region comprising agents 6 and 3. A 16% load reduction in agents 6 and 8 will obtain a solution for contingency C. The ITC for the control region comprising agents 6 and 8 is 16% of the total load in the control region load pockets 6 and 8 and is 43.5 MW. The ITC for the control region comprising agent 3 is 45% (75)=30 MW. The ITC is thus computed by control region. The results show one of the issues is that the control regions for single outages may not be control regions for double contingencies. The ITC values are negative rather than positive for the case where there are no single outages that have no loadflow solution when the maximum percentage of the outage remaining in the network is zero but are positive for all control regions where there are no single contingencies that cause voltage instability, voltage collapse or local blackout and only double contingencies that cause voltage instability, voltage collapse and local blackout.

The ITC can be computed for agents (load pockets) rather than control regions by taking the maximum percentage change in Table 12 for any load pocket that has no zero rows in the table to determine the percentage change in load corresponding to any load pocket where load shedding is needed to obtain a solution for any single outage. When ITC is computed for every load pocket in a control region for every single outage and ITC is the maximum load shed in each load pocket for all single outages that have that load pocket in its control region, the ITC values for all load pockets should assure stability for all single outages that have no loadflow solution. To assure that the electrical system will be stable if either contingency C or contingency E occurs, a skilled operator would shed 50% of the load in agents 3 and 6 and expect that either contingency A or E could occur and that the electrical system would not experience voltage instability voltage collapse, or local blackout. Similarly, if 50% of the load is shed in agents 3 (12.5 MW) and 6 (37.5 MW) as well as 16% (32 MW) in agent 8, a skilled operator would expect that the electrical system would be unaffected by voltage instability in the event any single contingency A, C or E occurred. Since it was previously determined that these single contingencies were the only single contingency threats to voltage instability, the above mentioned shedding schedule is expected to posture the electrical system against voltage instability for any single contingency. The negative value of the active power values in MW (that correspond to percentage values in Table 12) for each loadpocket are defined as the ITC for that load pocket for the set of single contingencies.

The procedure for computing TTC and ATC from ITC for a control region is:

TTC=ITC+net power flow into the control region;
NRATC=TTC−TRM−NRES; and

RATC=TTC−a TRM−NRES−RRES;

wherein
NRES is firm reservations for transfer into the control region;
RRES is non-firm reservations to transfer into the control region; and
a<1 when the control region set of load pockets is used to compute RATC and NRATC.

If there are no single outages then ITC is positive for all control regions and TTC is positive for all control regions. ATC values depend on NRES and RRES. If ITC is negative for control regions that prevent blackout for one or more of the single outages, it does not necessarily imply TTC is negative and ATC is negative but would if the flow over the control region boundary equals NRES and RRES. If ATC is computed on load pockets, the ITC values in MW, flow into the load pocket, TRM, RRES, and NRES are load pocket values and not control region values.

The ATC is determined by increasing load through a conformal scaling within the load pocket and computing ITC using a governor loadflow response of generation in the region of interest. This governor loadflow permits computing the power imported across the boundary of the load pocket boundary for each of the single equipment outages identified as being a component of a double outage that has no solution without the preventive control in that control region. The ITC is the minimum of the total net import across the boundary of the load pocket after each of these single outages if there is no single outage that can cause voltage collapse in that load pocket. The TTC adds the ITC and the base case or current import across the boundary of the load pocket and is positive. The ATC is negative for control regions where single equipment outage can cause voltage collapse and NRES and RRES equals the actual import into the load pocket. The negative value of ATC measures the total transfer reduction into the control region or load pocket to allow the worst single equipment outage that causes voltage collapse in that control region or load pocket to obtain a loadflow solution. This value of the negative ITC for each single outage with no loadflow solutions is computed from the preventive load shedding control for each single outage that causes voltage collapse in that control region.

Once the voltage collapse diagnostic determines all of the single and double outages that cause voltage collapse and the preventive load shedding control finds the control regions for all of the single and double outages that cause voltage instability, voltage collapse or local blackout, the particular single and double outages where preventative control can arrest blackout via load shedding in that load pocket are known and the single outages that are components of these double outages are known. The positive value ITC for any of the control regions can be determined by computing a P-V curve by increasing the load into the control region or load pocket until no governor load flow solution exists for the loadflow equations after each single equipment that is a component of the double outages that cause voltage collapse on that load pocket. The minimum value of transfer of power into the control region for all of these P-V curves is the ITC for the control region. The ITC for a control region where load shedding is effective in obtaining loadflow solutions is the maximum load required shed in any control region for any of the single equipment outages. For control regions affected by single and double outages, the value of ITC for single outages is used. For control regions affected by solely single or solely by double outages, the ITC value is obviously the ITC calculated for the outages affecting the control region. The ATC is then computed by adding the current power flow into the control region and subtracting the current net firm and non-firm transfer reservations into the control region plus a CBM for providing power to load serving entities and a TRM for assuring that there is transmission capacity for variation in the network and generation response to the load change. The ATC is a measure of the import transfer reserves available in that control region before voltage collapse, local blackout or voltage instability will occur. Control regions or load pockets that export power could have an ATC value, but in general such regions have such an abundance of reactive reserves and they will not be as vulnerable to voltage collapse as control regions that import active and reactive power. It should be noted that there could be an import and export ATC value for any control region or load pocket.

Depending on the amount of ATC of the load pocket, the load pocket may be characterized in different ways. The first type of load pocket is an active load pocket, which is vulnerable to single outages. Such a load pocket is in a critical state, and an immediate response is needed. A second type of load pocket is referred to as a vulnerable load pocket. Such a load pocket is not vulnerable to single outages as it does have some capacity, which may be capacity that may be overbooked. A third type of load pocket is an emergent load pocket, which may require double or more outages before any constraints are obtained.

The second step is to compute TRM and CBM for each load pocket or control region. The identification of paths with significant reactive losses can be identified from the preventive control algorithm and is important because these reactive losses can greatly change the nose of the P-V curve and the value of ITC. Computing TRM may reflect the difference between the best and worst methods of importing active and reactive power into the control region or load pocket. Once this is obtained, a third step is to specify the net import and the possible variation of the imports of power into the control region, the various change in the load variation, and the various changes in the network impedances and admittances that may have affect on the P-V curve computed by the governor loadflow. These variations are needed to compute the TRM. The CBM is that capacity of the boundary of the load pocket reserved for use by load serving entities. This CBM measure may be discontinued as a separate component in ATC and incorporated in NRES for TRM if FERC Standard Market Design is approved. The CBM is generally computed using a generation reliability method that would be applied to the control region or load pocket.

Figure 23:
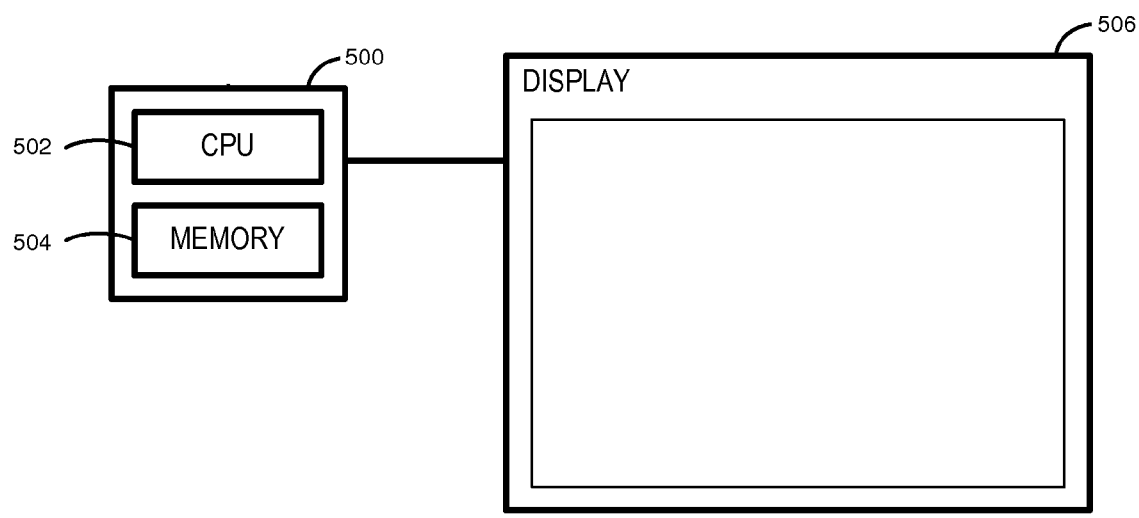
FIG. 23 is a block diagram of a computer system in which embodiments of the invention can be implemented.

FIG. 23 is a block diagram of a computer system in which embodiments of the invention can be implemented. Workstation 500 can be, for example, a computer having an internal configuration of hardware including a processor such as a central processing unit (CPU) 502 and a memory 504. CPU 502 can be a controller for controlling the operations of the workstation 500 to implement the processes described herein, including running a loadflow model according to the processes described herein. CPU 502 is connected to memory 504 by, for example, a memory bus (not shown). Memory 504 can be read only memory (ROM), random access memory (RAM) and/or any other suitable memory device. Memory 504 can store data and program instructions that are used by CPU 502 for controlling operations of workstation 500 as described. Other suitable implementations of workstation 500 are possible. For example, the processing of workstation 500 can be distributed among multiple devices coupled together by a local area network (LAN), wide area network (WAN), virtual private network (VPN), Internet or other communications connection.

In FIG. 23, a display 506 configured to display a data such as the table of symptoms described above can be connected to workstation 500. In some implementations, workstation 500 includes display 506. Display 506 can be implemented in various ways, including by a liquid crystal display (LCD) or a cathode-ray tube (CRT) or light emitting diode (LED) display, such as an OLED display. Display 506 is coupled to and is controlled by CPU 202 in this example.

The embodiments of workstation 500 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, computer clusters, microprocessors, digital signal processors or any other suitable circuit. The term "processor" herein should be understood as encompassing any of the foregoing hardware, either singly or in combination. Further, portions of workstation 500 do not necessarily have to be implemented in the same manner.

Further, in one embodiment for example, workstation 500 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A method of assessing a condition of an electrical power system including a network of buses, at least certain of the buses including a respective reactive source, the method comprising:
   (I) performing a plurality of contingencies using a mathematical model of the network manipulated by a processor;
   (II) determining a representative solution for each contingency of the plurality of contingencies;
   (III) for each bus in the network, tabulating symptoms of system stress exhibited by the bus in the representative solution for each contingency;
   (IV) categorizing each contingency into one of at least two contingency clusters based on its representative solution;
   (V) sorting those of the buses having a highest number of the symptoms of system stress summed over those contingencies categorized within a respective contingency cluster into a respective bus group associated with the respective contingency cluster;
   (VI) arranging each of the at least two contingency clusters into a ranking based on its effect on the network; and
   (VII) selecting a location for a network enhancement from a group of buses associated with a contingency cluster of the ranking that has a largest effect on the network and also includes buses as a result of the sorting.

2. The method of claim 1 wherein
performing a plurality of contingencies comprises performing a plurality of single contingencies and performing a plurality of multiple contingencies, each multiple contingency obtained by combining at least two of the single contingencies of the plurality of single contingencies; and wherein
categorizing each contingency comprises categorizing each single contingency into one of at least one single contingency cluster based on its representative solution and categorizing each multiple contingency into one of at least one multiple contingency cluster based on its representative solution.

3. The method of claim 2 wherein
the at least one single contingency cluster comprises an unsolved single contingency cluster and a solved single contingency cluster and the at least one multiple contingency cluster comprises an unsolved multiple contingency cluster and a solved multiple contingency cluster; wherein
the ranking comprises an order of the unsolved single contingency cluster, the unsolved multiple contingency cluster, the solved single contingency cluster and the solved multiple contingency cluster; wherein
the solved single contingency cluster includes single component contingencies that do not solve using a first solution method but solve using a second solution method; wherein
the solved multiple contingency cluster includes multiple component contingencies that do not solve using the first solution method but solve using the second solution method; wherein
the unsolved single contingency cluster includes single component contingencies that do not solve using either the first solution method or the second solution method; and wherein
the unsolved multiple contingency cluster includes multiple component contingencies that do not solve using either the first solution method or the second solution method.

4. The method of claim 3, further comprising:
grouping a single contingency that is a common component of a plurality of multiple component contingencies that do not solve using either the first solution method or the second solution method in the unsolved single contingency cluster.

5. The method of claim 1 wherein determining the representative solution for each contingency comprises:
representing the contingency in the mathematical model as an equivalence model of equipment associated with the contingency, the equivalence model having parameters proportional to a percentage of the contingency removed;
attempting a solution to the mathematical model with the percentage of the contingency removed in a single step being 100%;
using the solution to the mathematical model with the percentage of the contingency removed in the single step being 100% as the representative solution for the contingency when the mathematical model converges;
when the mathematical model does not converge with the percentage of the contingency removed in the single step being 100%,
 A) selecting the percentage of the contingency removed as a new value of greater than 0% and less than 100%;
 B) attempting a solution to the mathematical model with the percentage of the contingency removed being the new value;
 C) if the mathematical model converges with the percentage of the contingency removed being the new value, increasing the new value if the new value is below 100%;
 D) if the mathematical model does not converge with the percentage of the contingency removed being the new value, decreasing the new value such that the new value remains above 0%;
 E) repeating B), C) and D) at a step until the mathematical model does not converge for two steps where the percentage of the contingency removed for the two steps is equal to a predefined minimum step value or until the mathematical model converges with the new value being 100%;
 F) if the mathematical model converges with the new value being 100%, using the solution to the mathematical model with the new value being 100% as the representative solution; and
 G) if the mathematical model does not converge in E), selecting a solution where the mathematical model converges for the new value closest to 100% as a boundary case solution, and predicting the representative solution based on the boundary case solution.

6. The method of claim 5 wherein
performing a plurality of contingencies comprises performing a plurality of single contingencies and performing a plurality of multiple contingencies, each multiple contingency obtained by combining at least two of the single contingencies of the plurality of single contingencies; wherein
categorizing each contingency comprises categorizing each single contingency into a solved single contingency cluster when its representative solution is the solution to the mathematical model with the percentage of the single contingency removed in a single step being 100% and otherwise categorizing it into an unsolved single contingency cluster and comprises categorizing each multiple contingency into a solved multiple contingency cluster when its representative solution is the solution to the mathematical model with the percentage of the multiple contingency removed in a single step being 100% and otherwise categorizing it into an unsolved multiple contingency cluster; and wherein
the ranking comprises an order of the unsolved single contingency cluster, the unsolved multiple contingency cluster, the solved single contingency cluster and the solved multiple contingency cluster.

7. The method of claim 5 wherein predicting the representative solution comprises scaling at least certain values obtained in the boundary case solution based on the percentage of the contingency removed in the boundary case solution.

8. The method of claim 5 wherein predicting the representative solution comprises predicting a loadflow variable by calculating a factor equal to:
a per unit change in a value of the loadflow variable in a base case solution to
a value of the loadflow variable in the boundary case solution/the percentage
of the contingency removed in the boundary case solution as a fraction; and
adding the value of the loadflow variable in the boundary case solution to the factor multiplied by the value of the loadflow variable in the boundary case solution.

9. The method of claim 8 wherein the at least one loadflow variable comprises at least one of a bus voltage, a current value, an active power flow on a branch, a reactive power flow on a branch or reactive power out of a generator.

10. The method of claim 5 wherein B) comprises attempting the solution to the mathematical model by enabling at least one of the following voltage control options:
 (i) tap changers; or
 (ii) switchable capacitors; and by electing one of an active power mismatch simulation including:
  (a) governor power flow;
  (b) AGC power flow;
  (c) optimal power flow; or
  (d) dynamic simulation approximation snapshots.

11. The method of claim 1 wherein the symptoms of system stress exhibited by the bus in the representative solution comprise at least one of a voltage violation of the bus, a thermal overload of a branch connected to the bus, a surge impedance loading of a branch connected to the bus or an outage of the branch connected to the bus.

12. The method of claim 1 wherein tabulating symptoms of system stress exhibited by the bus in the representative solution for each contingency comprises incrementing a count for the bus:
 A) when the bus is exhibiting a voltage violation in the representative solution;
 B) for each branch connected to the bus exhibiting a thermal overload in the representative solution; and
 C) for each branch connected to the bus exhibiting surge impedance loading in the representative solution; and
 D) for each branch connected to the bus that is associated with the contingency; and wherein sorting is performed using the count.

13. The method of claim 1, further comprising:
arranging each group of buses associated with the respective contingency cluster into one or more subgroups of buses, wherein each bus of a subgroup is related to another bus of the subgroup.

14. The method of claim 13 wherein each bus of the subgroup is physically coupled to another bus of the subgroup, the method further comprising:

arranging the subgroups of buses in order within each contingency cluster based on their effect on the network; and wherein selecting a location for a network enhancement from a group of buses associated with a contingency cluster of the ranking that has a largest effect on the network and also includes buses as a result of the sorting comprises selecting the location from a subgroup of the contingency cluster that has the largest effect on the network.

15. The method of claim 1, further comprising:

using the representative solution to determine a set of reactive sources of the network exhausted by each contingency;

defining a plurality of agents, each agent comprising a plurality of buses such that when a reactive load is applied to any bus within the plurality of buses, a same at least one reactive source generally completely exhausts its reactive reserves;

arranging the plurality of agents into a hierarchy such that agents at a higher level in the hierarchy include more sources of reactive reserves than agents at a lower level in the hierarchy and wherein at least some of the agents at lower levels in the hierarchy have reactive reserves that are subsets of the reactive reserves of agents at higher levels in the hierarchy; and wherein family lines of agents are defined based on agents at lower levels in the hierarchy having the subsets of the sources of reactive reserves contained in agents at higher levels in the hierarchy and a patriarch agent has the largest set of sources of reactive reserves in one or more family lines of agents; and defining subareas of the network as at least one agent where a same set of reactive sources of the network is exhausted by a contingency.

16. The method of claim 15 wherein selecting a location for a network enhancement comprises selecting the location based on an arrangement of the subareas of the network, the subareas forming at least one of:

a subregional subarea that comprises a family line of agents that experiences propagation of voltage instability in successively larger patriarch agents in families of agents;

a regional subarea that comprises families of subareas with multiple family lines of subareas, each with a separate root cause subarea and each with a patriarch subarea; and an inter-regional subarea that comprises a starfish shape having arms comprised of different family lines or different families of subareas, each with a patriarch subarea, and having a body comprised of a network of patriarch subareas.

17. The method claim 15 wherein selecting a location for a network enhancement comprises selecting the location from a lowest agent of a subarea for the contingency cluster.

18. The method of claim 1, further comprising:

selecting the network enhancement;

testing the network including the network enhancement by repeating (I) through (VI) using the mathematical model of the network updated with the network enhancement.

19. The method of claim 18, further comprising:

if the testing shows that the at least two contingency clusters include buses, performing at least one of selecting an additional network enhancement or replacing the network enhancement with a different network enhancement and testing the network using the mathematical model of the network updated with at least one of the additional network enhancement or with the different network enhancement in place of the network enhancement.

20. The method of claim 1, further comprising:

selecting a type and a size for the network enhancement at the location.

21. The method of claim 1 wherein the network enhancement comprises at least one of an additional line, a re-conductored line, a raised voltage rating of a line, series compensation of a line, static VAR compensation (SVC), voltage rescheduling, active rescheduling or load shedding.

* * * * *